(12) United States Patent
Chaput

(10) Patent No.: US 11,420,676 B2
(45) Date of Patent: Aug. 23, 2022

(54) SLIDING KINGPIN ASSEMBLY FOR USE IN VEHICLES

(71) Applicant: SK8DOGLTD, LLC, Des Moines, IA (US)

(72) Inventor: Christopher Chaput, Huntington Beach, CA (US)

(73) Assignee: SK8DOGLTD, LLC, Des Moines, IA (US)

( * ) Notice: Subject to any disclaimer, the term of this patent is extended or adjusted under 35 U.S.C. 154(b) by 214 days.

(21) Appl. No.: 16/807,605

(22) Filed: Mar. 3, 2020

(65) Prior Publication Data

US 2020/0283065 A1  Sep. 10, 2020

Related U.S. Application Data

(60) Provisional application No. 62/813,236, filed on Mar. 4, 2019.

(51) Int. Cl.
| | |
|---|---|
| *B62D 7/00* | (2006.01) |
| *B62D 7/18* | (2006.01) |
| *A63C 17/00* | (2006.01) |
| *B62K 3/00* | (2006.01) |
| *B62K 21/10* | (2006.01) |

(52) U.S. Cl.
CPC .......... *B62D 7/18* (2013.01); *A63C 17/0093* (2013.01); *B62K 3/002* (2013.01); *B62K 21/10* (2013.01)

(58) Field of Classification Search
CPC .... B62K 3/002; B62K 21/10; A63C 17/0093; A63C 17/012; A63C 17/015; A63C 17/12
USPC ........................................................ 280/87.01
See application file for complete search history.

(56) References Cited

U.S. PATENT DOCUMENTS

| | | | | |
|---|---|---|---|---|
| 6,279,930 B1* | 8/2001 | Chang | .................... | B62K 3/002 280/11.27 |
| 6,375,208 B1* | 4/2002 | Lee | ...................... | A63B 21/157 280/220 |
| 6,545,963 B2* | 4/2003 | Deguchi | ................ | G11B 7/007 369/124.07 |
| D507,206 S * | 7/2005 | Wang | .............................. | D12/1 |
| 7,044,488 B1* | 5/2006 | Hamend | ................ | B62K 3/002 280/221 |
| 9,987,546 B1* | 6/2018 | Clos | ...................... | A63C 17/012 |
| 10,238,952 B2* | 3/2019 | Clos | ...................... | A63C 17/012 |
| 2002/0158440 A1* | 10/2002 | Graf | ......................... | B62M 1/32 280/258 |
| 2005/0062253 A1* | 3/2005 | Osher | .................... | A63C 17/12 280/221 |

(Continued)

*Primary Examiner* — Hau V Phan
(74) *Attorney, Agent, or Firm* — Christopher A. Proskey; BrownWinick Law Firm

(57) ABSTRACT

Disclosed is a truck comprising a hanger having a first pivot support and a second pivot support and an axis of rotation passing through the first pivot support and the second pivot support, a base having a structure providing the first pivot support, a pivot arm attached to the base providing the second pivot support, a pivot bushing passing through an aperture of the base, a kingpin passing through the pivot bushing, the base, and the hanger, and a locknut arranged at an end of the kingpin. In at least one example embodiment the first and second pivot support structures prevent an axis of rotation of the hanger from moving as the locknut is moved along the kingpin.

18 Claims, 71 Drawing Sheets

(56) References Cited

U.S. PATENT DOCUMENTS

| 2008/0088109 | A1* | 4/2008 | Chiu | B62K 3/002 |
| | | | | 280/221 |
| 2018/0161661 | A1* | 6/2018 | Ma | A63C 17/1409 |
| 2018/0229103 | A1* | 8/2018 | Clos | A63C 17/015 |

* cited by examiner

SLIDING KINGPIN ASSEMBLY FOR USE IN VEHICLES

CROSS REFERENCE TO RELATED APPLICATIONS

This application claims the benefit of U.S. Patent Application No. 62/813,236 filed with the United States Patent and Trademark Office on Mar. 4, 2019, the entire contents of which are herein incorporated by reference.

BACKGROUND

1. Field

Example embodiments relate to a sliding kingpin assembly which may be used in vehicles such as, but not limited to, skate boards, bicycles, tricycles, scooters, and boats. In example embodiments the sliding kingpin assembly may be used to eliminate axis shifting in trucks and/or function as a damper in steering columns, amongst other uses.

2. Description of the Related Art

FIG. 1 is an exploded view of a prior art truck 100. As one skilled in the art would understand, the truck 100 is generally mounted on the bottom of a skate board and provides a certain amount of steering as a rider leans to one side of the skate board. FIG. 2 is a perspective view of the truck 100 in an assembled condition, FIG. 3 is a side view of the truck 100 in the assembled condition, and FIG. 4 is a back view of the truck 100 in the assembled condition. FIGS. 11 and 12 are section views of the truck 100 in the assembled condition.

As shown in FIGS. 1-4, the truck 100 generally includes a lock nut 10, a first cup washer 20, a first bushing 30, a hanger 40, a pivot cup 50, a base 60, a second bushing 70, second cup washer 80, and a kingpin 90. In the prior art, the lock nut 10 is a standard locknut having a threaded inner surface 12 configured to engage threads 92 of the kingpin 90. The kingpin 90 is generally made of grade 8 hardened steel and has a shaft 94 with the threaded end 92 and an end cap 96. The end cap 96 is generally hexagonal in shape and has three pairs of parallel edges. As will be explained below, the kingpin 90 passes through a channel 65 of the base 60 having a recess 64. The recess 64 is at least partly defined by a pair of walls 66 and 67 having a spacing WS slightly larger than a distance separating a pair of parallel edges of the of the end cap 96 of the kingpin 90 (see at least FIG. 4). This geometry allows the end cap 96 to reside in the recess 64, however, the walls 66 and 67 prevent the end cap 96 from rotating within the recess 64. The recess 64 also includes a bearing surface 68 which contacts a bearing surface 97 of the kingpin 90 when the kingpin 90 is inserted through the channel 65 of the base 60.

In the prior art the base 60 generally includes a pair of flanges 61 which include one or more holes 66 to facilitate connecting the truck 100 to a board. The base 60 further includes a pivot recess structure 62 configured to receive the pivot cup 50. The pivot recess structure 62, for example, may be formed by drilling a cylindrical hole into a portion of the base 60. The drilling operation forms a cylindrical recess 63 for receiving the pivot cup 50. The pivot cup 50 may be formed of a soft elastomer, for example, urethane. The pivot cup 50 may, in turn, have a cylindrical channel 52 which may be configured to receive a pivot shaft 41 of the hanger 40. The pivot shaft 41, as shown in FIG. 1, may resemble a cylindrical shaft having a dome shaped end and the pivot shaft 41 may rotate within the pivot cup 50. In the prior art, the base 60 may further include a tower section 63 which may be associated with the recess 64. The tower section 63 includes the channel 65. The channel 65 generally has a diameter large enough to accommodate the kingpin 90. For example, if the cross-section of the kingpin 90 has a diameter of about ⅜", the channel 65 may resemble a circular channel having a diameter of about ⅜" or slightly larger.

In the prior art, the hanger 40 generally has an aperture 42 that allows the kingpin 90 to pass through. For example, if the cross-section of the kingpin is about ⅜", the aperture 42 of the hanger 40 is about ⅜" or slightly larger to accommodate the kingpin 90 and allow the kingpin 90 to pass through the hanger 40. Around the aperture 42 are recessed areas on both sides of the hanger 40. The recessed areas act a bushing seats 43 and 44 to receive the bushings 30 and 70. For example, FIG. 1 clearly shows a bushing seat 43 to receive the first bushing 30. One skilled in the art would understand bushing seat 44 on the opposite side of the hanger 40 would receive the second bushing 70.

The bushings 30 and 70 are typically cylindrical bushings having a height Bh, an inner diameter Bid, and an outer diameter Bod. The bushings 30 and 70 have channels 32 and 72 defined by the inner diameters Bid. The inner diameters Bid may be large enough to accommodate the kingpin 90. For example, if the kingpin 90 has a diameter of about ⅜", the inner diameters of the bushings 30 and 70 Bid may be about ⅜" or slightly larger. The bushings 30 and 70 are generally made of a resilient material, for example, urethane, to absorb various forces applied thereto while retaining the ability to return to an original configuration.

The cup washers 20 and 80 generally resemble disks having an inner diameter Wid and an outer diameter Wod. The cup washers 20 and 80 generally have apertures 22 and 82 defined by the inner diameters Wid. The inner diameters Wid of the cup washers 20 and 80 are about the same as the outer diameter of the kingpin 90 to allow the kingpin 90 to pass through. For example, if the outer diameter of the kingpin 90 is ⅜", the inner diameters Wid of the cup washers 20 and 80 may be about ⅜" or slightly larger. This allows the kingpin 90 to pass through the cup washers 20 and 80. In the prior art, the edges of the cup washers 20 and 80 may form flanges having an inner diameter of Wmd. In the prior art, the inner diameters of the flanged section Wmd is generally about the same size, or slightly larger than, the outer diameter Bod of the bushings 30 and 70. This allows the cup washers 20 and 30 to at least partially capture ends of the bushings 30 and 70.

In the prior art, the truck 100 is assembled by inserting the kingpin 90 through the channel 65 of the base 60 until the bearing surface 97 of the end cap 96 bears against a bearing surface 68 of the base 60 as shown in FIG. 11. Thereafter, the second cup washer 80 is aligned with the kingpin 90 so that the aperture 82 of the second cup washer 80 is aligned with the kingpin 90, this allows the second cup washer 80 to be moved along the kingpin 90 resulting in the kingpin 90 penetrating the aperture 82 of the second cup washer 80. In this operation the second cup washer 80 is generally moved until it makes contact with the base 60. Thereafter, the second bushing 70 is aligned with the kingpin 90 so that the aperture 72 of the second bushing 70 is aligned with the kingpin 90, this allows the second bushing 70 to be moved along the kingpin 90 resulting in the kingpin 90 penetrating the aperture 72 the second bushing 70. In this operation the second bushing 70 is generally moved until it contacts the second cup washer 80. Thereafter the hanger 40 is moved so that the pivot shaft 41 is inserted into the pivot cup 50 which was previously placed in the pivot recess structure 62. At the same time the hanger 40 is arranged so that the aperture 42 is aligned with the kingpin 90 so that the hanger 40 moves down along the kingpin 90 resulting in the kingpin 90 penetrating the aperture 42 of the hanger 40. This step also generally places the second bushing 70 in the second bushing seat 44. Thereafter, the first bushing 30 is aligned with the kingpin 90 so that the aperture 32 of the first bushing 30 is aligned with the kingpin 90. This allows the first bushing 30 to be moved along the kingpin 90 resulting in the kingpin 90 penetrating the aperture 32 of the first bushing 30. In this step the first bushing 30 is generally moved along the kingpin 90 until it seats in the first bushing seat 43. Thereafter, the first cup washer 20 is aligned with the kingpin 90 so that the aperture 22 of the cup washer 20 is aligned with the kingpin 90. This allows the first cup washer 20 to move along the kingpin 90 resulting in the kingpin 90 penetrating the aperture 22 of the first cup washer 20. After the first cup washer 20 is placed over the first bushing 30 the threaded end 92 of the kingpin 90 is exposed and the lock nut 10 is screwed onto the threaded end 90 of the kingpin 90 to secure the structure. These operations result in the truck 100 assembled as shown in FIG. 11.

SUMMARY

As one skilled in the art would understand, as the lock nut 10 is turned, the first cup washer 20 presses against the first bushing 30 which in turn presses against the hanger 40 which in turn presses against the second bushing 70 which in turn presses against the second cup washer 80 which in turn presses against the base 60. The amount of compression is controlled by how far the lock nut 10 moves along the kingpin 90. The inventor has noticed that as the lock nut 10 is tightened, the pivot shaft 41 may be misaligned with the pivot cup 50 as shown in FIG. 12. The inventor, therefore, set out to resolve this problem which has resulted in a novel and nonobvious truck. Part of the new truck design utilizes a sliding kingpin system which was found to be usable not only in trucks but as part of a damping device usable in vehicles such as, but not limited to, bicycles, tricycles, scooters and boats.

Disclosed is a vehicle comprising at least one handle, at least one wheel operatively connected to the at least one handle so that as torque is applied to the at least one handle the at least one wheel is rotated from a first position to a second position, and a head tube enclosing a return device configured to rotate the at least one wheel back to the first position when the torque is released from the at least one handle. In this nonlimiting example embodiment, the vehicle may be, but is not limited to a skate board, bicycle, tricycle, scooter, and boat.

BRIEF DESCRIPTION OF THE DRAWINGS

Example embodiments are described in detail below with reference to the attached drawing figures, wherein.

DETAILED DESCRIPTION

Figure 1:
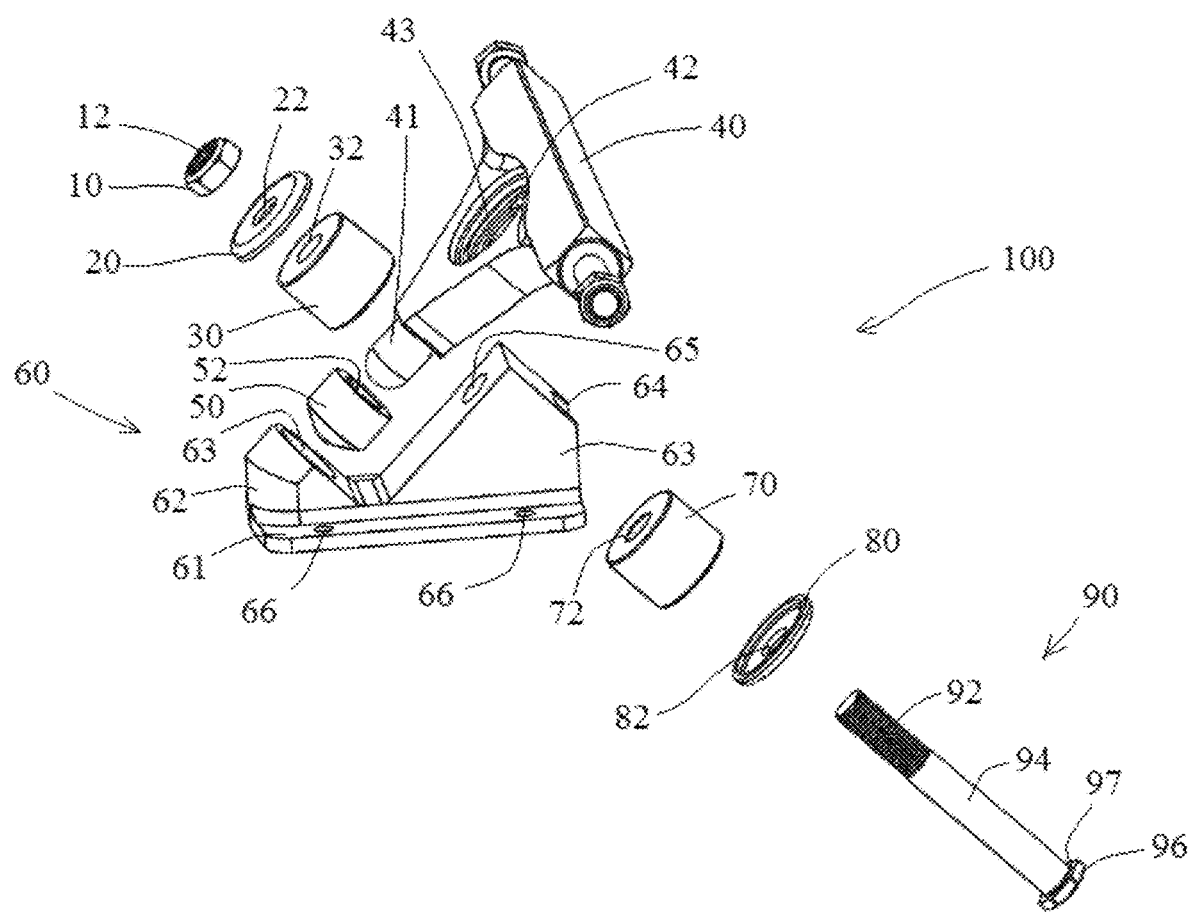
FIG. 1 is an exploded view of at truck in accordance with the prior art.
Figure 2:
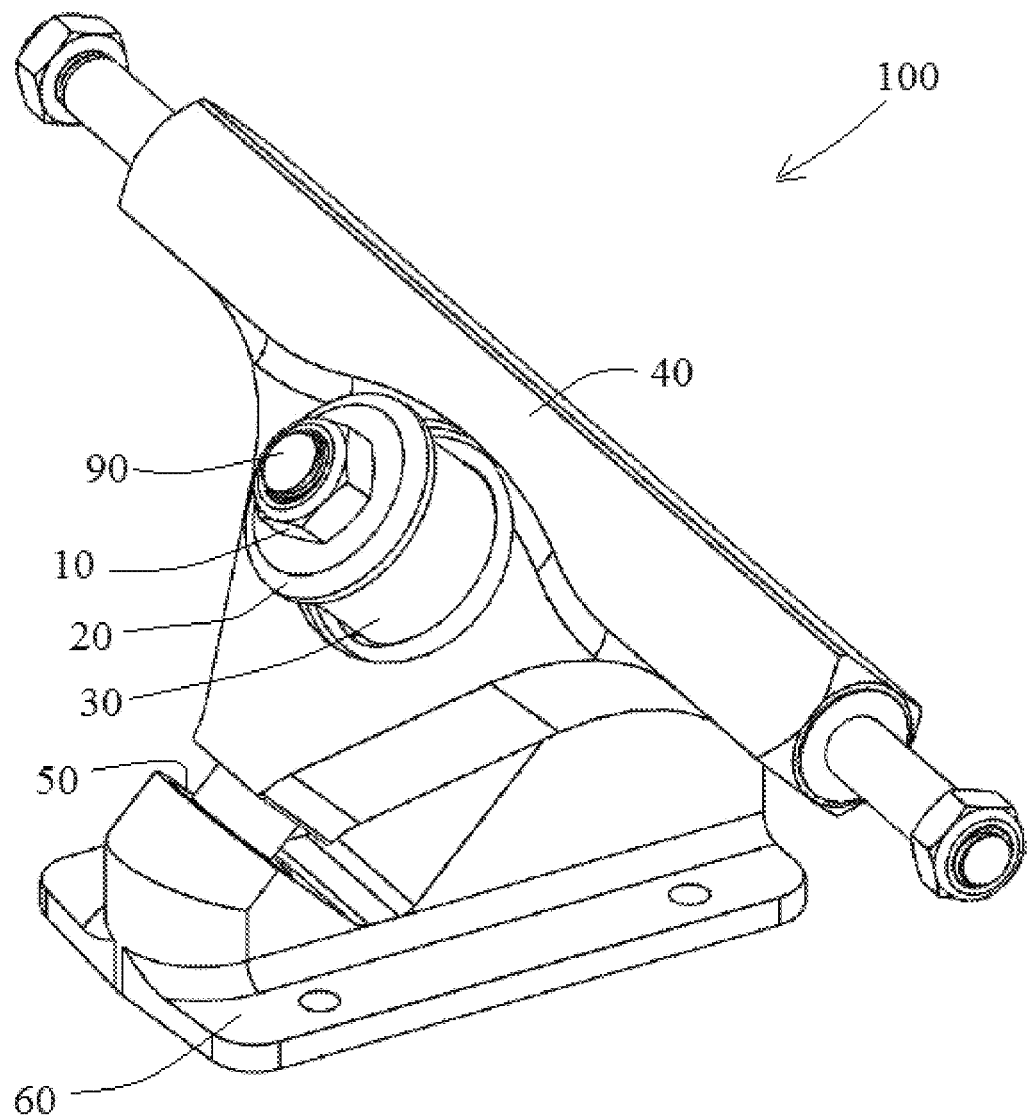
FIG. 2 is a perspective view of the truck in accordance with the prior art.
Figure 3:
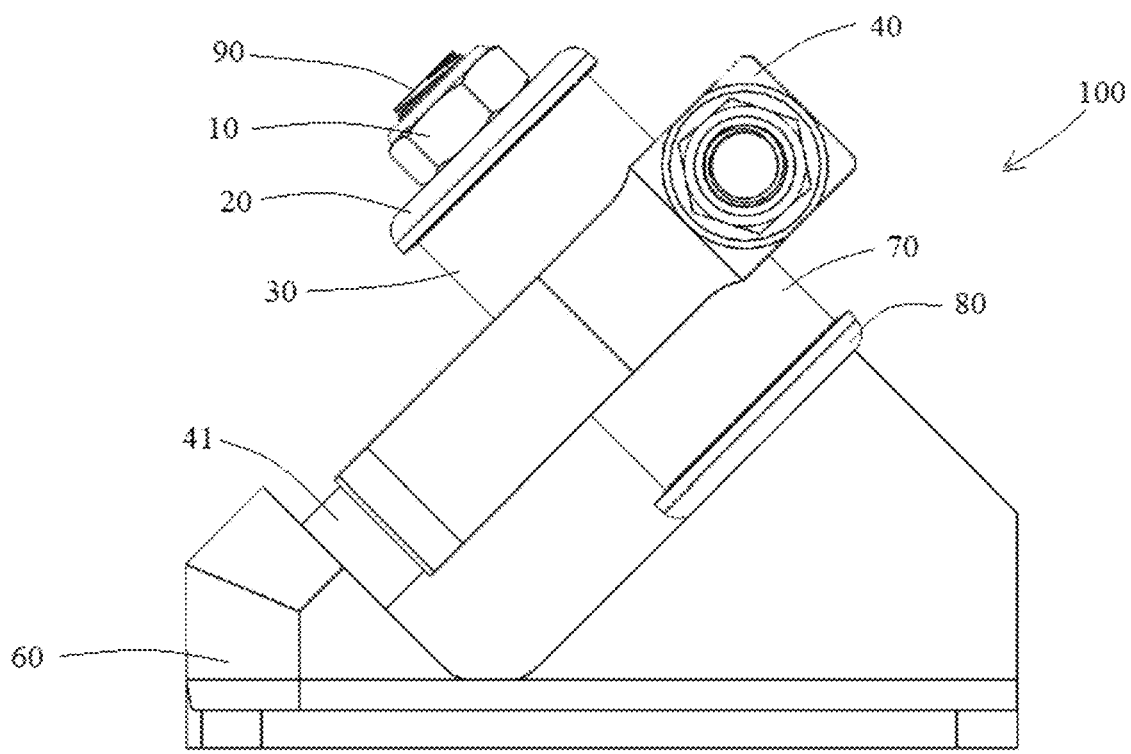
FIG. 3 is a side view of the truck in accordance with the prior art.
Figure 4:
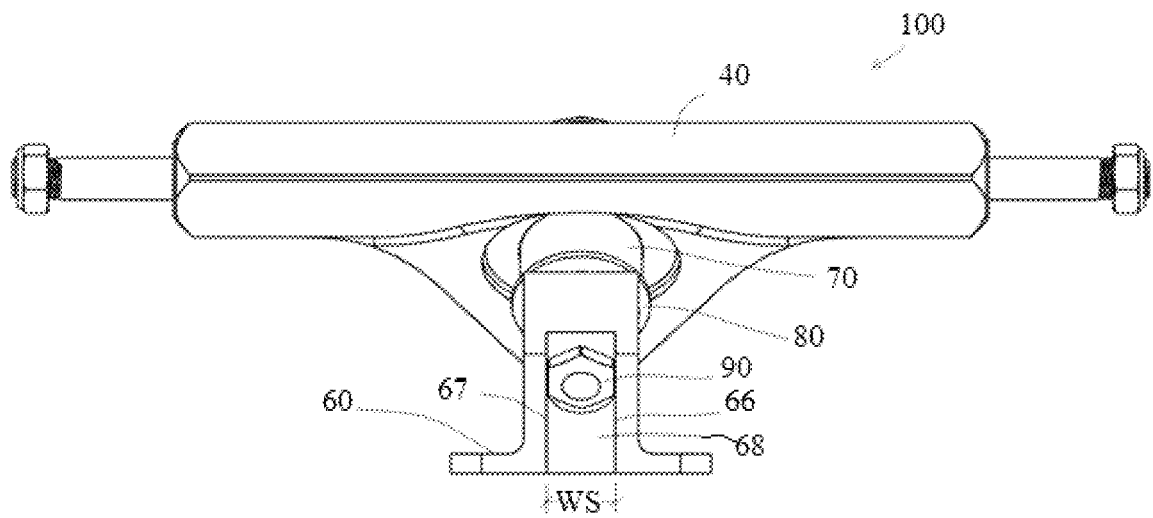
FIG. 4 is a back view of the truck in accordance with the prior art.
Figure 5:
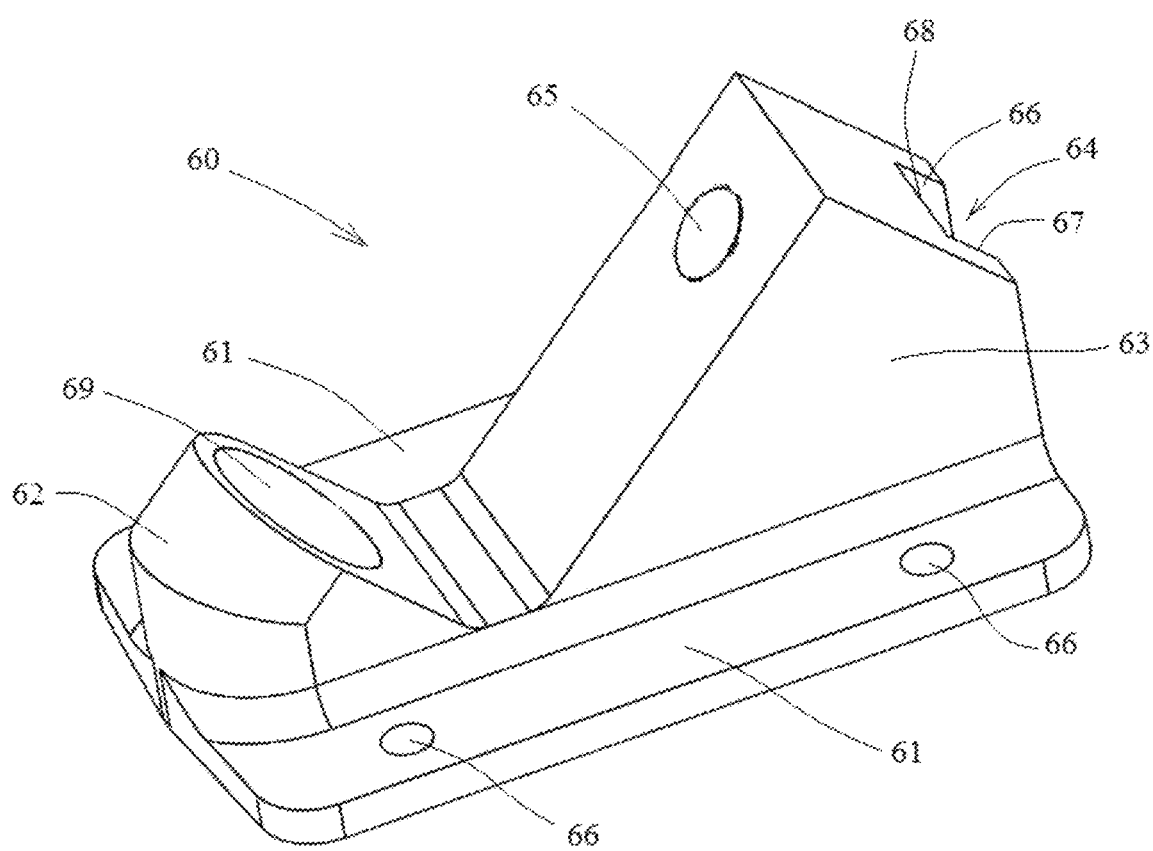
FIG. 5 is first perspective view of a base in accordance with the prior art.
Figure 6:
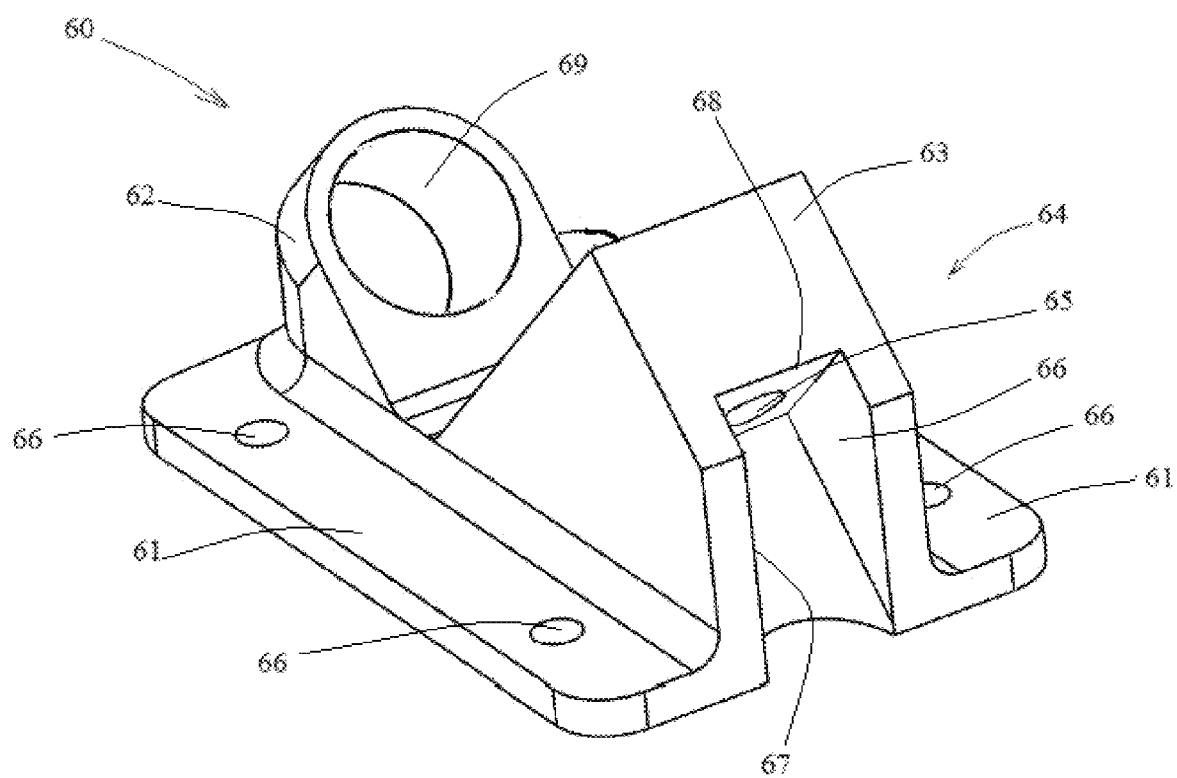
FIG. 6 is second perspective view of the base in accordance with the prior art.
Figure 7:
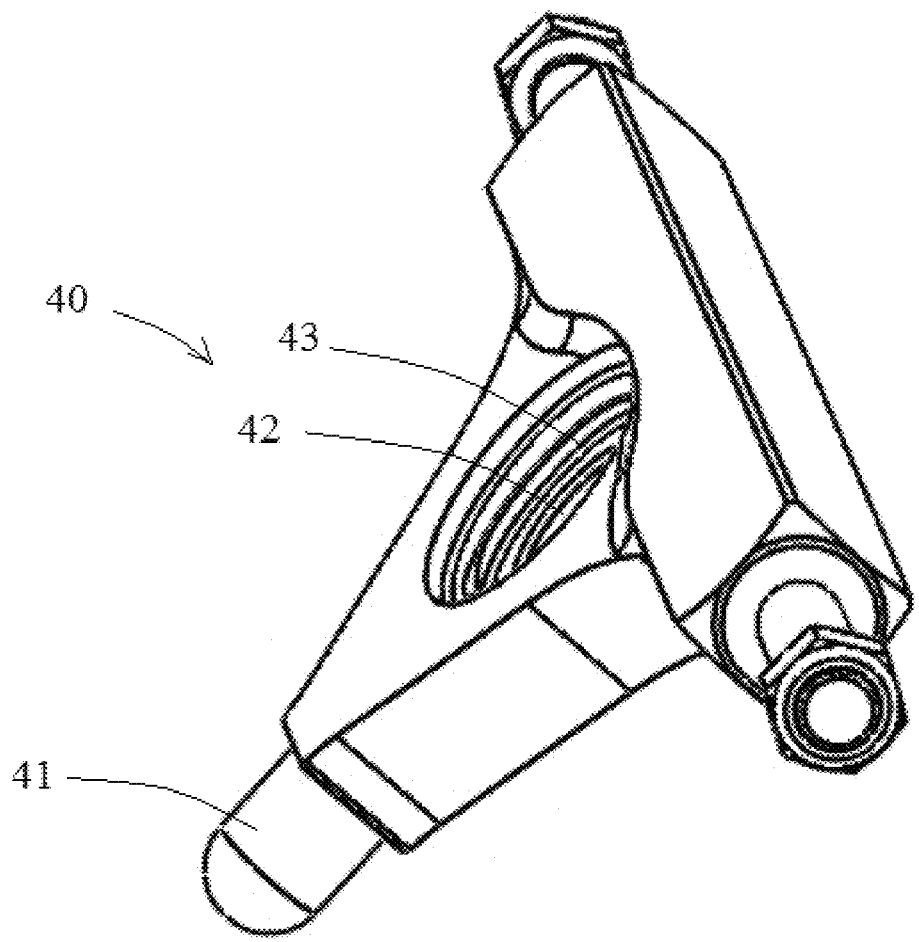
FIG. 7 is a perspective view of a hanger in accordance with the prior art.
Figure 8:
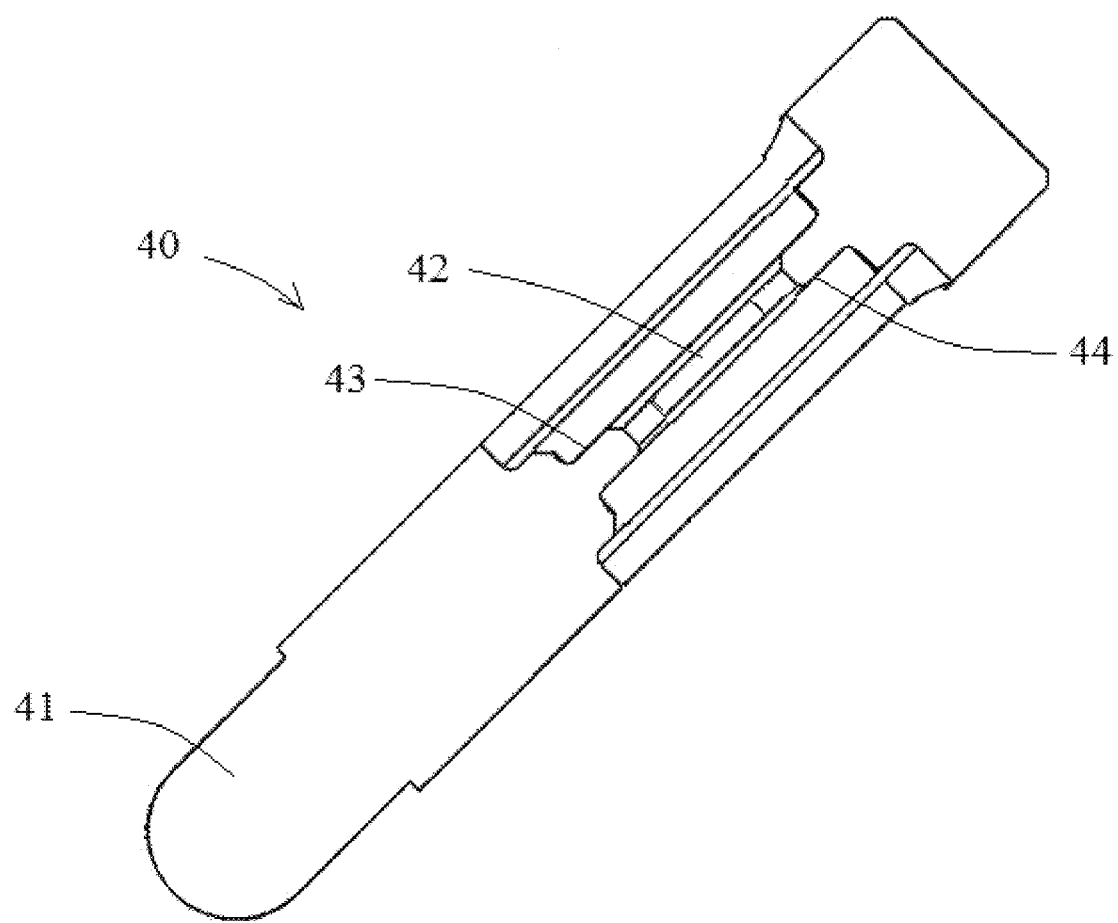
FIG. 8. is a section view of a hanger in accordance with the prior art.
Figure 9:
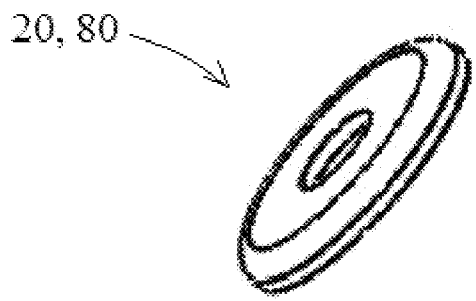
FIG. 9 represents three views of a cup washer in accordance with the prior art.
Figure 9:
Figure 9:
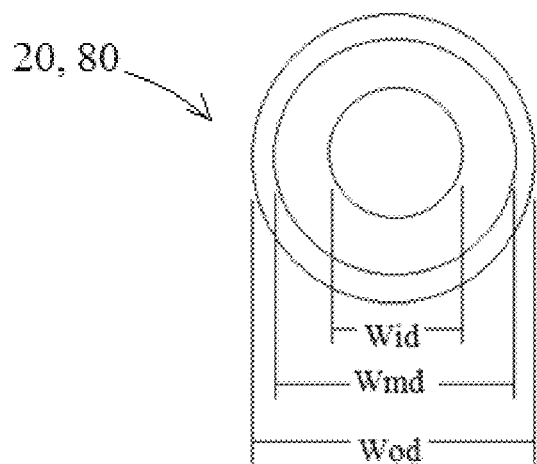
Figure 10:
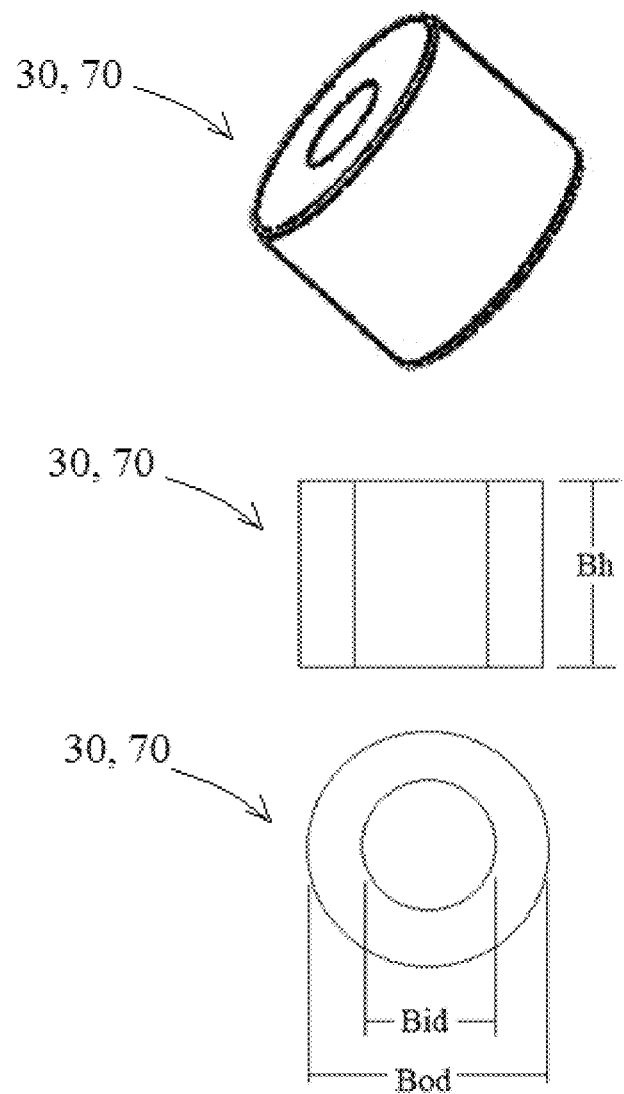
FIG. 10 represents three views of a bushing in accordance with the prior art.

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below", or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a sliding kingpin system usable for trucks or steering dampers for vehicles such as, but not limited to, skateboards, bicycles, and tricycles.

Figure 13:
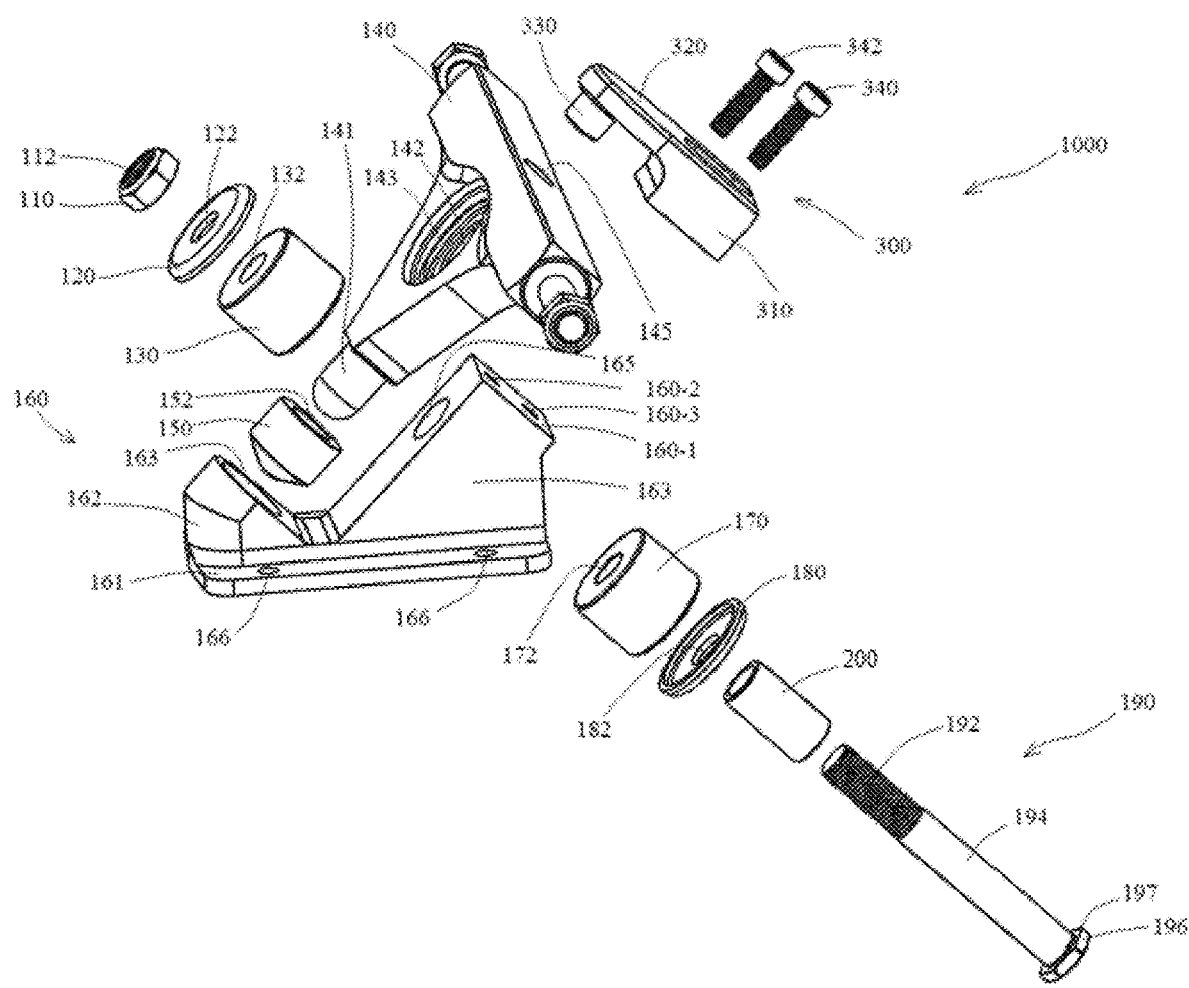
FIG. 13 is an exploded view of at truck in accordance with example embodiments.
Figure 14:
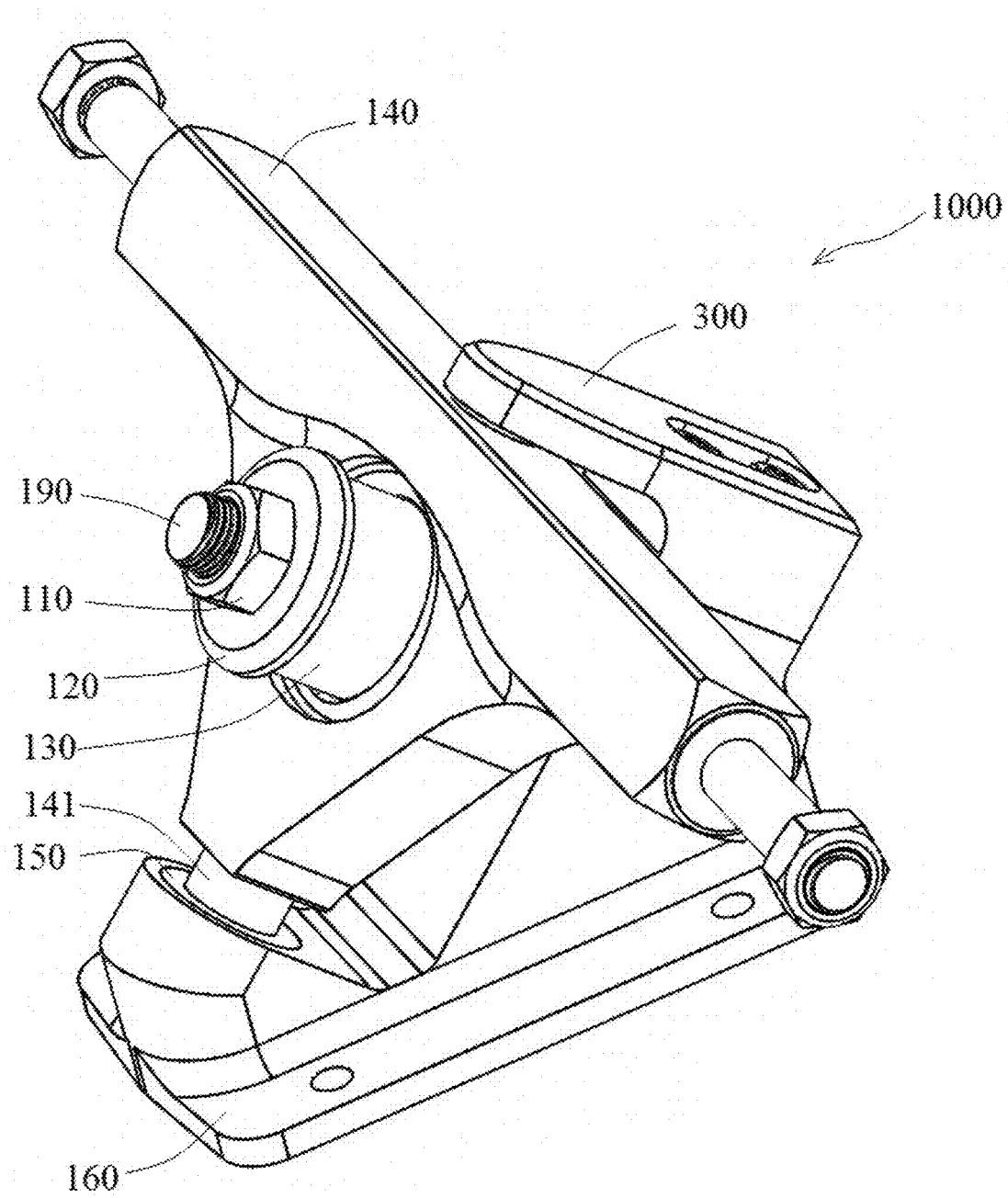
FIG. 14 is a perspective view of the truck in accordance with example embodiments.
Figure 15:
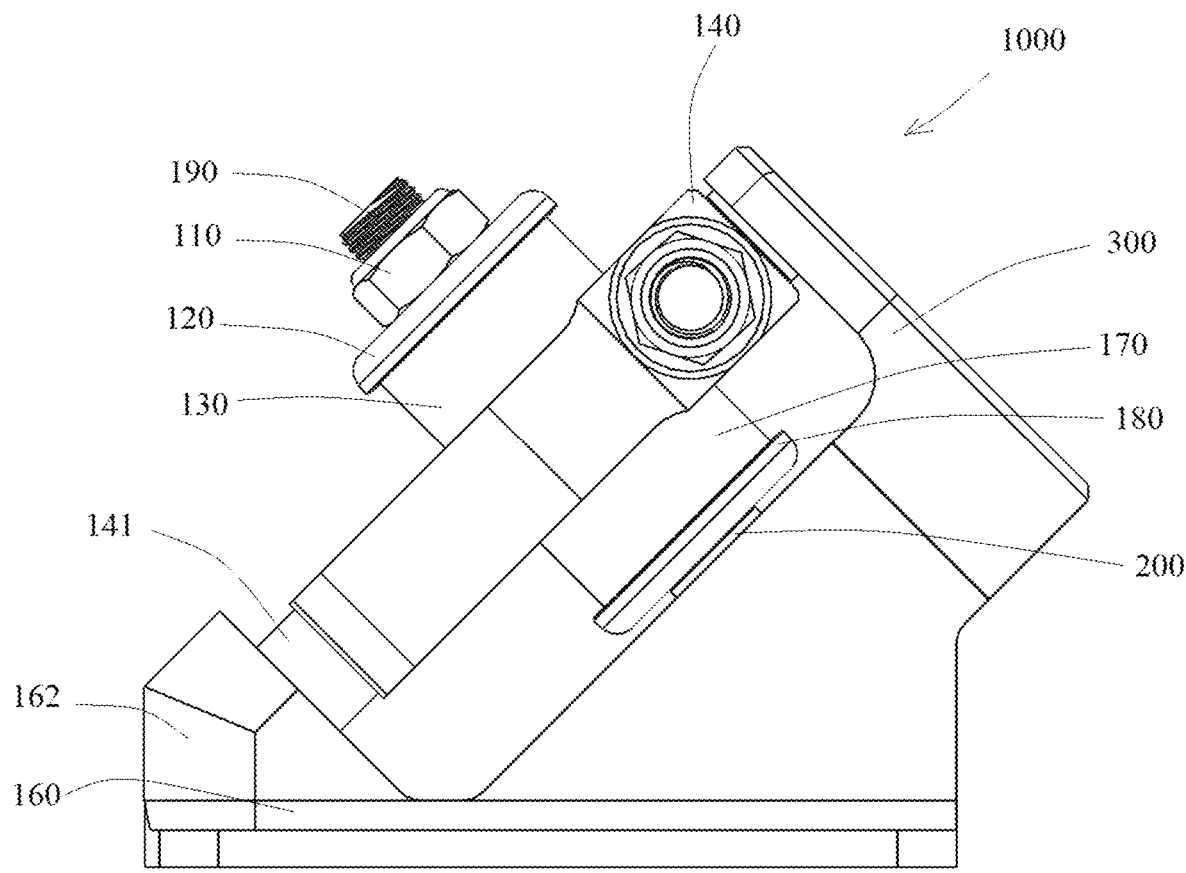
FIG. 15 is a side view of the truck in accordance with example embodiments.
Figure 16:
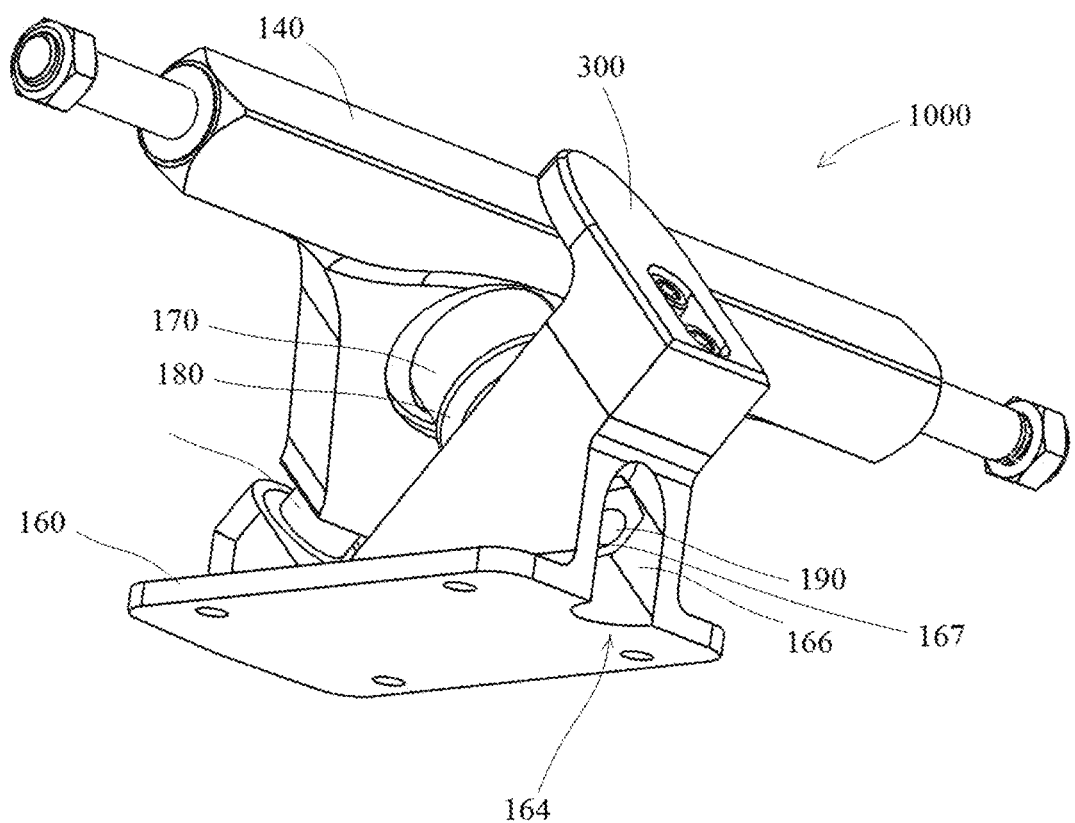
FIG. 16 is a back view of the truck in accordance with the example embodiments.
Figure 17:
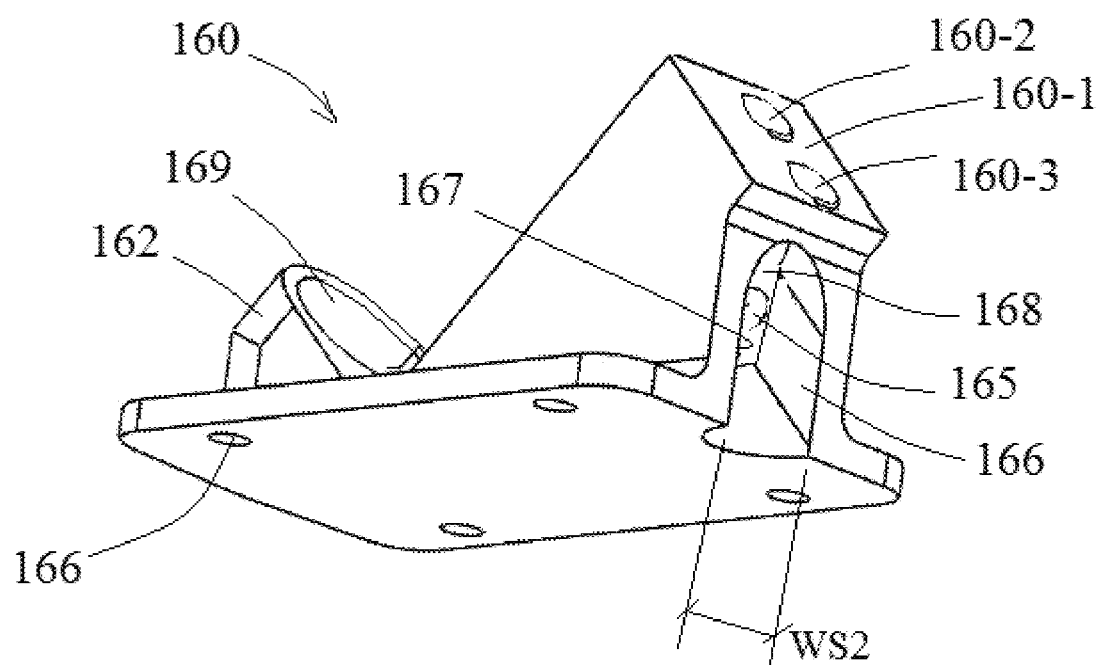
FIG. 17 is first perspective view of a base in accordance with example embodiments.
Figure 18:
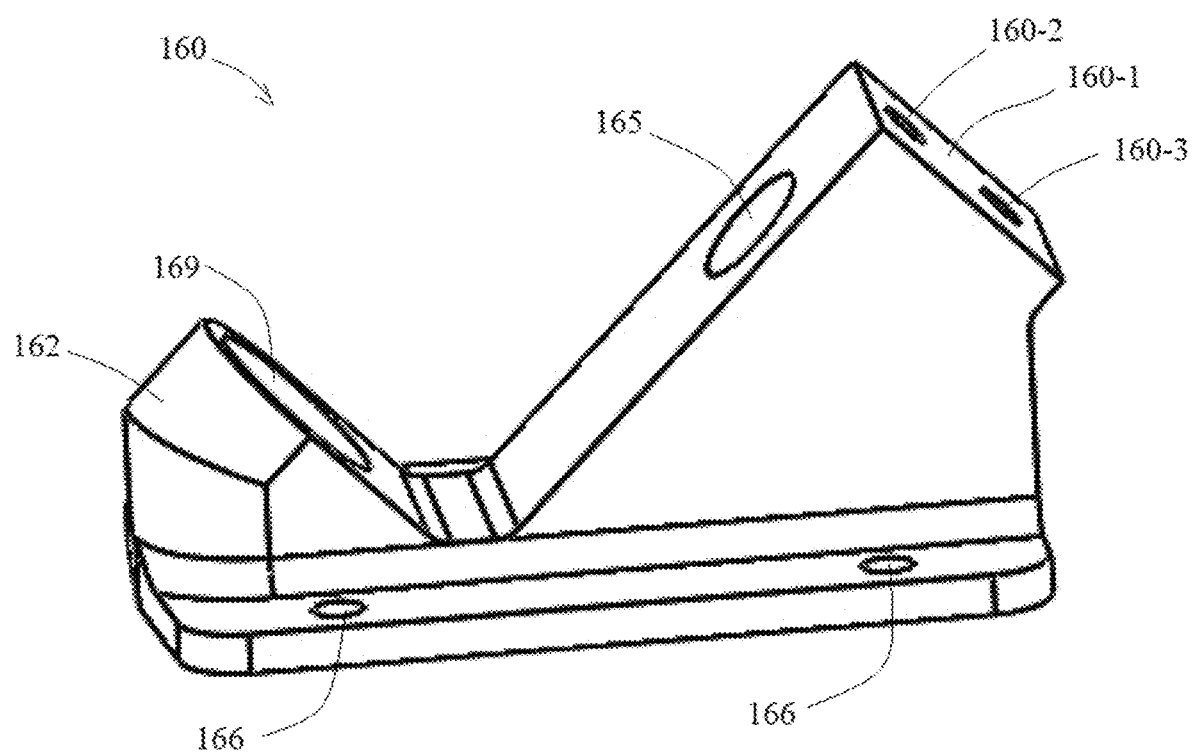
FIG. 18 is second perspective view of the base in accordance with example embodiments.
Figure 19:
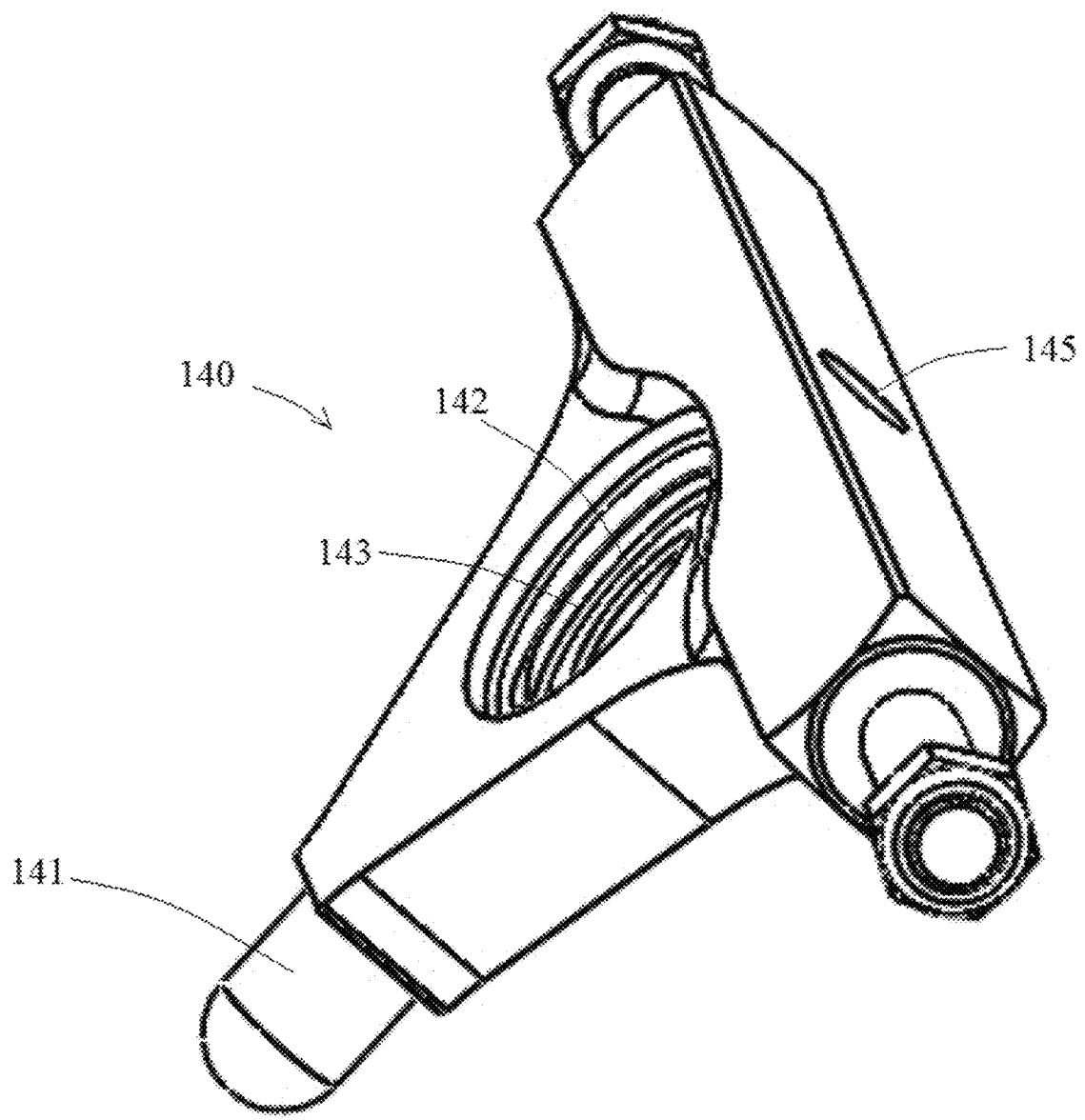
FIG. 19 is a perspective view of a hanger in accordance with example embodiments.
Figure 20:
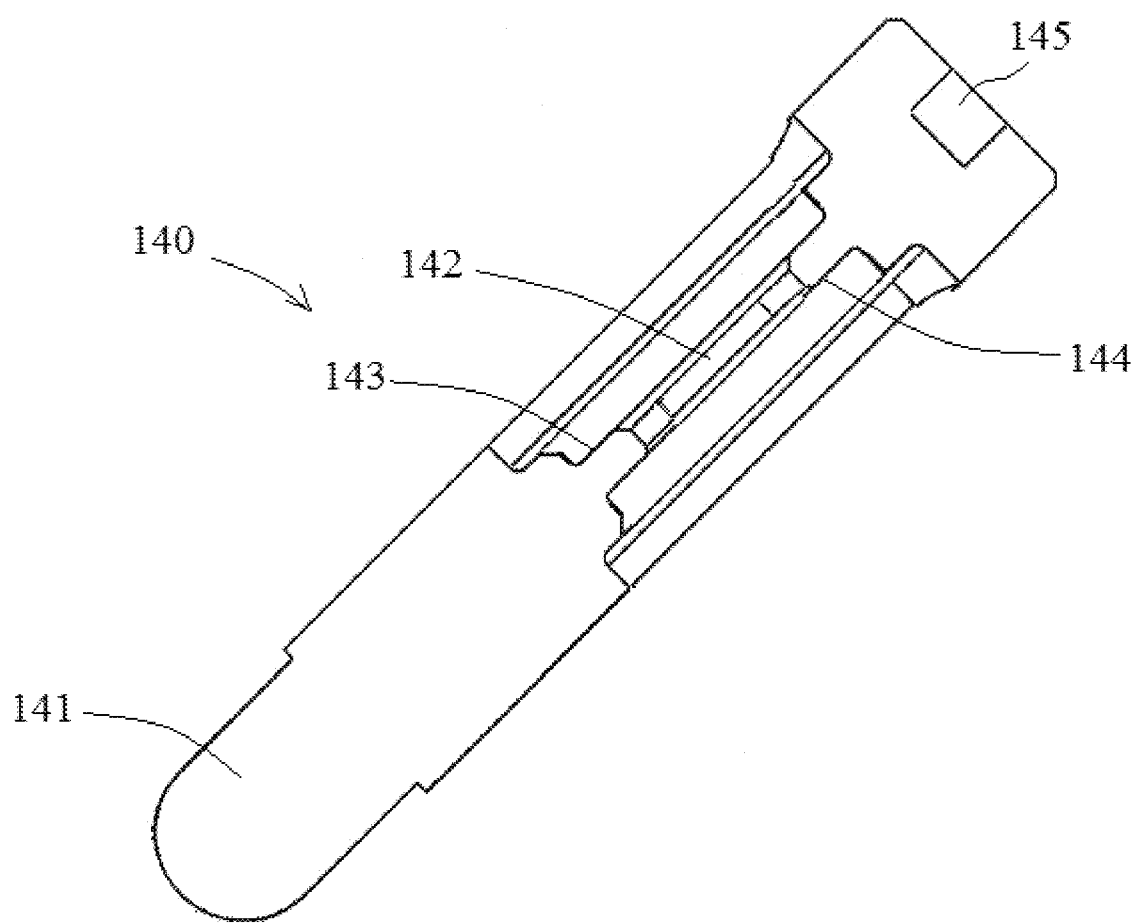
FIG. 20 represents three views of a cup washer in accordance with example embodiments.
Figure 21:
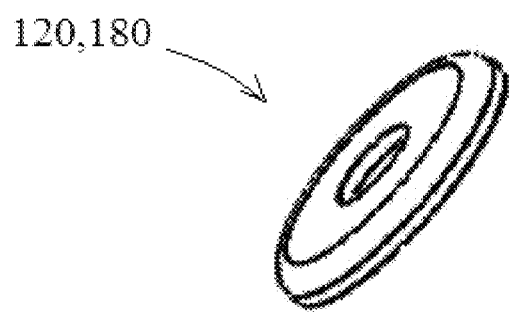
FIG. 21 represents three views of a bushing in accordance with the prior art.
Figure 22:
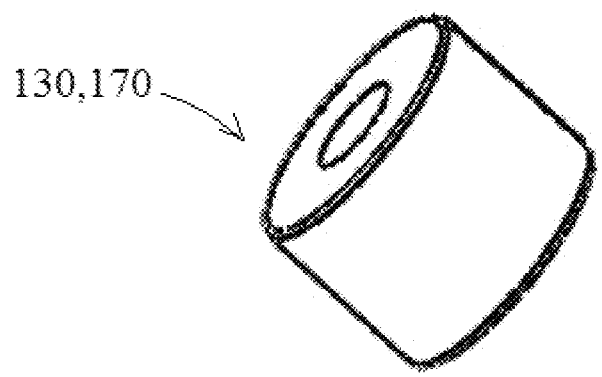
FIG. 22 represents a first cross-section view of the truck in accordance with the prior art.
Figure 22:
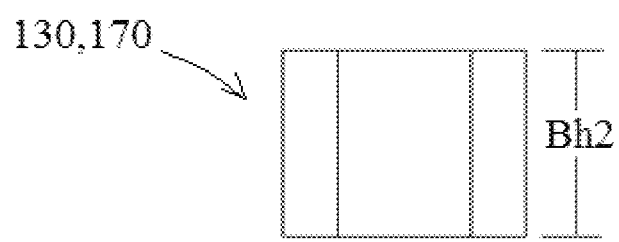
Figure 22:
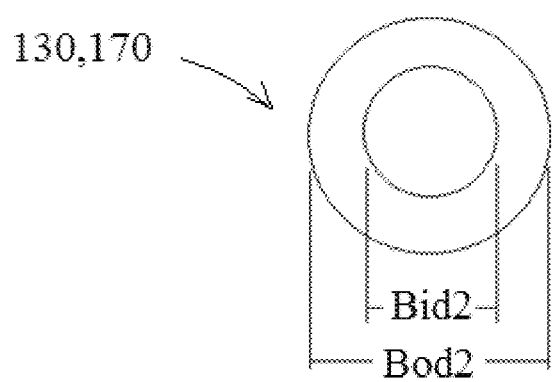
Figure 23:
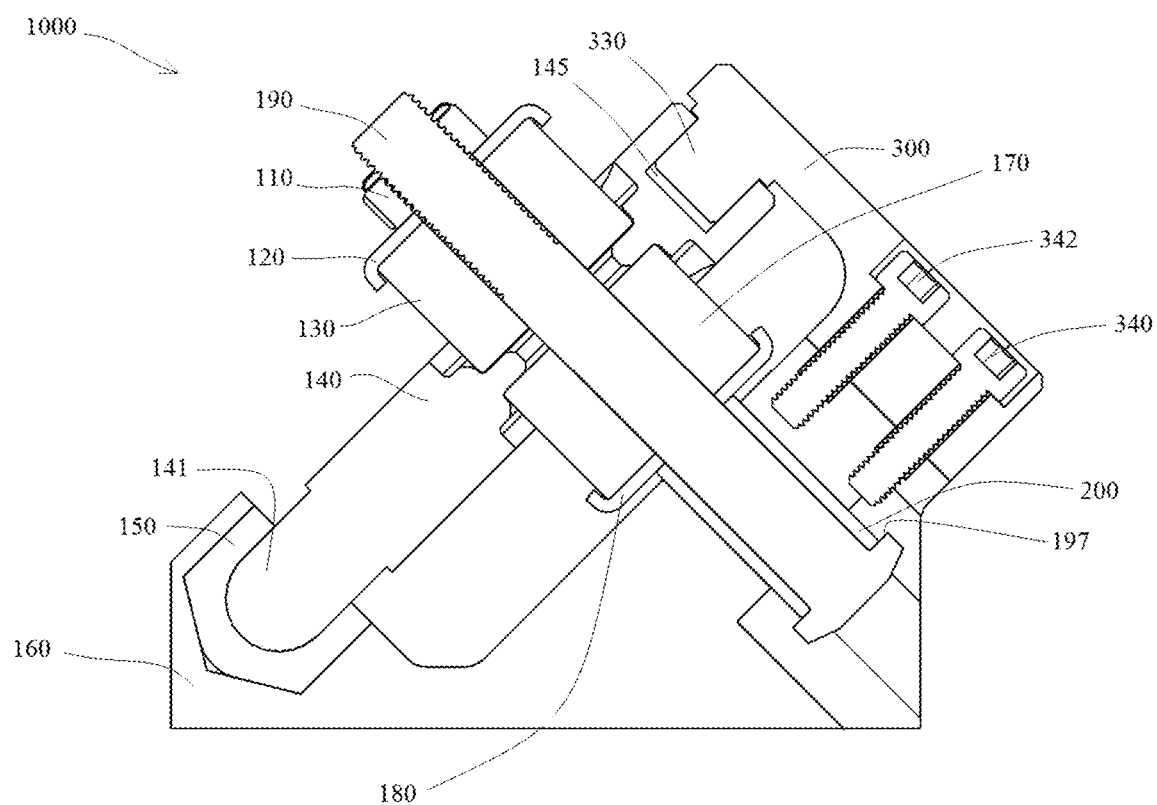
FIG. 23 represents a second cross-section view of the truck in accordance with example embodiments.

FIG. 13 is an exploded view of a truck 1000 in accordance with example embodiments. As one skilled in the art would understand, the truck 1000 may be mounted on the bottom of a skate board and may provide a certain amount of steering as a rider leans to one side of the skate board. The inventive truck 1000, however, is not limited to skate boards as the truck 1000 may be used with other vehicles which may find lean steering advantageous. For example, the truck 1000 may also be usable with other vehicles such as, but not limited to, tricycles, bicycles, and/or scooters. FIG. 14 is a perspective view of the truck 1000 in an assembled condition, FIG. 15 is a side view of the truck 1000 in the assembled condition, and FIG. 16 is a back view of the truck 1000 in the assembled condition. FIG. 23 is a section view of the truck 1000 in the assembled condition.

As shown in FIGS. 13-16, the truck 1000 generally includes a lock nut 110, a first cup washer 120, a first bushing 130, a hanger 140, a pivot cup 150, a base 160, a second bushing 170, second cup washer 180, and a kingpin 190. Much like the prior art, the lock nut 110 may be a standard locknut having a threaded inner surface 112 configured to engage threads 192 of the kingpin 190. The kingpin 190 may generally made of grade 8 hardened steel and may have a shaft 194 with the threaded end 192 and an end cap 196. The end cap 196 may be hexagonal in shape and may have three pairs of parallel edges. This, however, is not intended to be a limiting feature of the invention as the end cap 196 may alternatively have another shape such as, but not limited to, triangular, rectangular, octagonal or even elliptical in shape. As will be explained below, the kingpin 190 may pass through a channel 165 of the base 160 which passes through the base 160 and into a recess 164. The recess 164, in one embodiment, may be at least partly defined by a pair of walls 166 and 167 having a spacing WS2 slightly larger than a distance separating a pair of parallel edges of the of the end cap 196 of the kingpin 190 when the end cap 196 has a polygonal configuration. This geometry, in this nonlimiting example embodiment, allows the end cap 196 to reside in the recess 164, however, the walls 166 and 167 prevent the end cap 196 from rotating within the recess 164. The recess 164 may also include a surface 168 which exposes the channel 165 of the base 160 in the recessed area 164.

Like the prior art, the base 160 may include a pair of flanges 161 with one or more holes 166 to facilitate connecting the truck 1000 to a board or some other structure. The base 160 further includes a pivot recess structure 162 configured to receive the pivot cup 150. The pivot recess structure 162, for example, may be formed by drilling a cylindrical hole into a portion of the base 160 to form the pivot recess structure 162. The drilling operation may form a cylindrical recess 163 for receiving the pivot cup 150. The pivot cup 150 may be formed of a soft elastomer, for example, urethane. The pivot cup 150 may, in turn, have a cylindrical channel 152 which may be configured to receive a pivot shaft 141 of the hanger 140. The pivot shaft 141, as shown in FIG. 13, may resemble a cylindrical shaft having a dome shaped end and the pivot shaft 141 may rotate within the pivot cup 150. Like the prior art, the base 160 may further include a tower section 163 which may be associated with the recess 164. The tower section 163 may include the channel 165. The channel 165 may have a diameter large enough to accommodate a pivot bushing 200 through which the kingpin 190 may pass. For example, if the cross-section of the kingpin 190 has a diameter of about ⅜", the channel 165 may resemble a circular channel having a diameter of about ⅜" plus two times the wall thickness of the pivot bushing 200 or slightly larger. For example, if the diameter of the kingpin is ⅜" and the pivot bushing 200 has a wall thickness of 1/16", the diameter of the channel 165 may be about ½" or slightly larger to allow the pivot bushing 200 to slide therein (noting in this case the inner diameter of pivot bushing 200 is ⅜" or slightly larger to accommodate the kingpin 190 and the outer diameter is 0.5" or slightly larger since the wall thickness is 1/16"). In example embodiments, the pivot bushing 200 may be free to slide through the channel 165. The pivot bushing 200 is part of a sliding king pin system which is necessary for the reasons set forth below.

In example embodiments, the base 160 may include a mating surface 160-1 which may interface with a pivot arm 300. The pivot arm 300 may resemble an L-shaped member having a pivot arm base 310 attachable to the mating surface 160-1, an arm 320 extending from the base 310, and a pin 330 extending from the arm 320. In example embodiments, the pin 330 may insert into an aperture 145 of the hanger 140. The pivot arm 300 may be attached to the base 160 in several ways. In one nonlimiting example embodiment, the base 160 includes a pair of threaded holes 160-2 and 160-3 and the base 310 may include a pair of holes alignable with the threaded holes 160-2 and 160-3. A pair of fasteners 340 and 342 may be used to connect the pivot arm 300 to the base 160. For example, the holes of the pivot arm 300 may have diameters large enough to accommodate the threaded shafts of pair of fasteners 340 and 342 but small enough to prevent the heads of the fasteners 340 and 342 to pass therethrough. Threaded ends of the fasteners 340 and 342 may screw into the threaded holes 160-2 and 160-3 in order to connect the pivot arm 300 to the base 160.

Like the prior art, the hanger 140 may have an aperture 142 that allows the kingpin 190 to pass through. For example, if the cross-section of the kingpin is about ⅜", the aperture 142 of the hanger 140 may be about ⅜" or slightly larger to accommodate the kingpin 190 and allow the kingpin 190 to pass through the hanger 140. In example embodiments, the hanger 140 may include a pair of recessed areas 143 and 144 around the aperture 142. The recessed areas 143 and 144 may act as bushing seats to receive the bushings 130 and 170. For example, FIG. 13 clearly shows a bushing seat 143 to receive the first bushing 130. One skilled in the art would understand bushing seat 144 on the opposite side of the hanger 140 would receive the second bushing 170.

Unlike the prior art, the hanger 140 may further include the aperture 145 configured to receive the pin 330 of the pivot arm 300. When the pivot arm 300 is connected to the base 160 the hanger 140 is supported by the pivot cup 150 at one end of the hanger 140 and at the other end of the hanger 140 by the pin 330. The pivot arm 300 is configured so that the axis of rotation of the hanger 300 passes through the both the pivot cup 150 and the pin 330. One skilled in the art would understand a fundamental difference between truck 100 and truck 1000. In truck 100 the axis of rotation of the hanger 40 changes as the locknut 10 is tightened. In truck 1000, the axis of rotation of the hanger 140 is fixed by the pivot cup 150 and the pin 330. Thus, the axis of rotation of the hanger 140 does not change as the locknut 110 is tightened. This presents a significant advantage over the prior art since the truck 1000 of example embodiments has a more consistent axis of rotation which leads to a more consistent configuration for a rider.

Like the prior art, the bushings 130 and 170 may be cylindrical bushings having a height $Bh2$, an inner diameter $Bid2$, and an outer diameter $Bod2$. The inner diameter may be large enough to accommodate the kingpin 190. For example, if the kingpin 190 has a diameter of about ⅜", the inner diameter of the bushing $Bid2$ may be about ⅜" or slightly larger. The bushings 130 and 170 may be made of a resilient material, for example, urethane, to absorb various forces applied thereto while retaining the ability to return to an original configuration. Although the instant example illustrates the bushings 130 and 170 as being cylindrical, other types of bushings may be used. For example, rather than being cylindrical bushings, bushings 130 and 170 may have a different shape such as, but not limited to, hourglass, conical, stim, chubby, and randal.

In example embodiments, the cup washers 120 and 180 may resemble disks having an inner diameter $Wid2$ and an outer diameter $Wod2$. The inner diameter of the cup washers 120 and 180 may be about the same as the outer diameter of the kingpin 190 to allow the kingpin 190 to pass through. For example, if the outer diameter of the kingpin 190 is ⅜", the inner diameter of the cup washers $Wid2$ may be about ⅜" or slightly larger. This allows the kingpin 190 to pass through the cup washers 120 and 180. Like the prior art, the edges of the cup washers 120 and 180 may form a flange having an inner diameter of $Wmd2$. Like the prior art, the inner diameter of the flanged section $Wmd2$ may be generally about the same size, or slightly larger than, the outer diameter $Bod2$ of the bushings 130 and 170. This allows the cup washers 120 and 130 to partially capture ends of the bushings 130 and 170.

In example embodiments, the introduction of the pivot arm 300 calls for a further inventive modification of the prior art. For example, in the prior art, as the lock nut 10 is rotated the kingpin 90 is placed in tension and the bushings 30 and 70 are placed in compression as the first bushing 30 is moved towards the base 60. However, in the truck 1000 of example embodiments, if the conventional locknut 10, first cup washer 20, first bushing 30, hanger 40, second bushing 70, second cup washer 80, and king pin 90 were used, because the hanger 140 is pivotally supported at two ends, a rotation of the locknut 10 would cause the first cup washer 20 to press against the first bushing 30 which would press against the hanger 140. However, because the hanger 140 is prevented from hinging by the pivot arm 300, the second bushing 170 may not be placed in the same compressive state as the first bushing 130 since the pivot arm 300 generally prevents movement of the hanger 140 towards the base 160. To compensate for this problem the inventor has created a sliding kingpin system which includes the pivot bushing 200.

Figure 11:
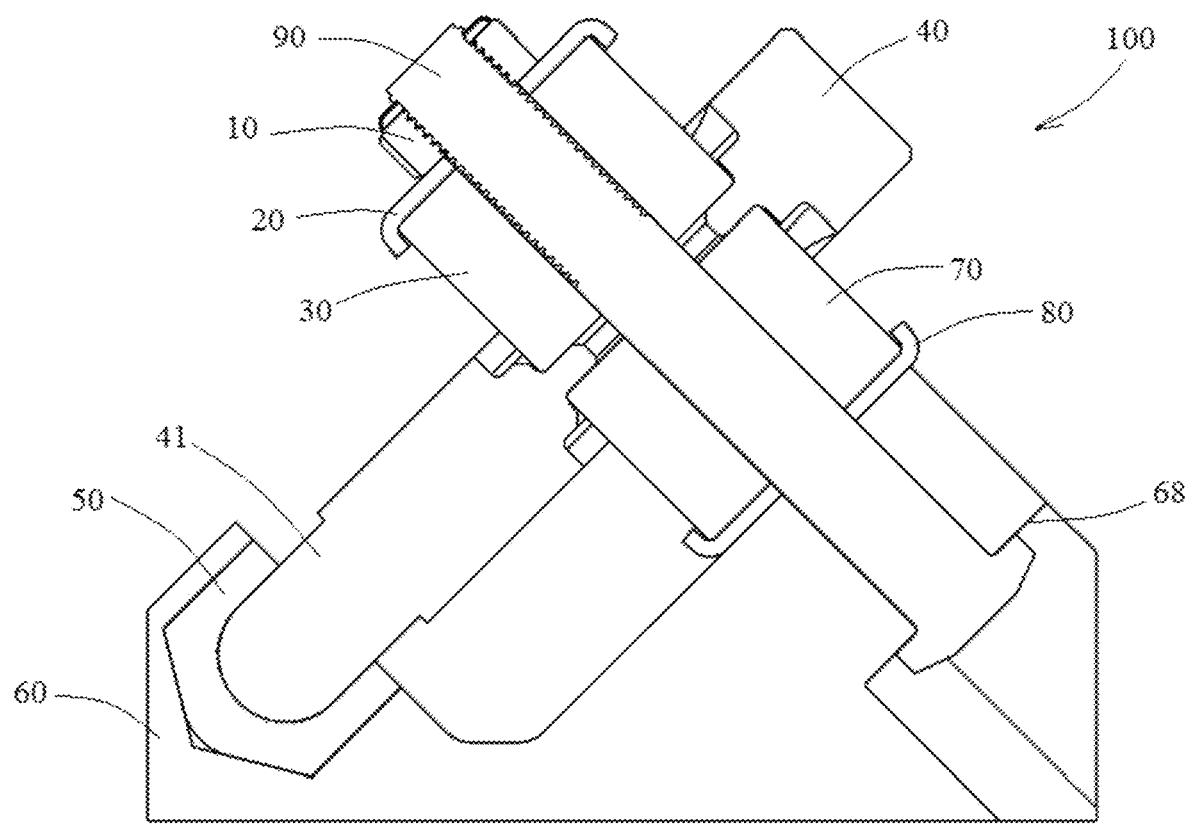
FIG. 11 represents a first cross-section view of the truck in accordance with the prior art.
Figure 12:
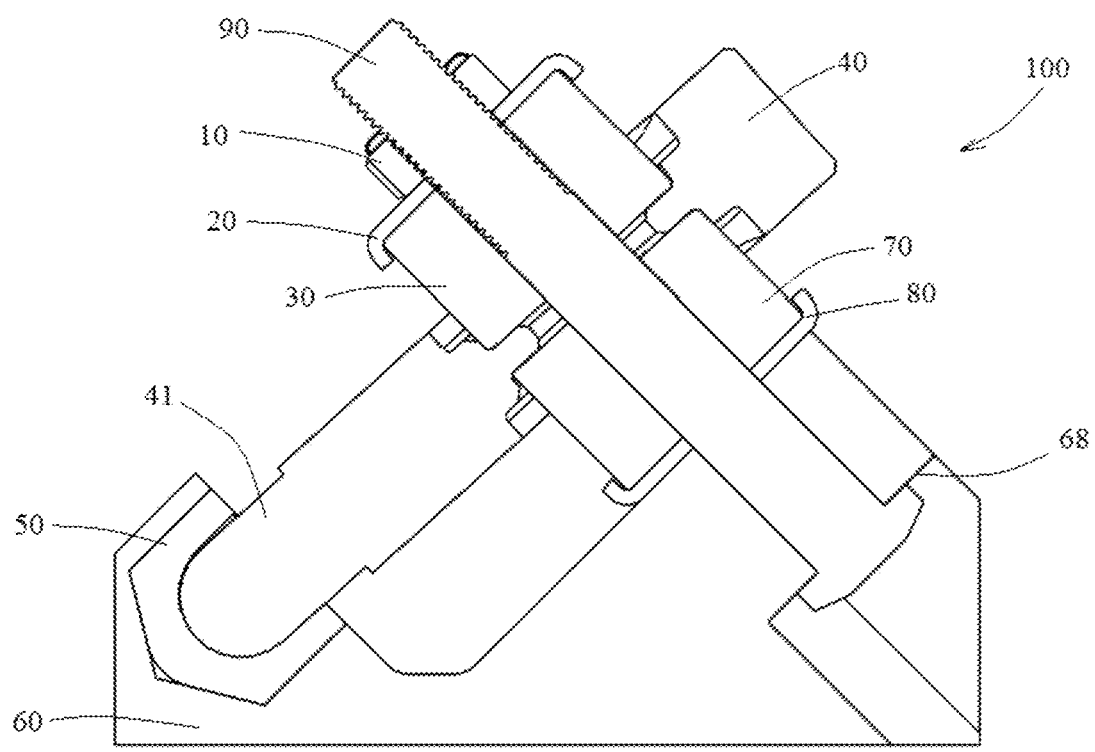
FIG. 12 represents a second cross-section view of the truck in accordance with the prior art.
Figure 24:
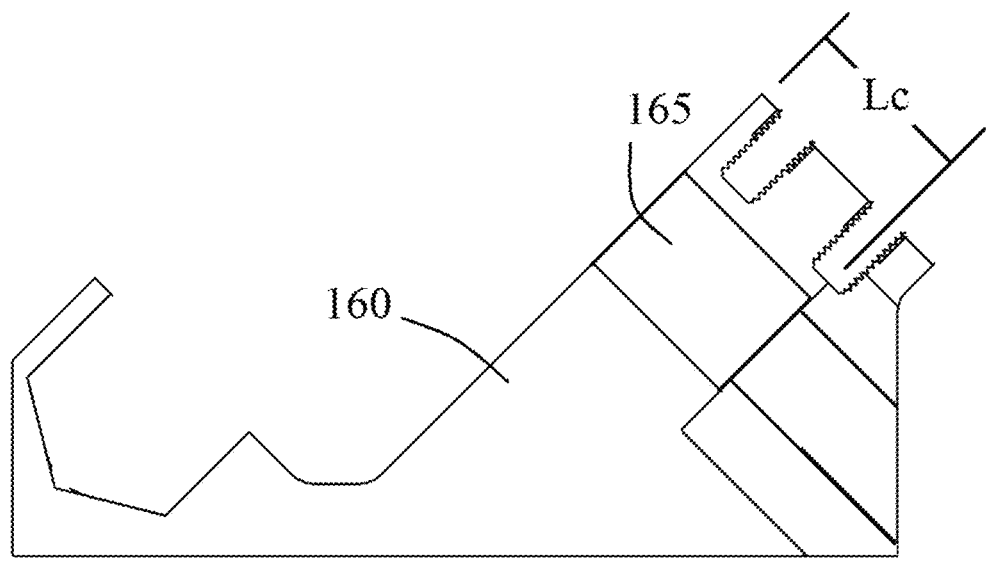
FIG. 24 represents a cross section of a base in accordance with example embodiments.
Figure 25:
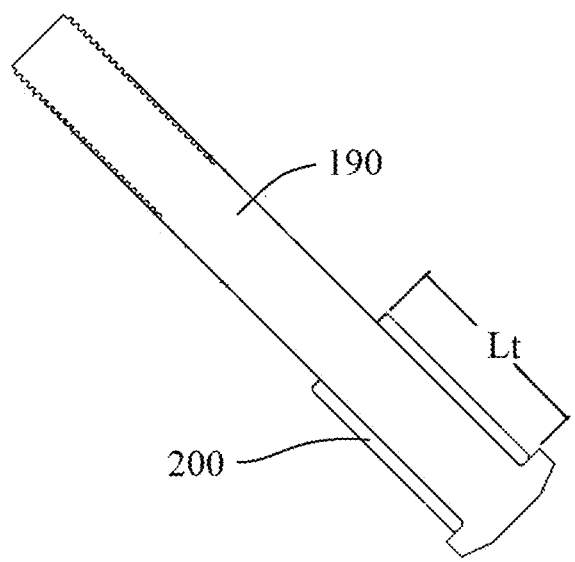
FIG. 25 represents a kingpin in a pivot bushing in accordance with example embodiments.
Figure 26:
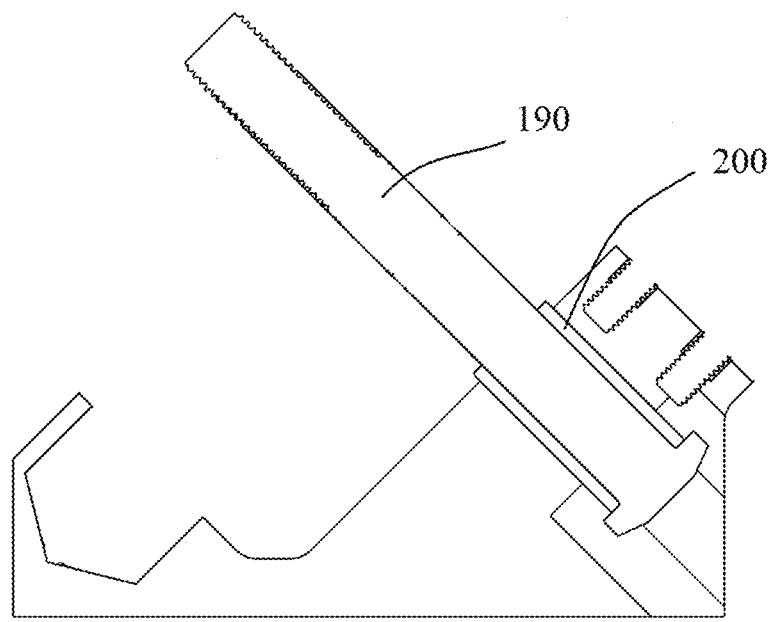
FIG. 26 represents a kingpin in a pivot bushing residing in an aperture of the base in accordance with example embodiments.
Figure 27:
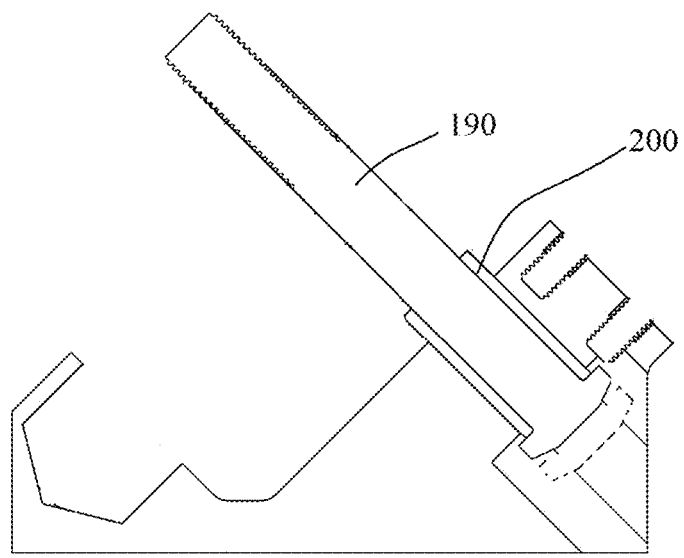
FIG. 27 illustrates the kingpin and pivot bushing being slidable in the aperture of the base in accordance with example embodiments.

In the prior art, the truck 100 is assembled by inserting the kingpin 90 through the aperture 65 of the base 60 until the bearing surface 97 of the end cap 96 bears against a bearing surface 68 of the baseplate 60 as shown in FIG. 11. The truck 1000 of example embodiments is somewhat different. In example embodiments the pivot bushing 200 is inserted into the channel 165 and the pivot bushing 200 is always longer than the channel 165. The pivot bushing 200, for example, may have a length Lt and the channel 165 may have a length Lc which is shorter than the length Lt of the pivot bushing 200. FIG. 24, for example, shows a cross-section of the base 160 showing that the length of the channel 165 is Lc. FIG. 25 is a cross-section of the kingpin 190 passing through the pivot bushing 200 with the pivot bushing 200 having the length Lt. FIG. 26 illustrates the kingpin 190 and pivot bushing 200 penetrating the channel 165 and FIG. 26 illustrates that the pivot bushing 200 can slide through the channel 165. In one useful embodiment, the pivot bushing 200 is about ¼" longer than the channel 165, however, limiting the difference in length to ¼" is merely for the purpose of illustration as is not meant to limit the invention.

In example embodiments, the kingpin 90 is inserted through the pivot bushing 200 until its bearing surface 197 contacts an end of the pivot bushing 200, noting that the inner diameter of the pivot bushing 200 is large enough to allow the shaft 194 of the kingpin 190 to pass through but small enough to prevent the end cap 196 from passing through. The pivot bushing 200 and kingpin 190 may thereafter be inserted through the channel 165 of the base as shown in at least FIG. 26. Thus, one difference between the prior art truck 100 and the truck in accordance with an example of the invention is that the bearing surface 97 of truck 100's kingpin 90 generally directly contacts a bearing surface of the base 60, whereas the bearing surface 197 of truck 1000's kingpin 190 generally contacts an end of the pivot bushing 200 (noting that structures such as washers may be present between the bearing surface 197 and an end of the pivot bushing 200).

Figure 28:
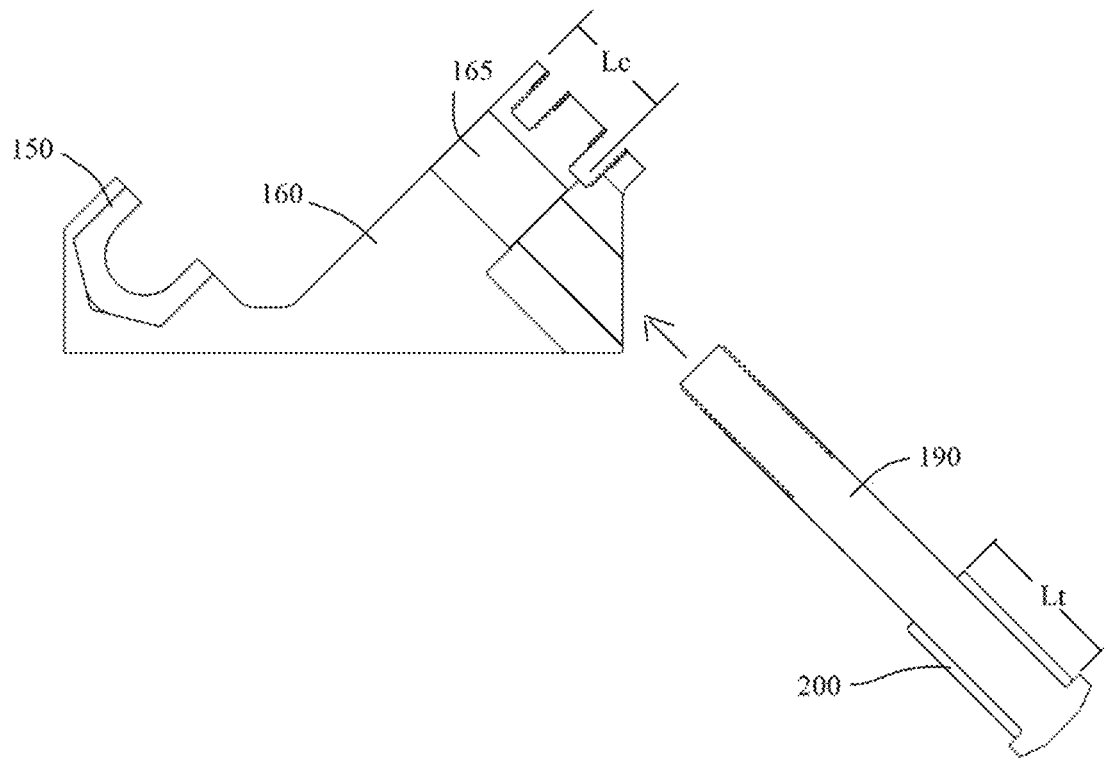
FIG. 28 illustrates a kingpin and a pivot bushing being inserted into a base in accordance with example embodiments.
Figure 29:
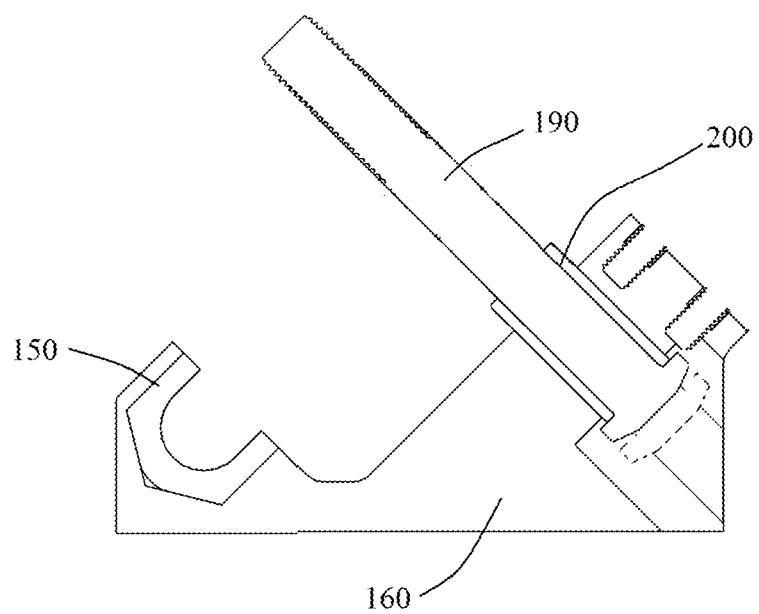
FIG. 29 illustrates the kingpin and the pivot bushing in the base in accordance with example embodiments.
Figure 30:
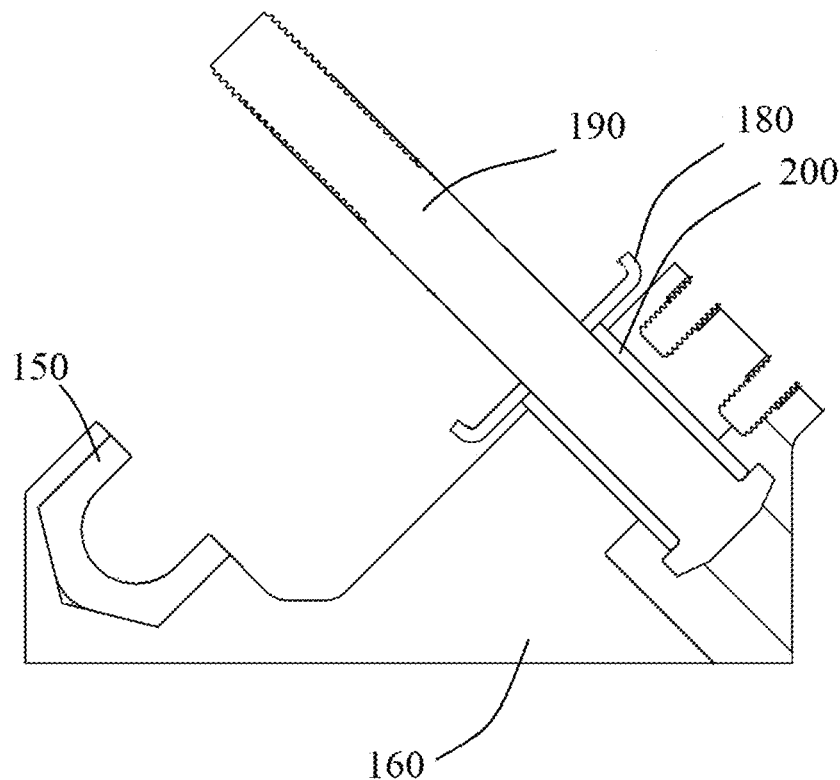
FIG. 30 illustrates a cup washer being positioned on a kingpin in accordance with example embodiments.
Figure 31:
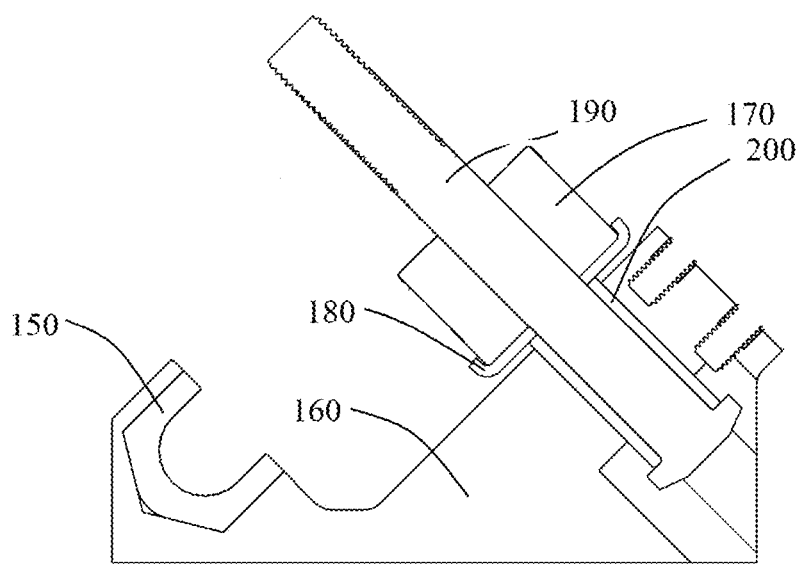
FIG. 31 illustrates a bushing being positioned on a kingpin in accordance with example embodiments.
Figure 32:
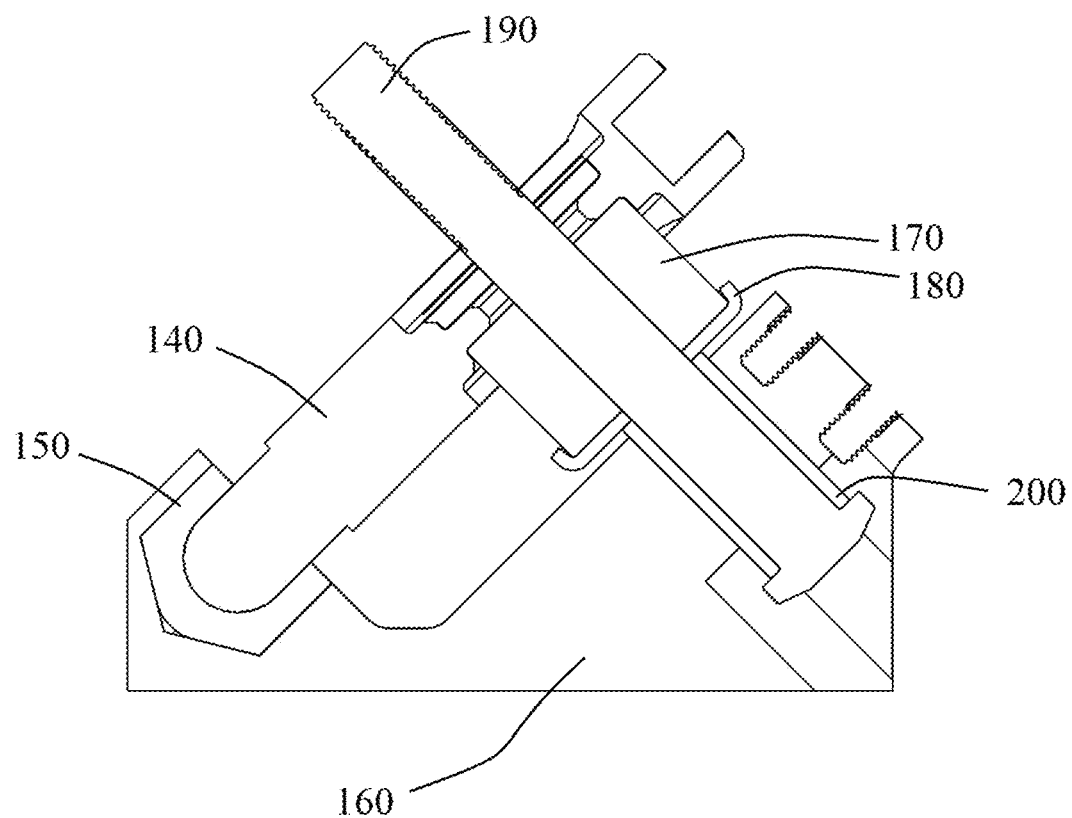
FIG. 32 illustrates a hanger being placed on the kingpin in accordance with example embodiments.
Figure 33:
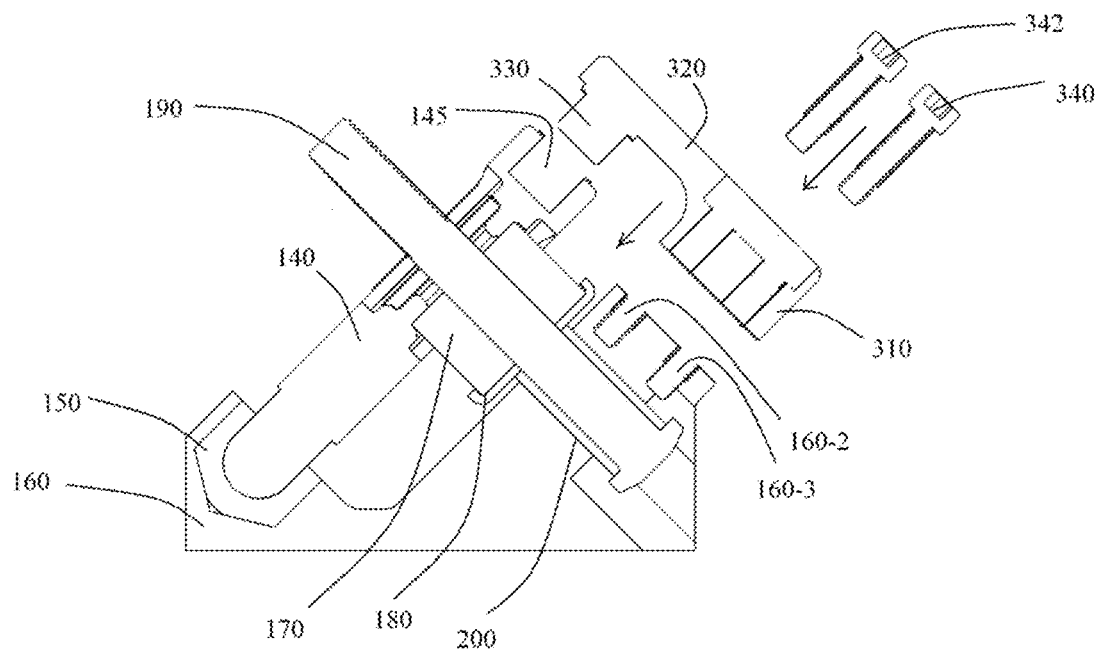
FIG. 33 illustrates a pivot arm brought near a base in accordance with example embodiments.
Figure 34:
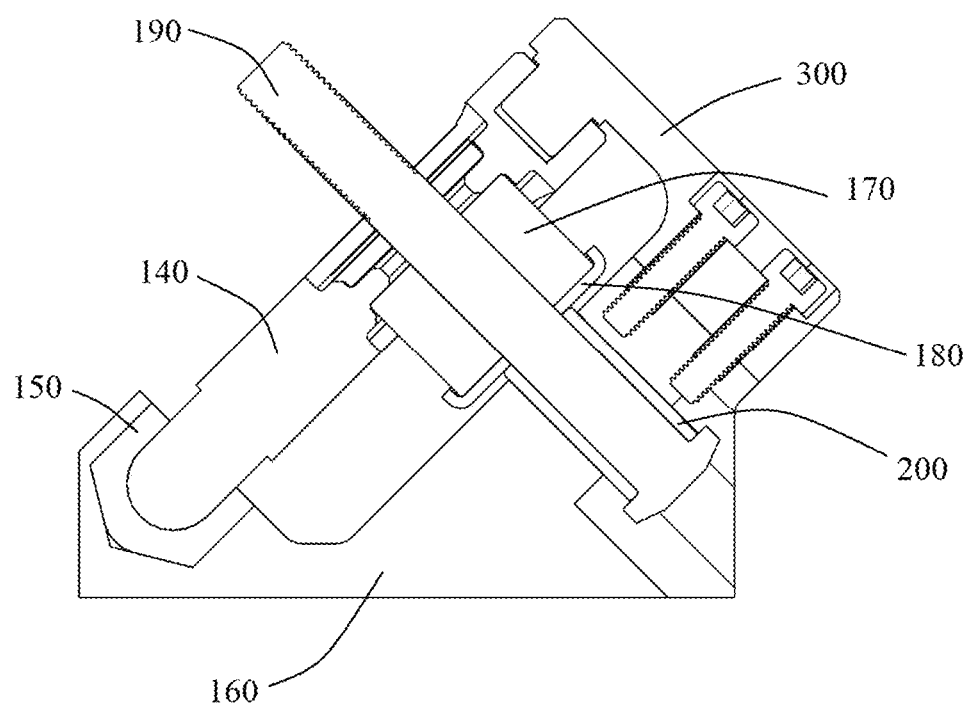
FIG. 34 illustrates the pivot arm attached to the base in accordance with example embodiments.
Figure 35:
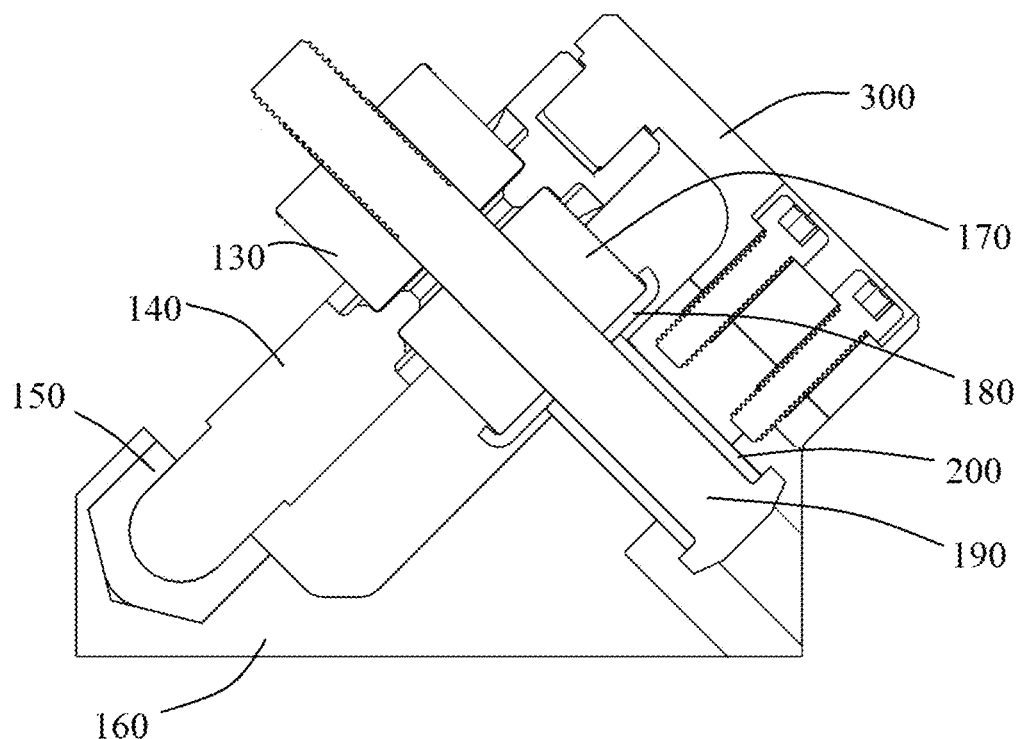
FIG. 35 illustrates a bushing being placed on the kingpin in accordance with example embodiments.
Figure 36:
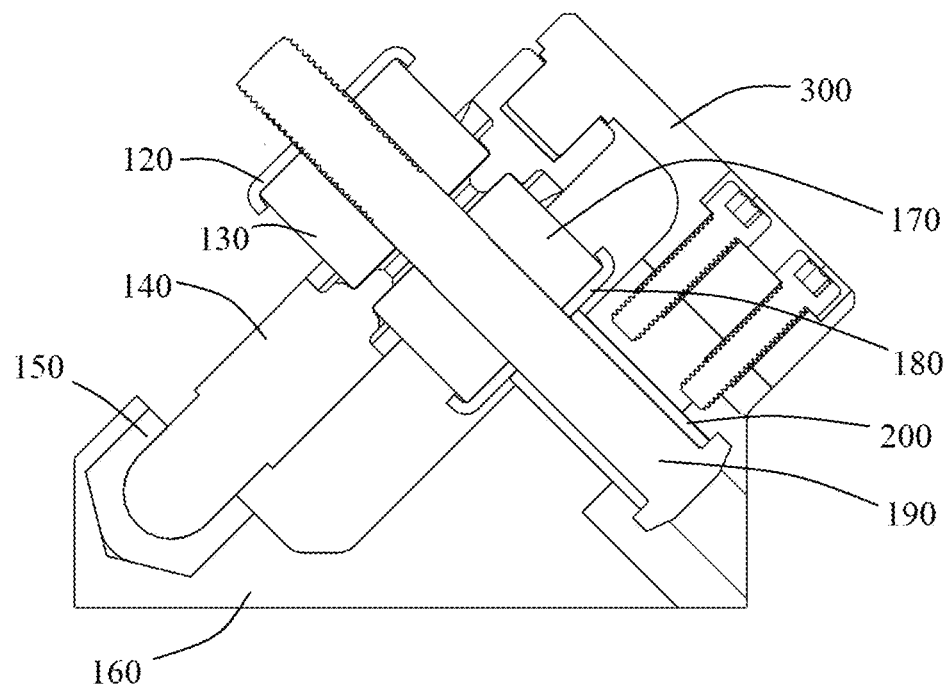
FIG. 36 illustrates a cup washer being placed on the kingpin in accordance with example embodiments.
Figure 37:
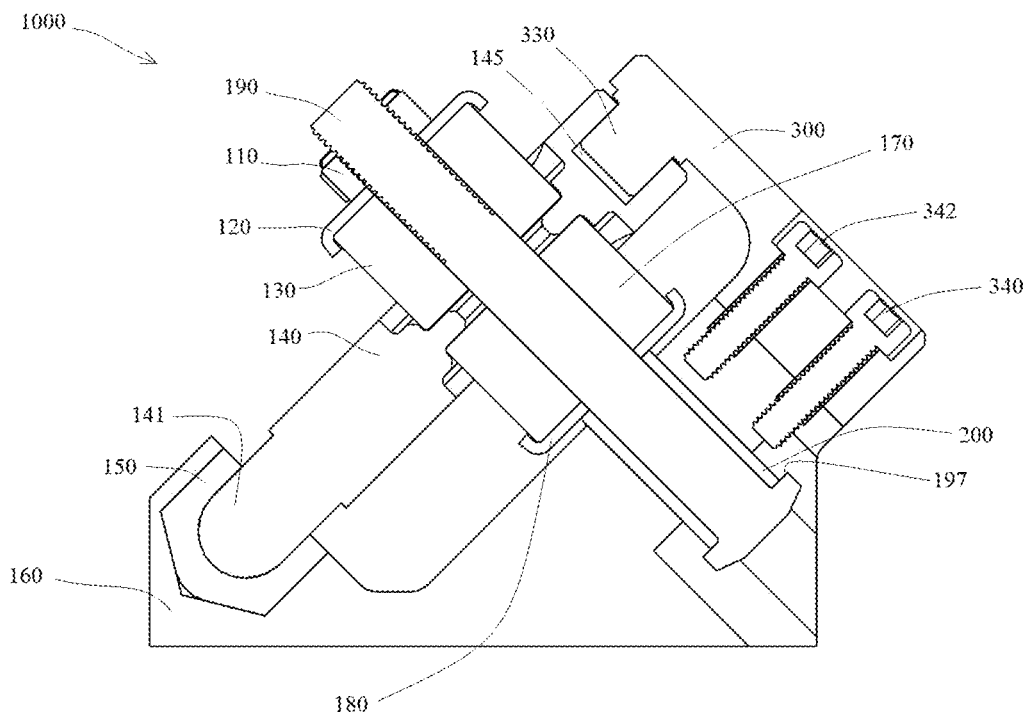
FIG. 37 illustrates a lock washer engaging the kingpin in accordance with example embodiments.

Truck 1000 may be assembled by the following steps. First, kingpin 190 may be slid into pivot bushing 200 as shown in FIG. 28. The pivot bushing 200 and kingpin 190 may thereafter inserted into the channel 165 of the base 160 as shown in FIG. 29. Thereafter, the second cup washer 180 may be aligned with the kingpin 190 so that the aperture 182 of the cup washer 180 aligns with the kingpin 190, this allows the second cup washer 80 to be moved along the kingpin 90 resulting in the kingpin 90 penetrating aperture 182 the second cup washer 80 as shown in FIG. 30. Thereafter, the second bushing 170 is aligned with the kingpin 190 so that the aperture 172 of the second bushing 170 is aligned with the kingpin 190, this allows the second bushing 170 to be moved along the kingpin 190 resulting in the kingpin 190 penetrating the aperture 172 of the second bushing 170 as shown in FIG. 31. Thereafter, the hanger 140 is moved so that the pivot shaft 141 is inserted into the pivot cup 150 which was previously placed in the pivot recess structure 162. At the same time the hanger 140 is arranged so that the aperture 142 is aligned with the kingpin 190 so that the hanger 140 moves down along the king pin 190 resulting in the kingpin 190 penetrating the aperture 142 of the hanger 140 as shown in FIG. 32. Thereafter, pivot arm 300 may be brought near the hanger 140, as shown in FIG. 33, to insert the pin 330 in to the aperture 145 of the hanger 40. In this operation, the base 310 of the pivot arm 300 may be arranged so that apertures extending therethrough align with the apertures 160-2 and 160-3 of the mating surface 160-1 of the base 160. The fasteners 340 and 342 may then be used to secure the pivot arm 300 to the base 160 as shown in FIG. 34. Thereafter, the first bushing 130 may be aligned with the kingpin 190 so that the aperture 132 of the first bushing 130 is aligned with the kingpin 90, this allows the first bushing 130 to move along the kingpin 190 resulting in the kingpin 190 penetrating the aperture 132 of the first bushing 130. In this step the first bushing 130 is moved until it reaches the bushing seat 143 of the hanger 140 as shown in FIG. 35. Thereafter, the first cup washer 120 is aligned with the kingpin 190 so that the aperture 122 of the cup washer 120 is aligned with the kingpin 190, this allows the first cup washer 120 to move along the kingpin 190 resulting in the kingpin 190 penetrating the aperture 122 of the first cup washer 20 as shown in FIG. 36. In this step the cup washer 120 is moved until it reaches the first the bushing 130. After the first cup washer 120 is placed over the first bushing 130 the threaded end 192 of the kingpin 190 is exposed and the lock washer 110 is screwed onto the threaded end 190 of the kingpin 190 to secure the structure. These operations result in the truck 1000 assembled as shown in at least FIG. 37.

As one skilled in the art would understand, as the locknut 110 is turned, the locknut 110 presses against the first cup washer 120 which presses against the first bushing 130 which in turn presses against the hanger 140. At the same time, the bearing surface 197 of the kingpin 190 exerts a force against the pivot bushing 200 which in turn exerts a force against the second cup washer 180 which in turn presses against the second bushing 170 which in turn presses against the hanger 140. As one familiar with basic statics would understand, the compression experienced by the first bushing 130 may be about the same as the compression experienced by the second bushing 140 as the locknut 10. Thus, the sliding kingpin assembly designed by the inventor solves the problem of unequal compression experienced by bushings in a conventional truck if the conventional truck's hanger were simply modified to be pivotally supported at two points.

Figure 38:
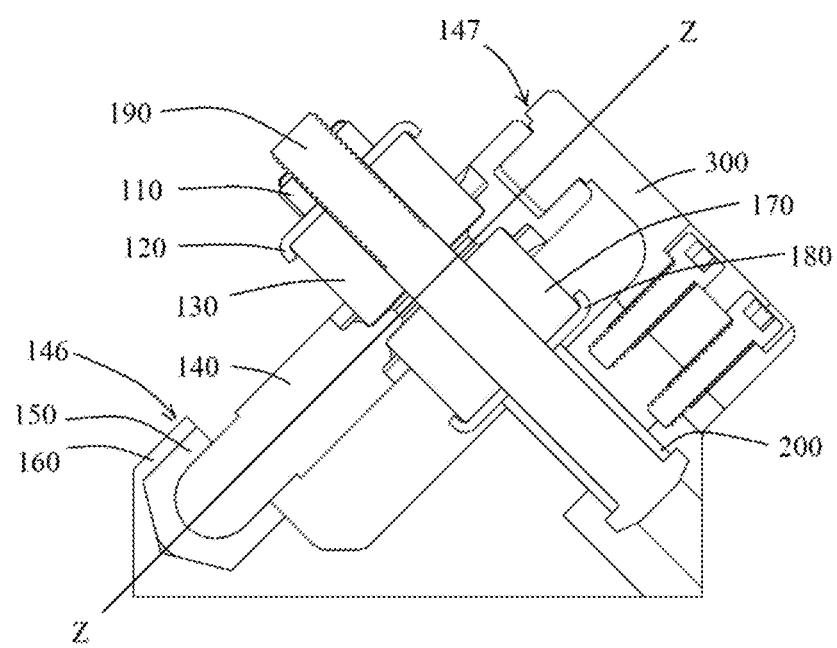
FIG. 38 illustrates a truck in accordance with example embodiments.

Referring to FIG. 38, it is understood that the inventive truck 1000 may include a hanger 140 having a first pivot support 146 and a second pivot support 147. In its assembled condition, the hanger 140 is pivotally supported and has an axis of rotation Z-Z passing through the first pivot support 146 and the second pivot support 147. In example embodiments, the first pivot support 146 may be comprised of a pivot shaft 141 of the hanger 140 which may extend into a pivot cup 150 arranged in a pivot recess structure 162 of the base 160. The second pivot support 147 may be comprised of an aperture 145 arranged at an end of the hanger 140 into which a pin 330 of a pivot arm 300 may be inserted. These connections, however, are not meant to limit the invention. For example, rather than having a pivot cup 150 in the base 160 to receive a pivot shaft 141 of the hanger 140, the base 160 may include a pin extending therefrom which may extend into a recess that may be formed in the pivot shaft 141. Similarly, while example embodiments illustrate the pivot arm 300 having a pin 330 configured to extend into the aperture 145 of the hanger 140 to provide the second pivot support 147, the pivot arm 300 may have an aperture where the pin 330 is located and the hanger 140 may have a pin where the aperture 145 is located. In this latter embodiment, the pin from the hanger may extend into the aperture of the pivot arm 300 to provide the pivot support 147. Regardless, the invention contemplates a variety of ways the hanger 140 may be pivotally supported at two places.

Referring again to FIG. 38, it is clear the base 160 may have a structure 162 configured to provide the first pivot support. The truck 1000 also includes a pivot arm 300 attached to the base 160 to provide the second pivot support 147. In example embodiments the truck 1000 may further include a pivot bushing 200 passing through an aperture 165 of the base 160. The truck 1000 may further include a kingpin 190 passing through the pivot bushing 200, the base 160, and the hanger 140. In addition, the truck 1000 may include a locknut 110 arranged at an end of the kingpin 190, wherein when the first and second pivot supports prevent the axis of rotation Z-Z from moving as the locknut 110 is moved along the kingpin 190.

In example embodiments, the sliding kingpin assembly is usable for ensuring equal pressure is applied to two inline bushings of the inventive truck 1000. However, the sliding kingpin assembly has been found to be useful for other systems.

Figure 39:
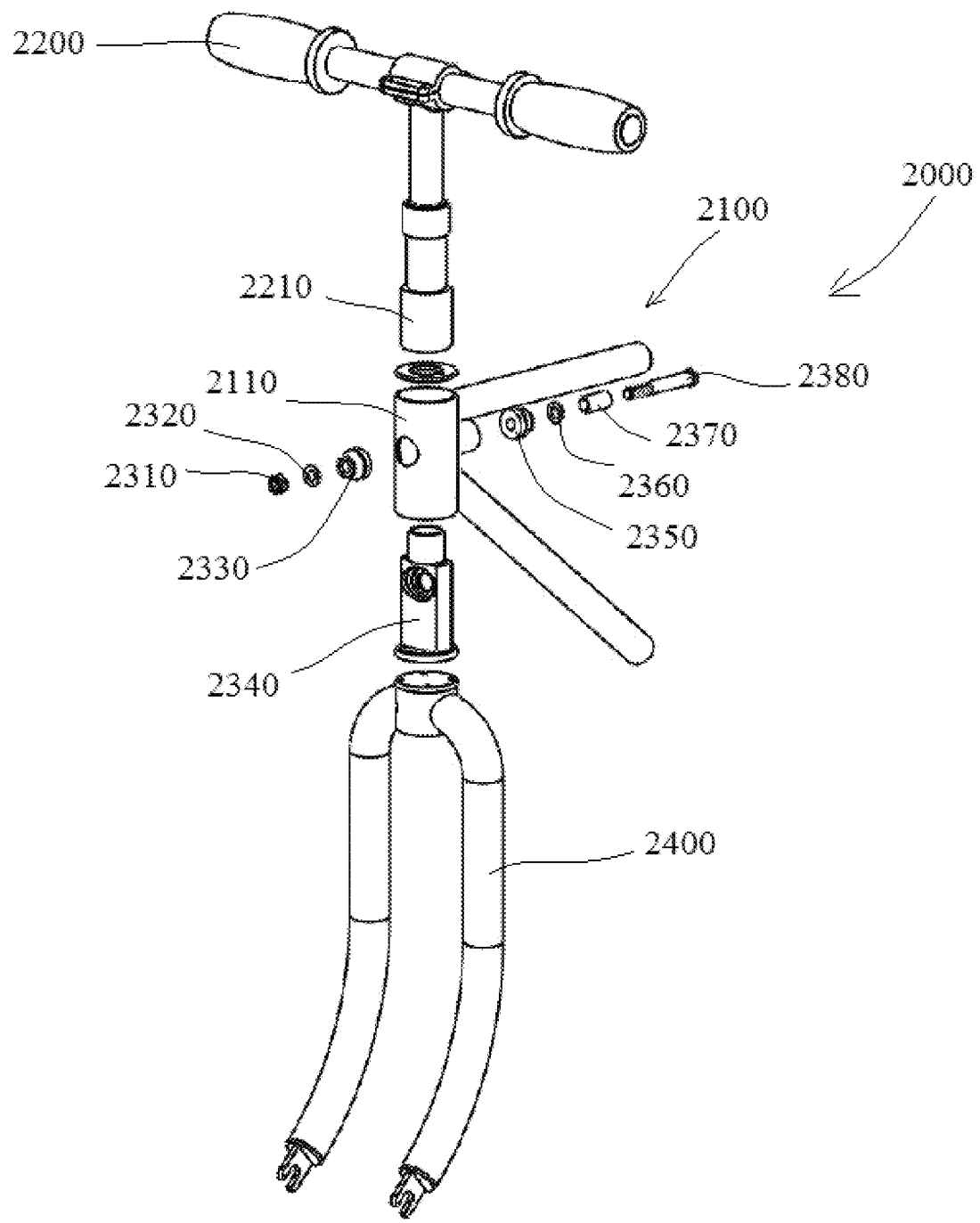
FIG. 39 illustrates an exploded-perspective view of a portion of a bicycle in accordance with example embodiments.
Figure 40:
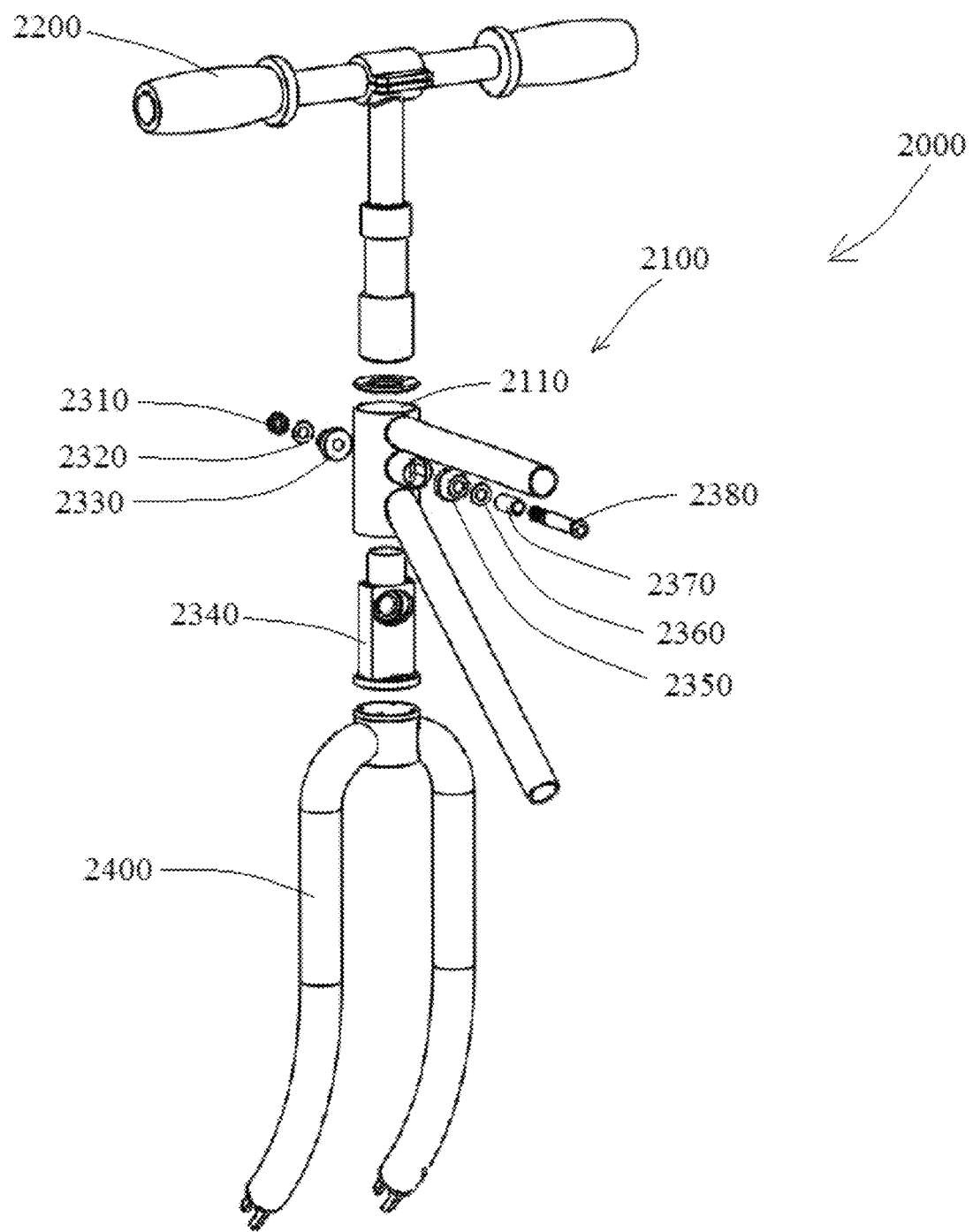
FIG. 40 illustrates another exploded-perspective view of the portion of the bicycle in accordance with example embodiments.

FIGS. 39 and 40 represent exploded views of a portion of a bicycle 2000 in accordance with example embodiments. In many conventional bicycles, the handle bars attach either directly or indirectly to a steering tube which either directly or indirectly attaches to a fork which in turn attaches to a wheel. In conventional systems, vibrations and/or oscillations, at least in part, are caused by an interaction of the wheel and the ground. These vibrations and/or oscillations can travel from the wheel to the fork, from the fork to the steering tube, and from the steering tube to the handle bars. In rough terrain, this can subject a rider's hands to significant shock which can be very uncomfortable. Furthermore, a lot of vibration and/or oscillations, over time, may cause injury to a rider's hands. Further yet, there is very little which reduces a wheel's, and therefore handlebar's, tendency to turn when the wheel encounters an obstacle. The bicycle 2000 of example embodiments, addresses these problems by incorporation of a sliding kingpin system in conjunction with bushings.

FIGS. 39 and 40 illustrate a portion of a nonlimiting example of a bicycle 2000 in accordance with example embodiments. As shown in FIGS. 39 and 40, the bicycle 2000 includes a frame 2100 having a head tube 2110, handle bars 2200, a locknut 2310, a first cup washer 2320, a first bushing 2330, a steering tube 2340, a second bushing 2350, a second cup washer 2360, a pivot bushing 2370, a kingpin 2380, and a fork 2400. As will be explained shortly, this novel assembly of elements provides for a bicycle in which a rider's hands experience reduced shock as compared to the conventional art and provides stability during a bike ride.

Figure 41:
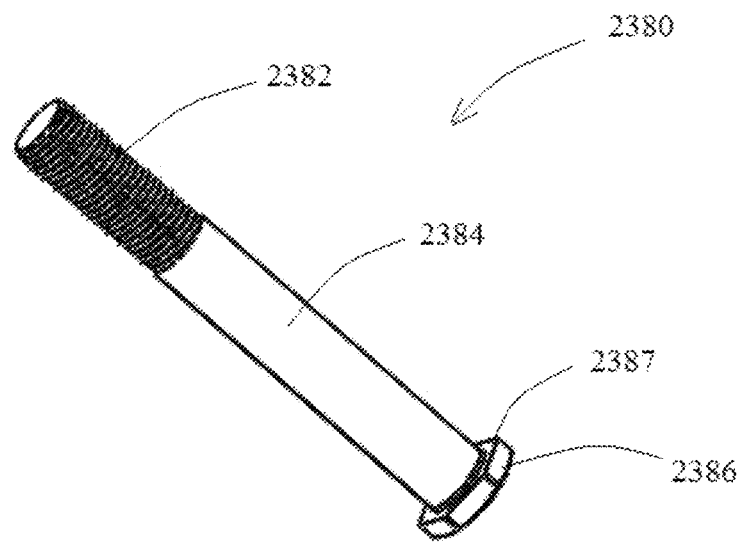
FIG. 41 illustrates an example of a kingpin in accordance with example embodiments.

Many elements of bicycle 2000 are similar to elements of truck 1000. For example, the kingpin 2380 (as shown in FIG. 41) may have a cylindrical shaft 2384 with a threaded end 2382 and a head 2386. Like kingpin 190, the head 2386 may be generally hexagonal in shape, but may have another shape such as, but not limited to, a rectangular, or octagonal shape. The head 2386 may include a bearing surface 2387 which may bear against an end of the pivot bushing 2370 when the bicycle 2000 is assembled.

Figure 42:
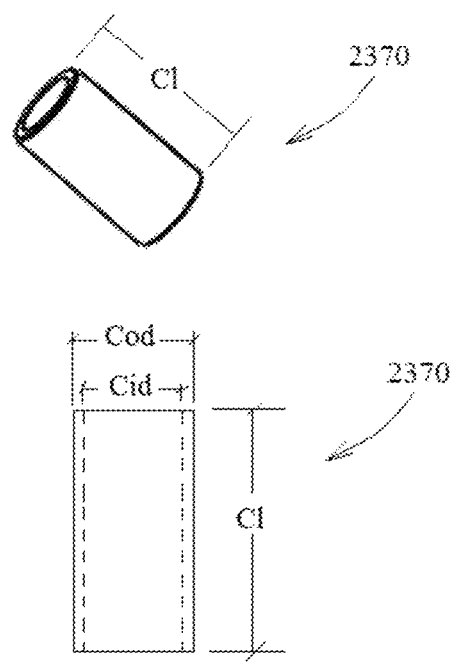
FIG. 42 illustrates an example of a pivot bushing in accordance with example embodiments.

Pivot bushing 2370, as shown in at least FIG. 42, may be somewhat similar to pivot bushing 200 in that it may resemble a hollow cylinder having a length Cl, an inner diameter Cid, and an outer diameter Cod. In example embodiments, inner diameter Cid of the pivot bushing 2370 may be about the same size, or slightly larger than, the outer diameter of the shaft 2384 to allow the kingpin 2380 to slide therethrough but small enough to prevent the head 2386 from passing through.

Figure 43:
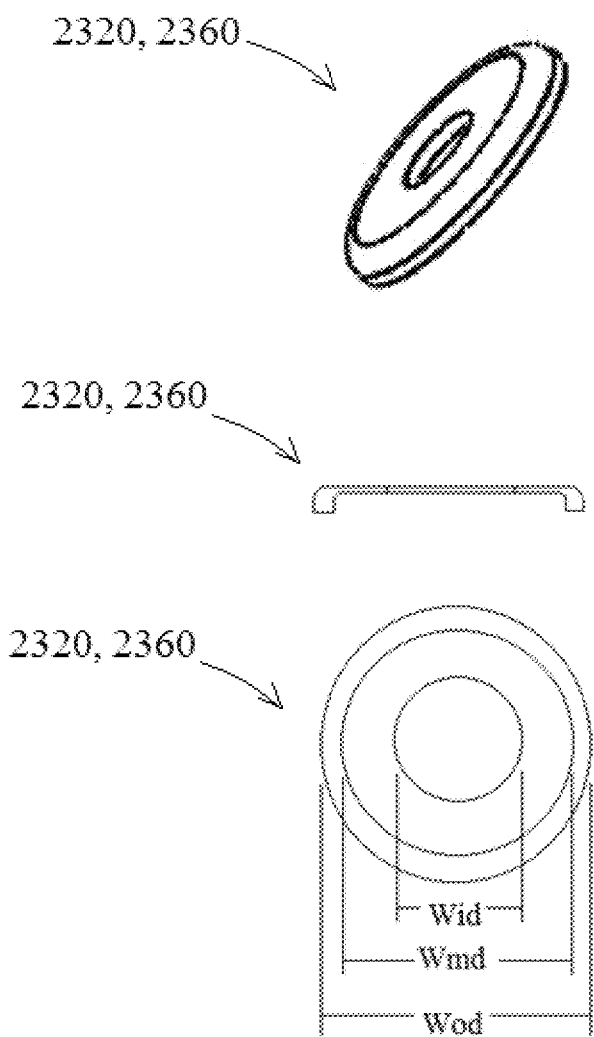
FIG. 43 illustrates cup washers in accordance with example embodiments.

In example embodiments, the first and second cup washers 2320 and 2360, as shown in at least FIG. 43, may resemble cup washers 20 and 80. For example, like cup washers 20 and 80, cup washers 2320 and 2360 generally resemble disks having an inner diameter Wid and an outer diameter Wod. The cup washers 2320 and 2360 generally have apertures defined by the inner diameters Wid. The inner diameters Wid of the cup washers 2320 and 2360 are about the same as the outer diameter of the kingpin 2380 to allow the kingpin 2380 to pass through. For example, if the outer diameter of the kingpin 2380 is ⅜", the inner diameters Wid of the cup washers 2320 and 2360 may be about ⅜" or slightly larger. This allows the kingpin 2380 to pass through the cup washers 2320 and 2360. In example embodiments, the edges of the cup washers 2320 and 2360 may form flanges having an inner diameter of Wmd. The inner diameters of the flanged section Wmd my be generally about the same size, or slightly larger than, the outer diameter Bod of the bushings 2330 and 2350. This allows the cup washers 2320 and 2360 to at least partially capture ends of the bushings 2330 and 2350.

Figure 44:
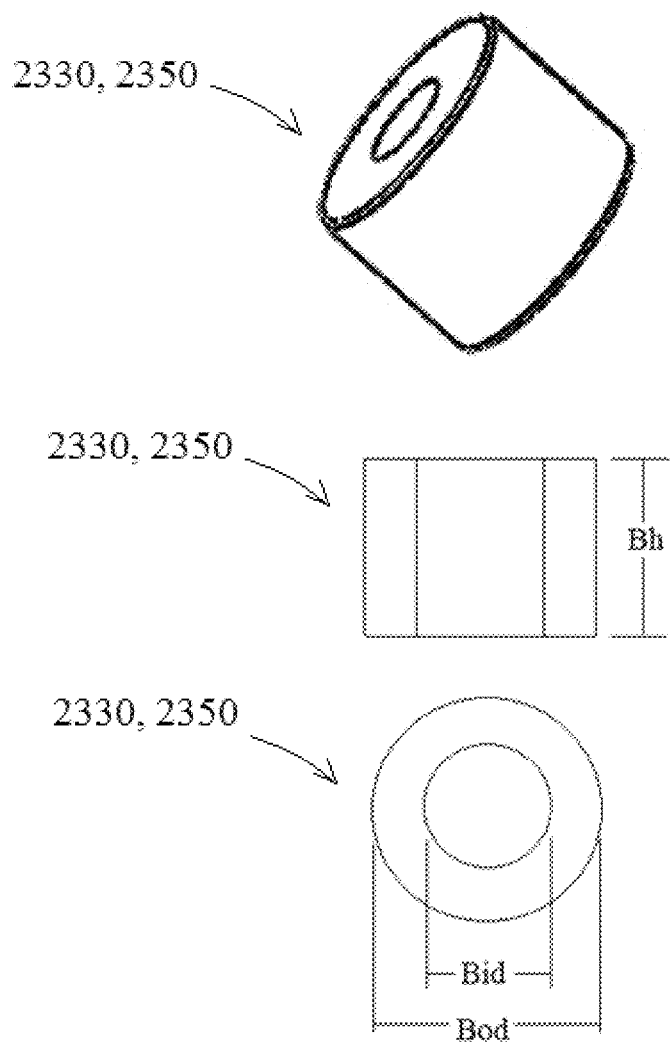
FIG. 44 illustrates bushings in accordance with example embodiments.

Like the truck 1000, the bushings 2330 and 2350, as shown in at least FIG. 44, may be cylindrical bushings having a height Bh, an inner diameter Bid, and an outer diameter Bod. The inner diameter may be large enough to accommodate the kingpin 2380. For example, if the kingpin 2380 has a diameter of about ⅜", the inner diameters Bid of the bushing 2330 and 2350 may be about ⅜" or slightly larger. The bushings 2330 and 2350 may be made of a resilient material, for example, urethane, to absorb various forces applied thereto while retaining the ability to return to an original configuration. Although the instant example illustrates the bushings 2330 and 2350 as being cylindrical, other types of bushings may be used. For example, rather than being cylindrical bushings, bushings 2330 and 2350 may have a different shape such as, but not limited to, hourglass, conical, stim, chubby, and randal.

The inventor notes the steering tube 2340 and the fork 2400 illustrated in FIGS. 39 and 40 are shown as separate components. In this nonlimiting example embodiment, the steering tube 2340 and fork 2400 may be connected to one another via a conventional means such as, but not limited to, screws, pins, brackets, or adhesives. While the example bicycle 2000 illustrates the steering tube 2340 and fork 2400 as separate components, this is not intended to limit the invention. For example, in another embodiment, the steering tube 2340 and fork 2400 are integrated as one structure.

Figure 45:
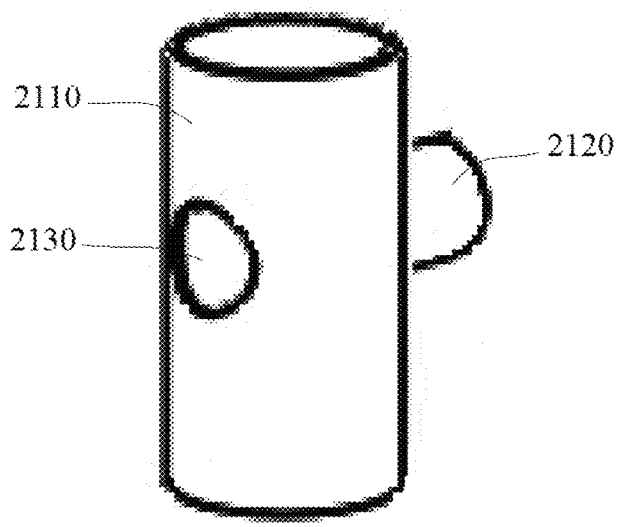
FIG. 45 illustrates a first perspective view of a head tube in accordance with example embodiments.
Figure 46:
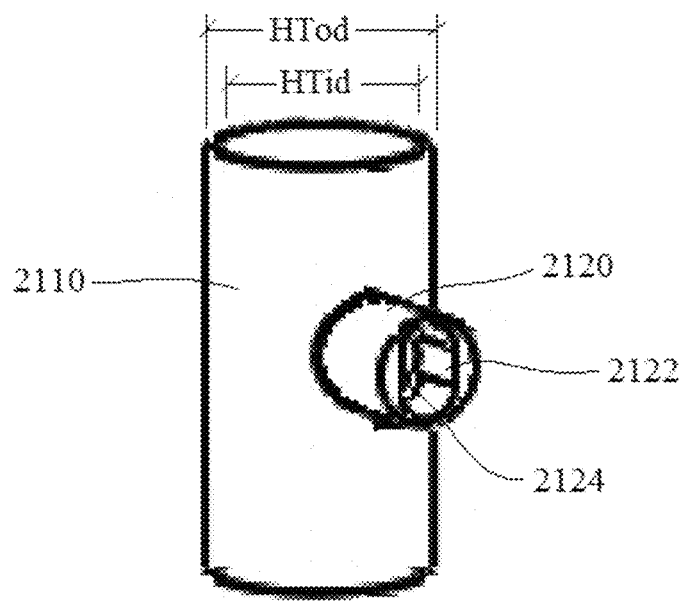
FIG. 46 illustrates a second perspective view of the head tube in accordance with example embodiments.
Figure 47:
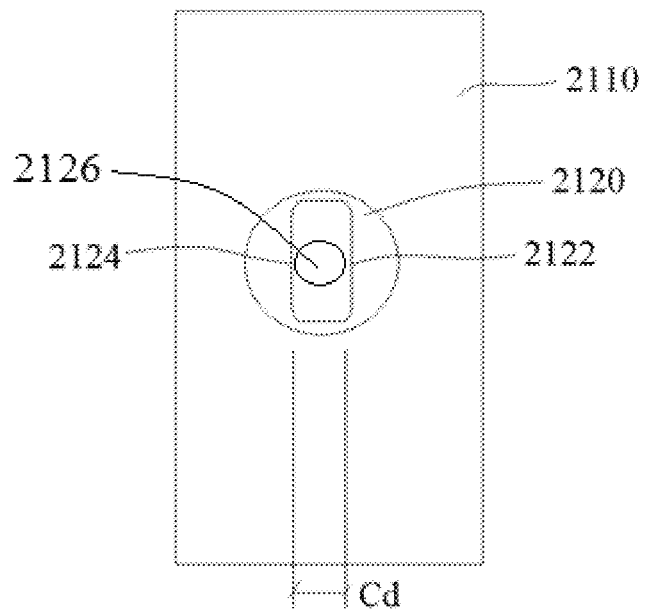
FIG. 47 illustrates an elevation view of the head tube in accordance with example embodiments.
Figure 48:
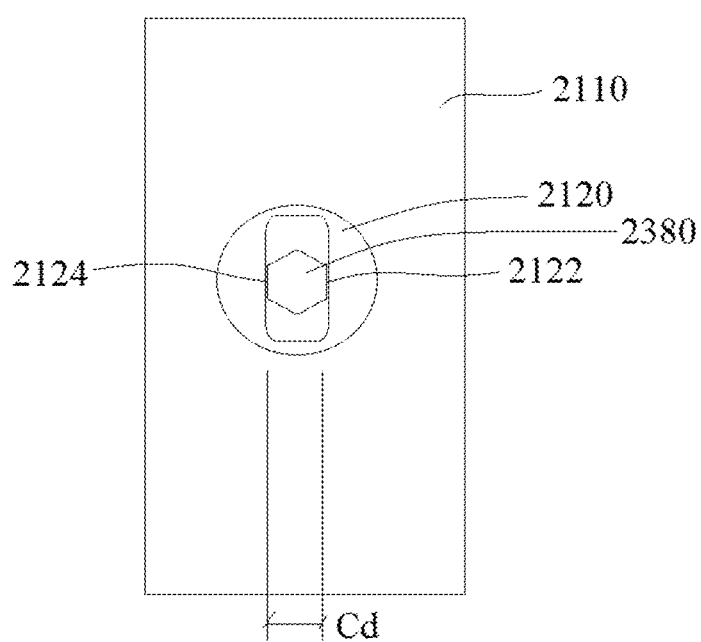
FIG. 48 illustrates an elevation view of the head tube with a kingpin inserted therein in accordance with example embodiments.

FIGS. 45 and 46 illustrate close-up views of the head tube 2110 in accordance with example embodiments. FIG. 47 illustrates a back view of the head tube 2110 and FIG. 48 illustrates a back view of the head with a head 2386 of the kingpin 2380 inserted therein. In this nonlimiting example embodiment, the head tube 2110 resembles cylindrical tube having an inner diameter HTid and an outer diameter HTod. In this nonlimiting example embodiment the back side of the head tube 2110 includes a protrusion 2120 which may resemble a short cylinder having surfaces 2122 and 2124 configured to engage the head 2386 of the kingpin 2380. The surfaces 2122 and 2124, in general, may be flat surfaces that engage parallel surfaces of the head 2386 of the kingpin 2380 and prevent the kingpin 2380 from rotating much like the surfaces 66 and 67 of truck 1000 prevent the kingpin 190 from rotating. In example embodiments, a hole 2126 penetrates the head tube 2110 at a location that coincides with the protrusion 2120. The hole 2126 has a diameter about equal to, or slightly larger than, an outer diameter Cod of the pivot bushing 2370. For example, if the outer diameter Cod of the pivot bushing 2370 is ½", the diameter of the hole 2126 may be about ½" or slightly larger to allow the pivot bushing 2370 to slide therethrough.

Referring to FIG. 45, it is observed the head tube 2110 includes another hole 2130 which may serve as an access hole. In one embodiment, the hole 2130 is generally sized to allow each of the first cup washer 2320 and first bushing 2330 to be inserted therein. In another embodiment the hole 2130 is sized to allow only the first cup washer 2320 to be inserted therethrough. In yet another embodiment, the hole 2130 may be sized so that neither the first bushing 2330 nor the first cup washer 2320 can pass therethrough but large enough to allow the locknut 2310 to pass through. The hole 2130 may, therefore serve various purposes. For example, in one embodiment, the hole 2130 may allow a user to insert the first bushing 2330, first cup washer 2320, and locknut 2310 into the head tube 2110 so they may engage the kingpin 2380. In another embodiment, the hole 2130 may allow a user to insert the first cup washer 2320 and locknut 2310 into the head tube 2110 while preventing the first bushing 2330 from passing through the hole 2130. In this embodiment the first bushing 2330 may already be residing in the head tube 2110 and the hole 2130 may allow a user to place the first cup washer 2320 on an end of the first bushing 2330. In another embodiment, the hole 2130 may be sized to prevent the first cup washer 2320 and first bushing 2330 from passing through while providing enough room for the locknut 2310 to pass through. In all three embodiments, the hole 2130 allows a user to align the locknut 2310 with the threaded end 2382 of the kingpin 2380 and attach the locknut 2310 to the threaded end of the kingpin 2380 through the hole 2130.

Figure 49:
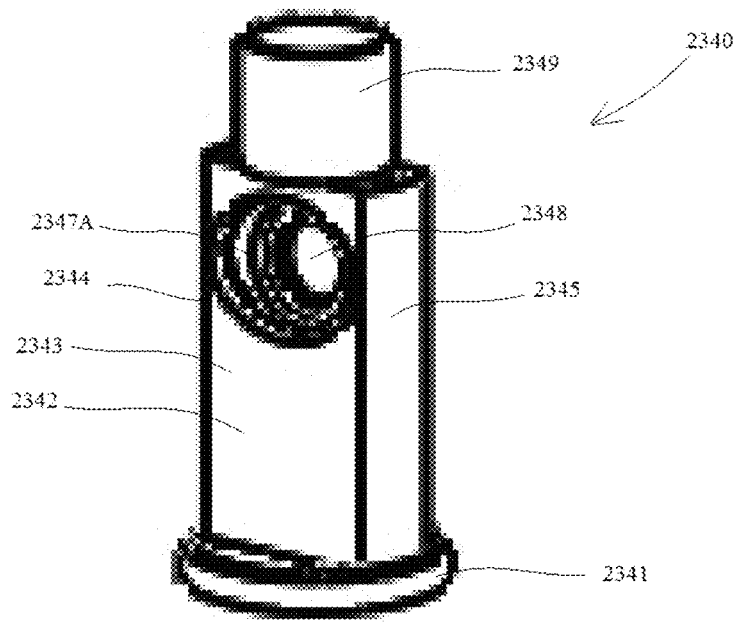
FIG. 49 illustrates a first perspective view of a steering tube in accordance with example embodiments.
Figure 50:
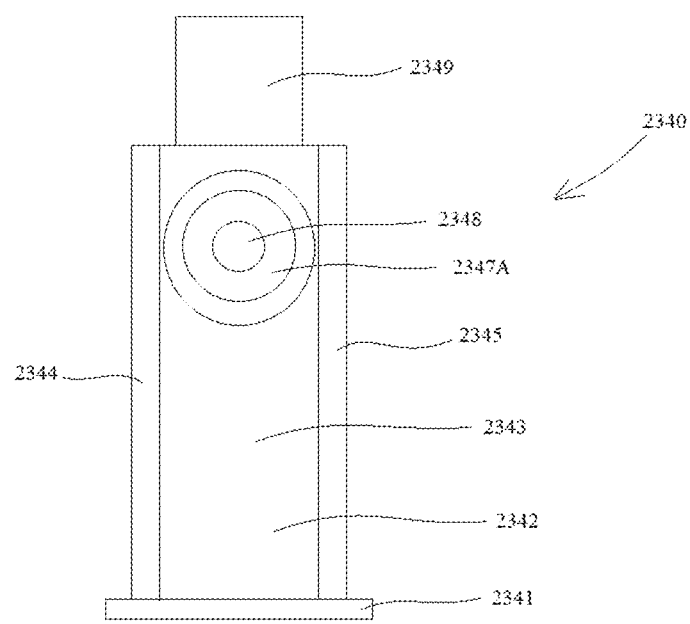
FIG. 50 illustrates a first elevation view of the steering tube in accordance with example embodiments.
Figure 51:
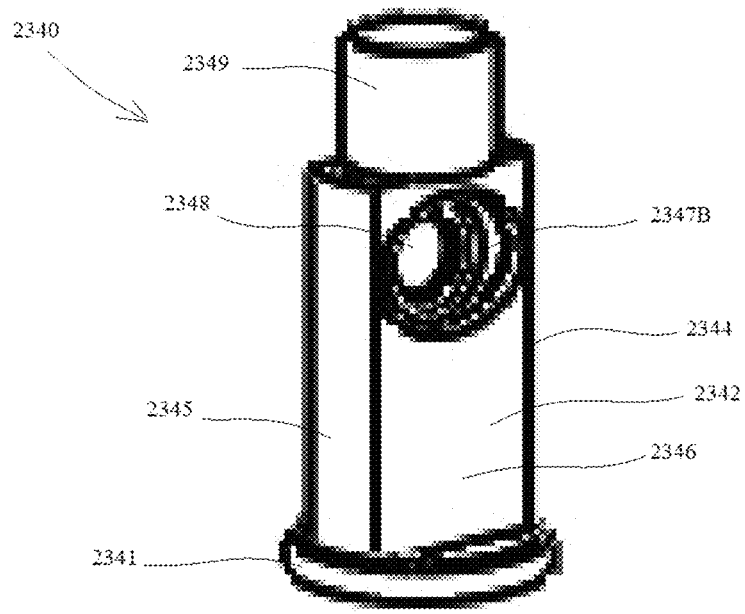
FIG. 51 illustrates a second perspective view of the steering tube in accordance with example embodiments.
Figure 52:
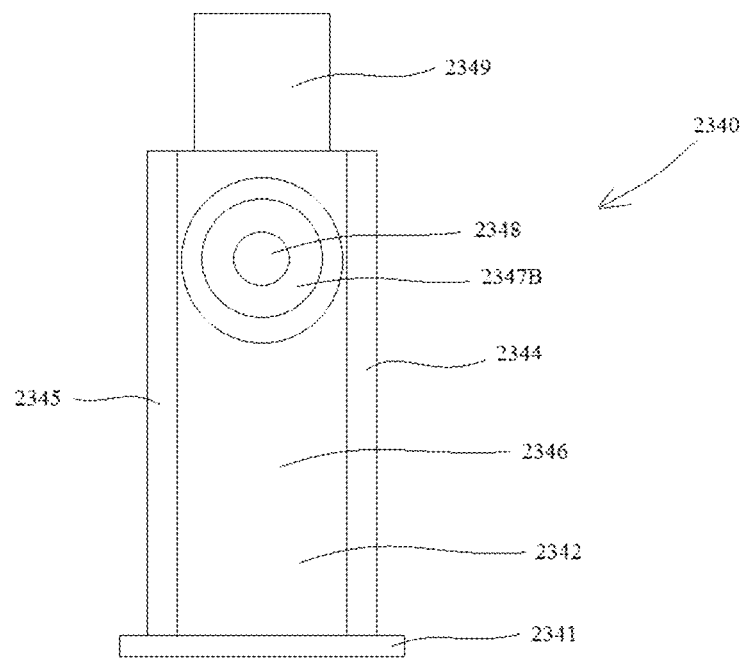
FIG. 52 illustrates a second elevation view of the steering tube in accordance with example embodiments.
Figure 53:
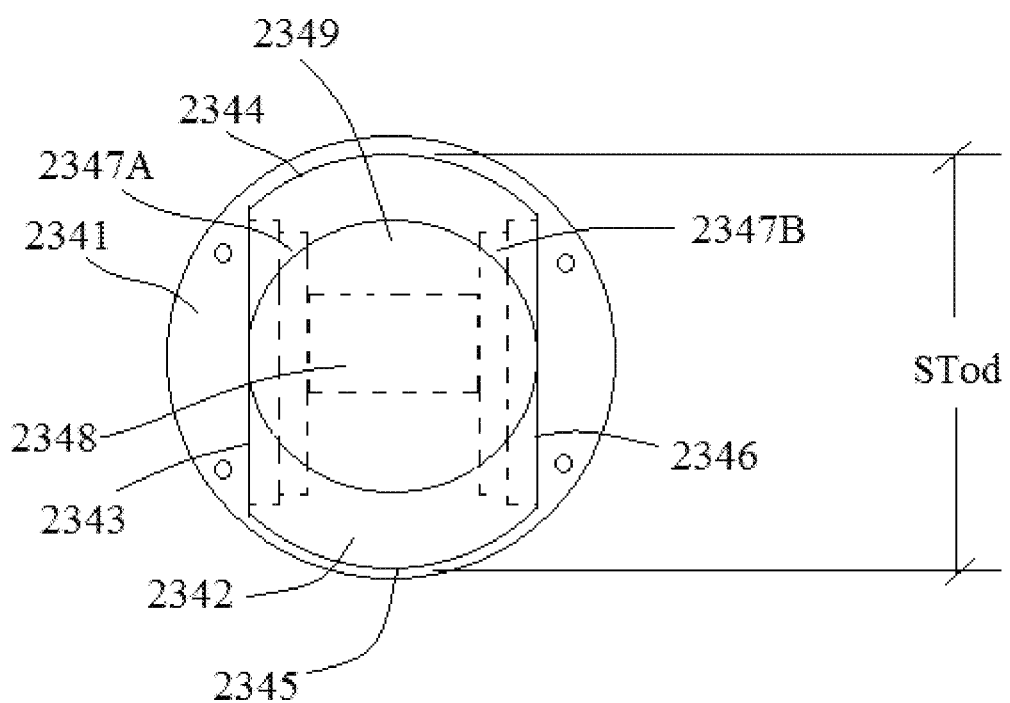
FIG. 53 illustrates a top view of the steering tube in accordance with example embodiments.
Figure 54:
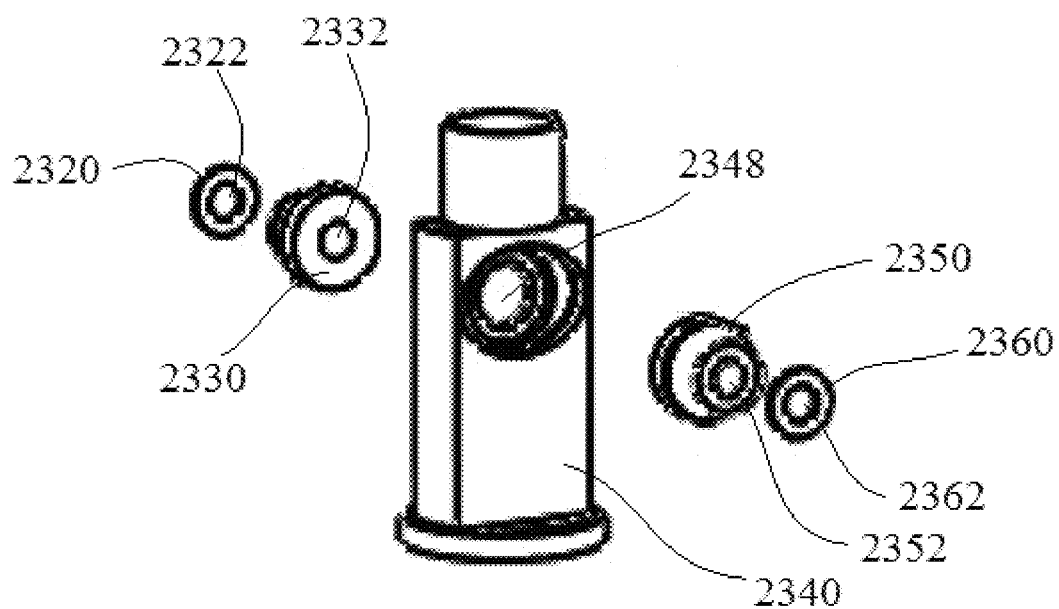
FIG. 54 illustrates a step in assembly a bicycle where bushings are seated in a steering tube and end caps are placed over the bushings to form an assembly in accordance with example embodiments.
Figure 55:
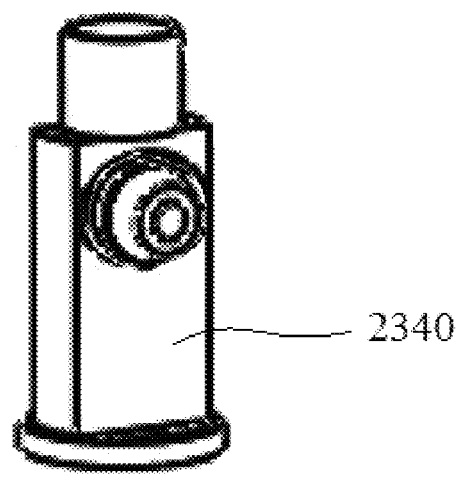
FIG. 55 illustrates the assembly in accordance with example embodiments.

FIGS. 49 and 51 illustrate a first perspective and a second perspective view of the steering tube 2340. FIGS. 50 and 52 illustrate side views of the steering tube 2340. FIG. 53 illustrates a top view of the steering tube 2340. As illustrated in FIGS. 49 to 53, the steering tube 2340 may be comprised of a base 2341, a body 2342 on the base 2341, and a post 2349 on top of the body 2342. The base, 2341, in one embodiment, may resemble a short disc having holes therein to allow the base 2341 to be connected to the fork 2400 by a conventional means such as, but not limited to, screws or bolts. Although the base 2341 is illustrated as a short circular disk, the shape may vary from embodiment to embodiment. For example, in one embodiment the base 2341 resembles a circular disk, in another embodiment, the base 2341 resembles a flat square plate, in yet another embodiment it may be octagonal in shape. As such, the shape of the base 2341 is not critical and, in some embodiments, may be omitted.

The body 2342 may, as shown in FIGS. 49 to 53, may extend from the base 2341 and may have a front face 2343, a back face 2346, a first curved side wall 2344 and a second curved side wall 2345. In the nonlimiting example embodiment of FIGS. 49 to 53, the front face 2343 and back face 2346 is generally flat, however, the faces may actually be nonflat, for example, curved. In this nonlimiting example embodiment, the body 2342 may resemble a cylinder having an outer diameter STod about the same as, or slightly smaller than, the inner diameter of the HTid of the head tube 2100. In fact, the radius of curvature of the side walls 2344 and 2345 may be about the same as the radius of curvature of the inner surface of the head tube 2100. This allows the body 2342 to insert into the head tube 2100 and rotate within the head tube 2100.

In example embodiments, the body 2342 may include a first recessed area 2347A on the front face of the body 2342 and a second recessed area 2347B on a back face 2346 of the body 2342. The first and second recessed areas 2347A and 2347B may be configured to receive ends of the first and second bushings 2330 and 2360. Thus, the first and second recessed areas 2347A and 2347B may function as bushing seats. In a nonlimiting example embodiment, a hole 2348 may pass through the centers of the recessed areas 2347 and 2347 and may be sized to accommodate the kingpin 2380. For example, if the kingpin 2380 has a diameter of about ⅜", the diameter of the hole 2348 may be about ⅜" or slightly larger to allow a portion of the kingpin to pass through.

In example embodiments, the steering tube 2340 may include the post 2349. The post 2349 may be inserted into a receiving area 2210 of the handle bars 2400 to connect the steering tube 2340 to the handle bars 2400.

Figure 56:
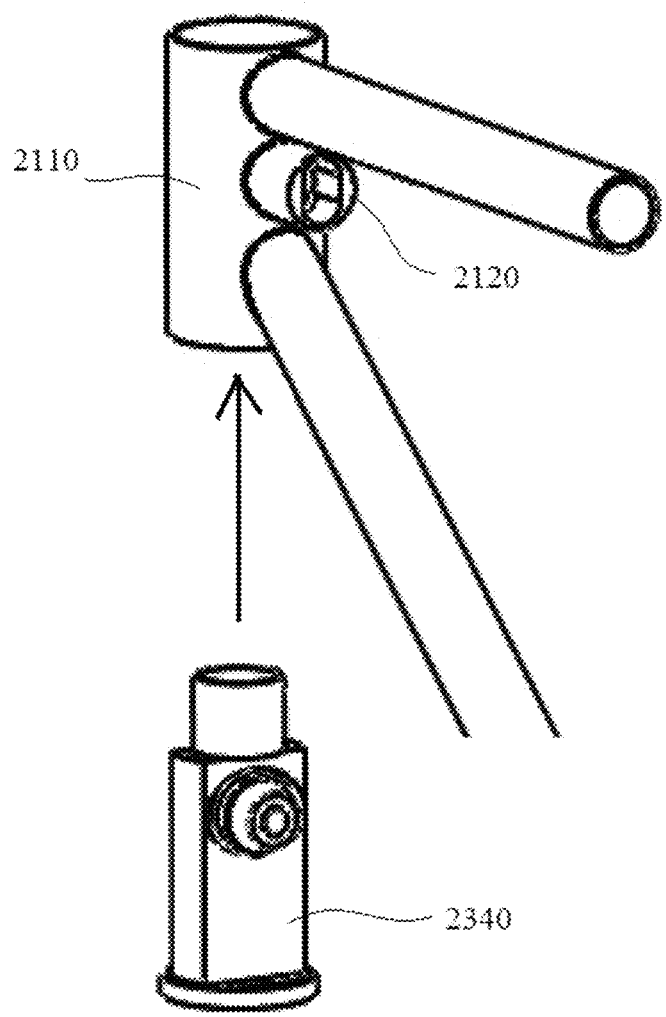
FIG. 56 illustrates the assembly being inserted into a head tube in accordance with example embodiments.
Figure 57:
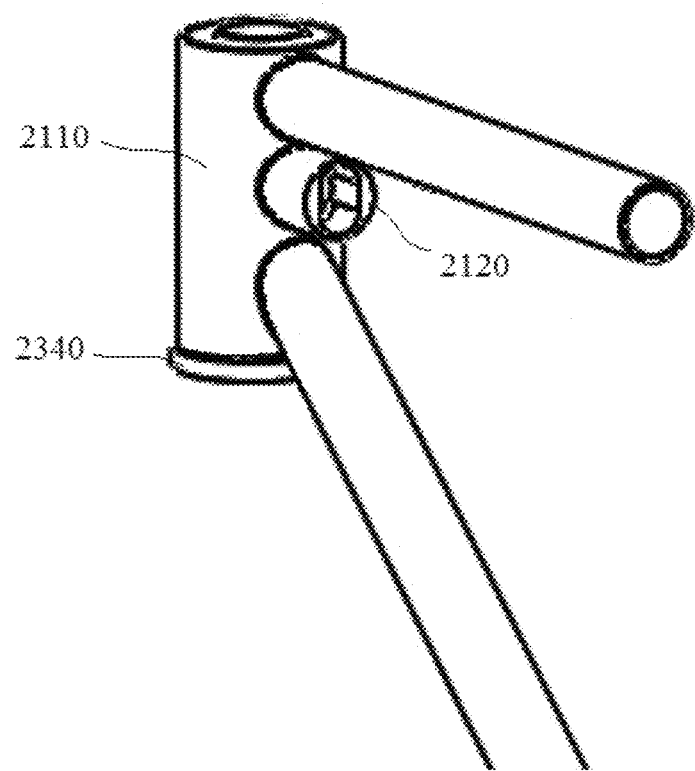
FIG. 57 illustrates the assembly in the head tube in accordance with example embodiments.
Figure 58:
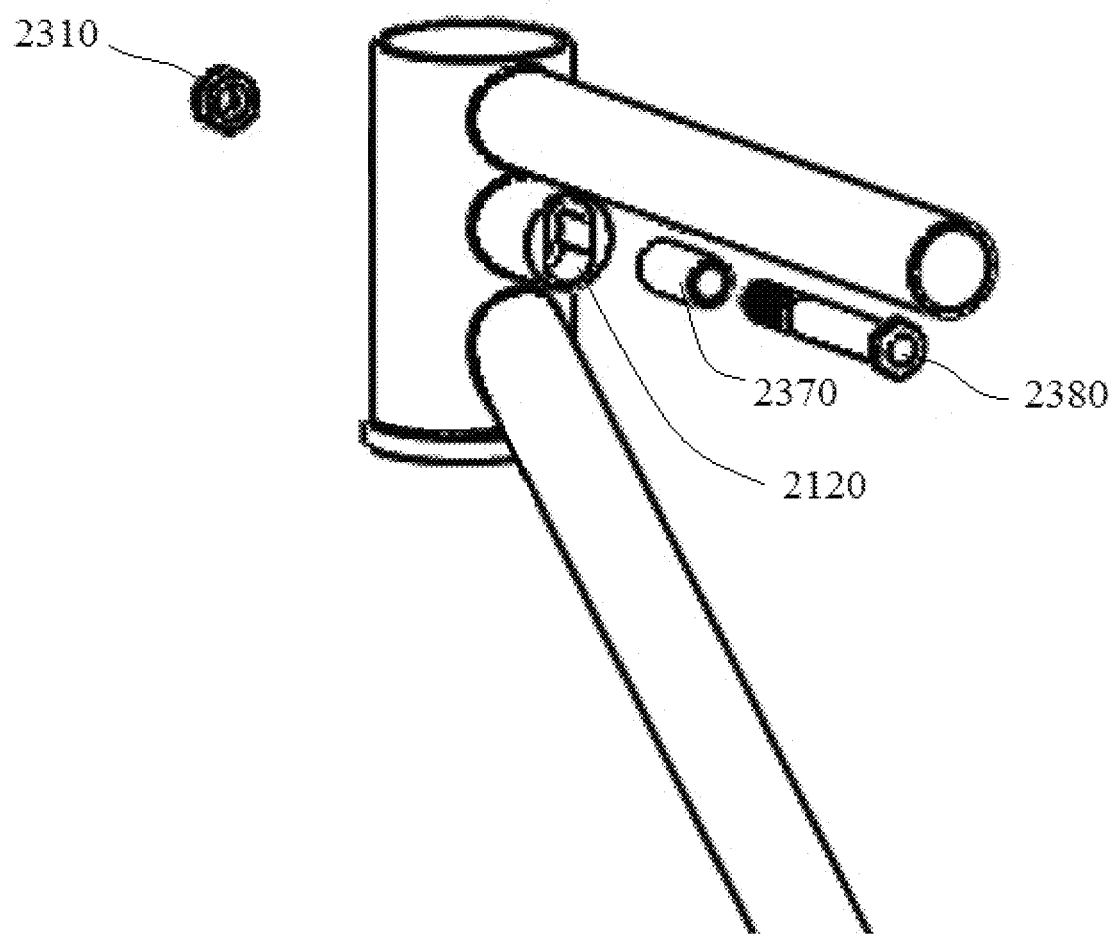
FIG. 58 illustrates a kingpin and pivot bushing being inserted into the head tube in accordance with example embodiments.

FIGS. 54 through 58 illustrate steps which may be executed to, in part, assemble the bicycle 2000 of example embodiments. As show in FIGS. 54 through 58 the steps may include an operation of placing the first bushing 2330 into the first busing seat 2347A, placing the second bushing 2350 into the second bushing seat 2347B, placing the first cup washer 2320 on an end of the first bushing 2330 and placing the second cup washer 2360 on an end of the second bushing 2350 to form the assembly shown in FIG. 55. It is noted that the assembly illustrated in FIG. 55 each of the apertures of the first cup washer 2320, first bushing 2330, second bushing 2350, and second cup washer 2360 are all aligned with the aperture 2348 of the steering tube 2340. Thereafter, the assembly may be inserted into the head tube 2110 as shown in FIG. 56 to arrive at the assembly shown in FIG. 57. In this configuration each of the apertures of the first cup washer 2320, first bushing 2330, second bushing 2350, and second cup washer 2360, and the steering tube 2340 are aligned with the hole 2126 of head tube 2110. Thereafter, the pivot bushing 2370 may be inserted into the protrusion 2120 and through the hole 2126 of the head tube 2110 until it makes contact with the second cup washer 2360. After this step the kingpin 2380 may be inserted through the pivot bushing 200, the second cup washer 2360, the second bushing 2350, the aperture 2348, the first bushing 2330 and the first cup washer 2310 until the threaded end 2382 of the kingpin 2380 is exposed near the hole 2130. Thereafter the locknut 2310 may be screwed onto the threaded end 2382 of the of the kingpin 2380 and turned until sufficient tension is imparted to the kingpin 2380.

Figure 59:
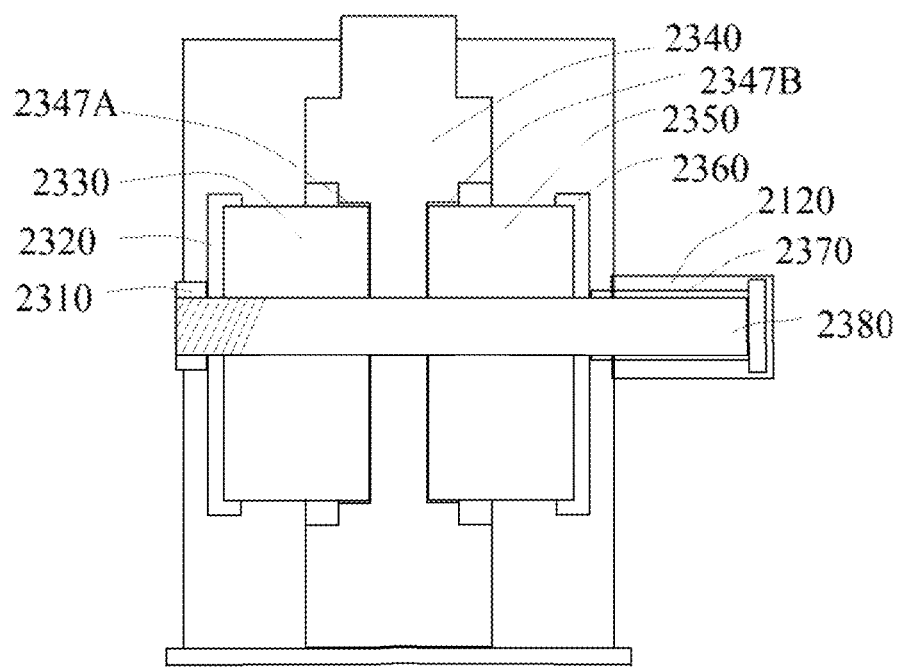
FIG. 59 illustrates a cross-section of the assembly, the kingpin, the pivot bushing, when installed in the head tube in accordance with example embodiments.

FIG. 59 illustrates a cross-section of the head tube 2110 with the sliding kingpin system inserted therein. As one skilled in the art would readily appreciate, as the locknut 2310 moves along the threaded end 2382 of the kingpin 2380 and towards the head 2386 of the kingpin 2380 the locknut 2310 presses against the first cup washer 2320 which in turn presses against the first bushing 2330 which in turn presses against the bushing seat 2347A of the steering tube 2340. At the same time, the head 2386 of the kingpin 2380 presses against the pivot bushing 2370 which in turn presses against the second cup washer 2360 which in turn presses against the second bushing 2350 which in turn presses against the second busing seat 2347B. These operations result in each bushing 2330 and 2350 experiencing a compressive state, the degree of compression be controlled by how far along the threaded end 2382 the locknut 2310 moves. In example embodiments, assembly of the bike 2000 may include other steps such as attaching the forks 2400 and the handle bars 2200 to the steering tube 2340.

In example embodiments, the first bushing 2330 and the second bushing 2350 bearing against the steering tube 2340 acts to damp vibrations and/or oscillations generated by the bicycle's wheel on the ground and reduces the vibration and/or oscillations ultimately transferred to the handle bars 2200. Thus, a rider of a bicycle including the damping effect of the bushings 2330 and 2350 may experience less shock to the hands as would be experienced in a conventional bicycle.

In example embodiments the bushings 2330 and 2350 are resilient in nature. A downside of the damping system is that a rider will generally have to apply greater torque on the handle bars 2200 in order to rotate the fork 2400 than would be necessary had the bushings 2330 and 2350 not been installed. However, an advantage of the bushings 2330 and 2350 is that after a torque has been applied to the handle bars 2200 to rotate the fork 2400 and the torque is released, the bushings 2330 and 2350 tends to cause the fork 2400 to return to its original position due to their resiliency. This return is largely beneficial to riders since this action of the bushings 2330 and 2350 not only damps vibrations experienced by a rider but also tends to keep the bicycle 2000 on a straight line.

Figure 60:
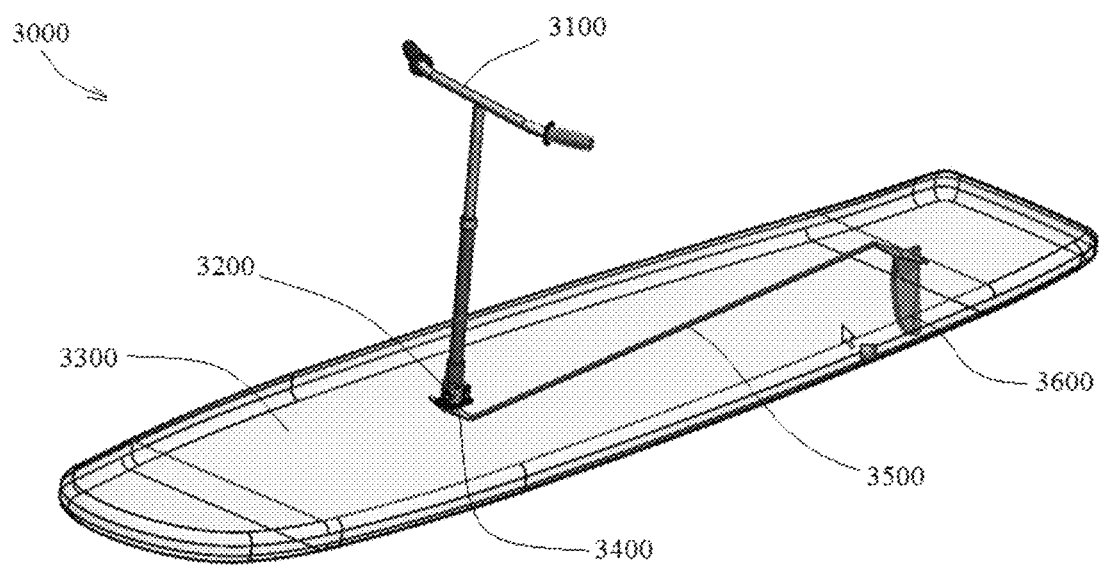
FIG. 60 illustrates a watercraft in accordance with example embodiments.
Figure 61:
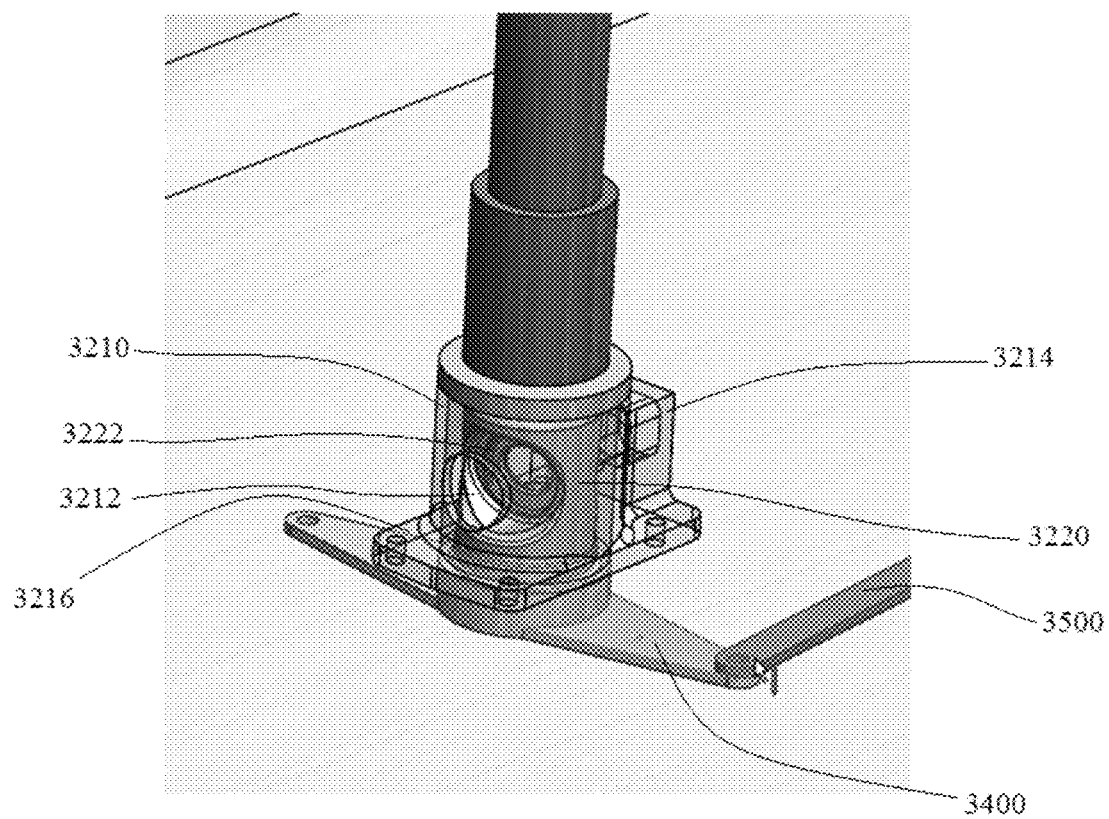
FIG. 61 illustrates a close-up of the watercraft in accordance with example embodiments.

It is understood that the example system illustrated in FIGS. 39 to 59 are for the purpose of illustration only and alternative embodiments are considered to fall within the scope of the invention. For example, in FIGS. 39 to 59, the protrusion 2120 is illustrated as protruding through a back of the head tube 2110. However, in another embodiment, the protrusion 2120 is placed at a front of the head tube 2110 and a hole corresponding to hole 2130 may be placed on the back of the head tube 2110. As yet another embodiment, the protrusion 2120 may be placed on a side of the head tube 2110 with a hole corresponding to hole 2130 being placed on the other side of the head tube 2110. Furthermore, the invention is not limited to a bicycle. For example, FIG. 60 illustrates a watercraft 3000 having handle bars 3100, a damping system 3200, a deck 3300, an arm 3400, a tie rod 3500 and a rudder 3600. FIG. 61 illustrates a close-up view of the damping system 3200 in watercraft 3000.

As shown in FIG. 61, watercraft 3000 includes a bracket 3210 which includes at least one flange 3216 to attach the bracket 3210 to the deck 3300. In this nonlimiting example embodiment, the bracket 3210 is functionally equivalent to the head tube 2110 in that it includes a cylindrical body which encloses a steering tube 3220 and includes a protrusion 3214 through which a pivot bushing and kingpin may pass. The steering tube 3220 is operatively connected to the handle bars 3100 in that as the handle bars 3100 are turned the steering tube 3220 turns. Like steering tube 2340, the steering tube 3220 includes two bushing seats arranged at opposite sides into which bushings may reside (one of which, 3222 is illustrated in FIG. 61). Similarly, steering bracket 3210 includes an access hole 3212 similar to access hole 2130 of head tube 2110. In operation turning the handle bars 3100 turns the steerer tube 3220 which in turn turns the arm 3400. Turning the arm 3400 pushes and/or pulls on the tied rod 3500 which in turn rotates the rudder 3600. Though not shown in the figures, it is understood a kingpin, pivot bushing, two bushings, two cup washers, and a locknut may be used to set up a damping system in watercraft 3000 similar to the damping system in bicycle 2000.

Figure 62:
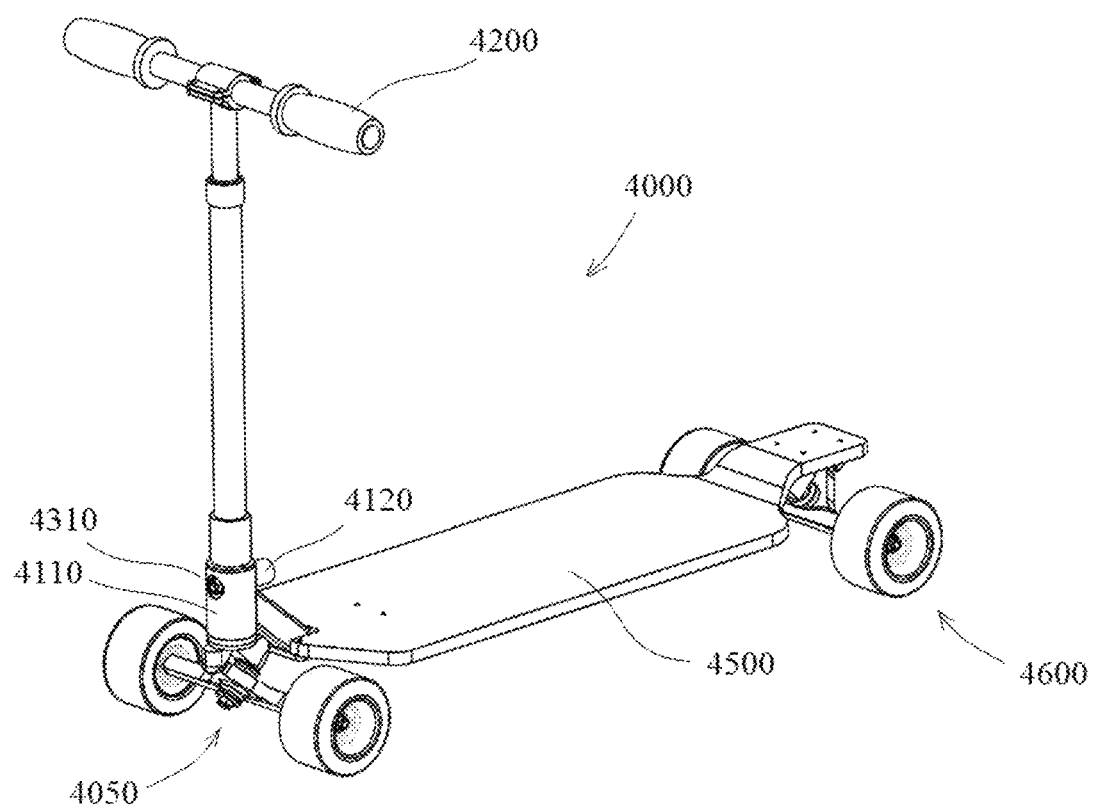
FIG. 62 is a view of a vehicle in accordance with example embodiments.
Figure 63:
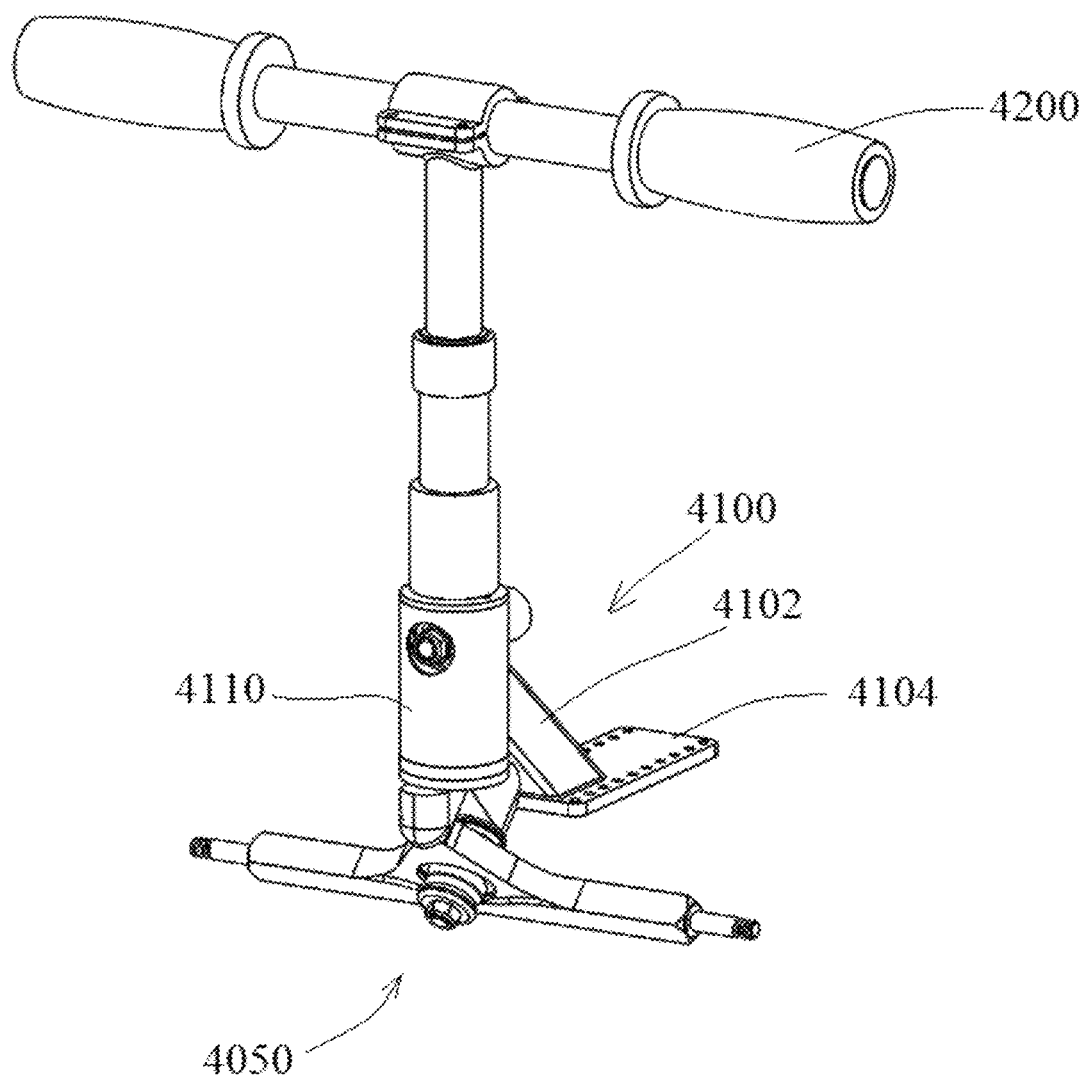
FIG. 63 is a view of a compound steering system of the vehicle in accordance with example embodiments.
Figure 64:
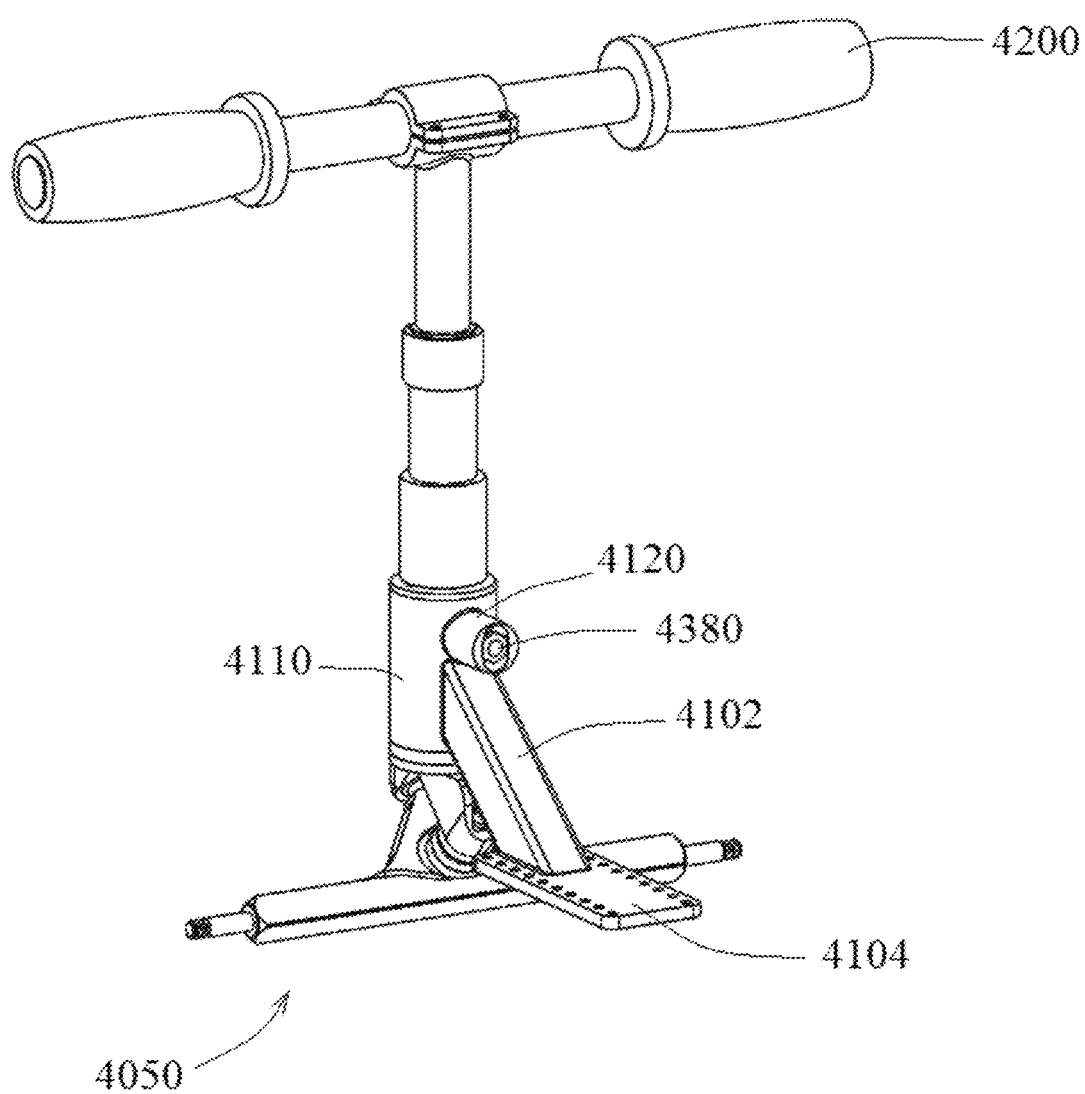
FIG. 64 is a second view of the compound steering system of the vehicle in accordance with example embodiments.
Figure 65:
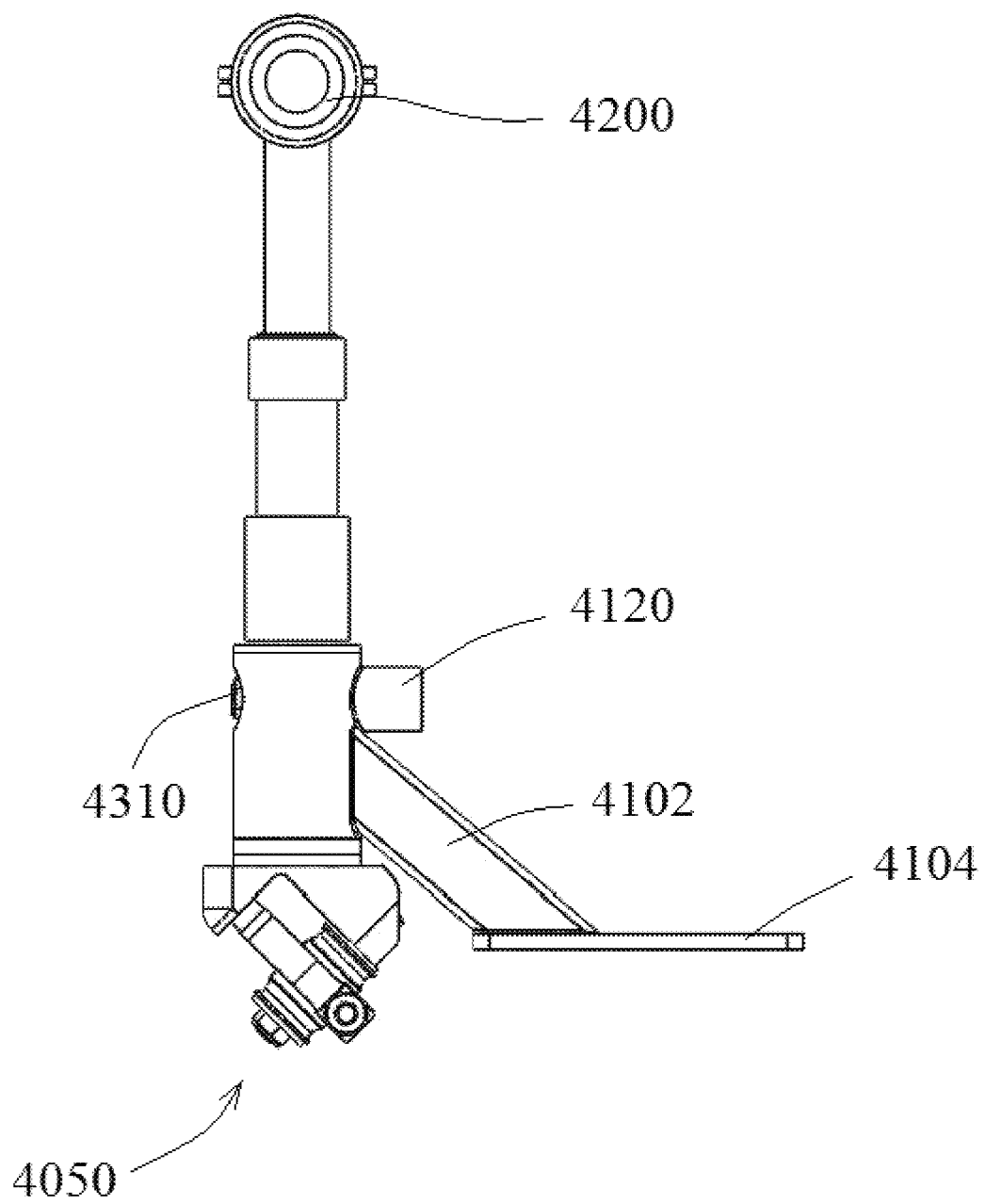
FIG. 65 is a first side view of the compound steering system of the vehicle in accordance with example embodiments.
Figure 66:
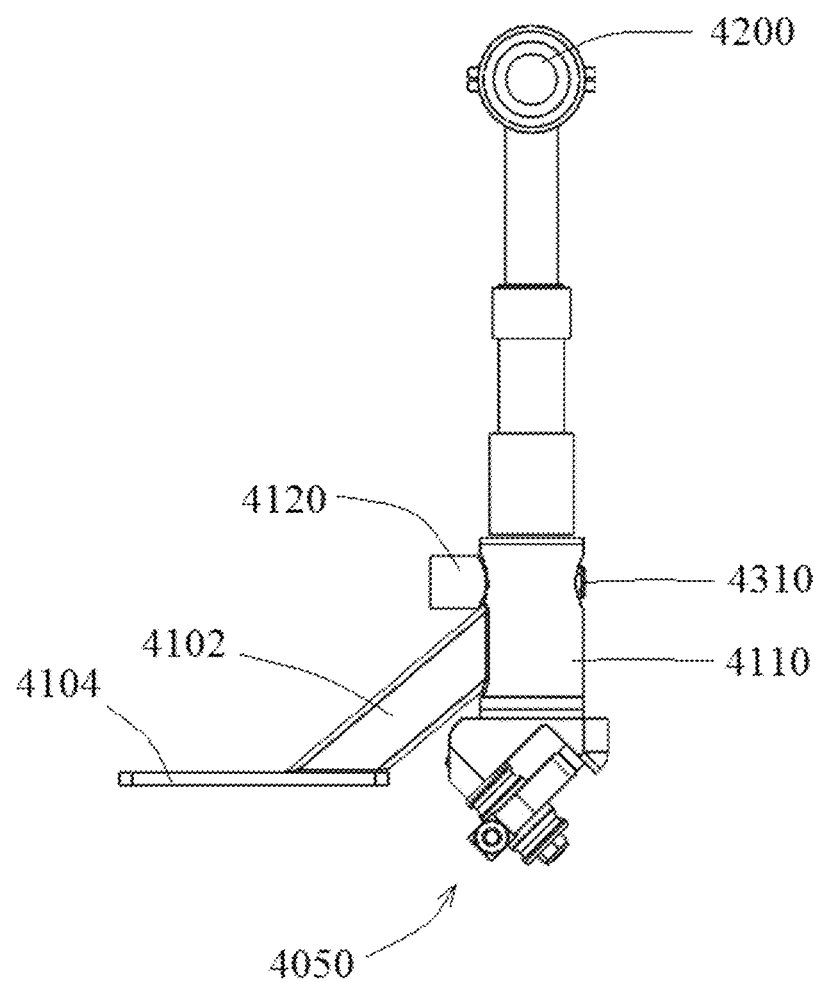
FIG. 66 is a second side view of the compound steering system of the vehicle in accordance with example embodiments.
Figure 67:
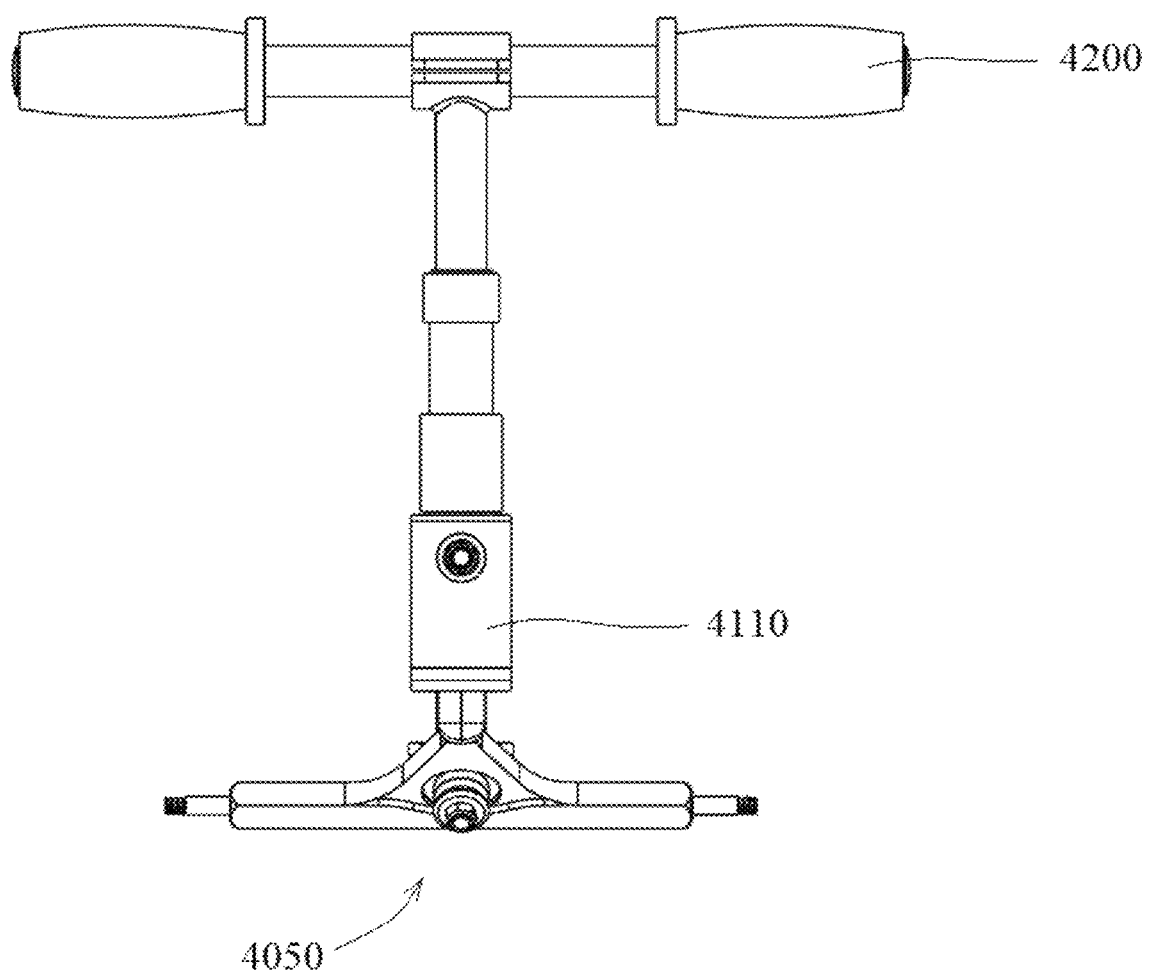
FIG. 67 is a front side view of the compound steering system of the vehicle in accordance with example embodiments.
Figure 68:
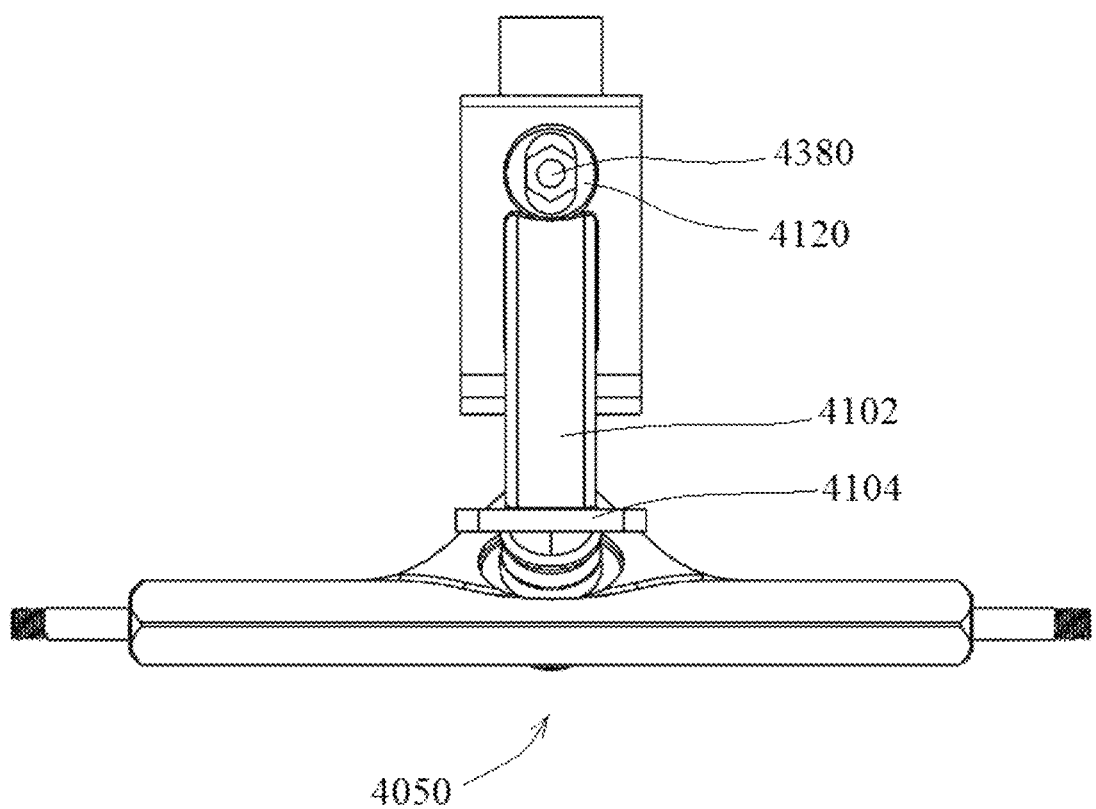
FIG. 68 is a back side view of the compound steering system of the vehicle in accordance with example embodiments.

Thus far, example embodiments have provided an example of truck 1000 usable in various types of vehicles such as skate boards and scooters. Example embodiments have also described a bicycle 2000 having a damping system built therein. While each of the truck 1000 and the bicycle damping system may be used independently of each other, example embodiments also cover an embodiment which incorporates each of a truck, which may be similar to trucks 100 and/or 100, and a damping system similar to that provided for bicycle 2000. FIG. 62, for example illustrates a vehicle 4000 that includes truck as well as damping system similar to that of the damping system utilized in bicycle 2000. Vehicle 4000, therefore can be controlled by leaning, steering (utilizing handle bars), or by a combination of the two. That is, the steering system of vehicle 300 represents a compound steering system having a truck which can control direction by leaning and a steering column having a damping system incorporated therein.

As shown in FIG. 62, a vehicle 4000 comprising a compound steering system may include a truck 4050, handle bars 4200 operatively connected to the truck 4050, a deck 4500 configured to provide a space for a user to stand, and one or more back wheels 4600 on the back of the deck 4500. In this nonlimiting example embodiment, the vehicle includes handle bars 4200 are operatively connected to the truck 4050 so that when the handle bars 4200 are turned the truck 4050 also turns. In example embodiments, truck 4050 may be configured to provide lean steering. For example, the direction of the vehicle 4000 may be controlled by a user standing on the deck 4500. For example, when the user on the deck 4500 leans or places more weight on one side of the deck 4500 than the other, a hanger of the truck 4050 rotates to change a direction of travel. In example embodiments the truck 4050 may substantially resemble truck 100 or truck 1000. In the instant example, truck 4050 is essentially identical to truck 100 except the baseplate 60 is circular rather than square. Thus, a detailed description thereof is omitted for the sake or brevity. However, it is understood that other well-known prior art trucks may also be capable of providing lean steering. As such, it is understood that truck 4050 may simply be a truck configured to provide lean steering rather than the specific trucks 100 and 1000 described herein.

FIGS. 63 to 72 represent various views of a portion of the vehicle 4000. As shown in FIGS. 63-72, the vehicle 4000 includes many features in common with bicycle 2000. For example, as shown in FIGS. 63-72, vehicle 4000 includes a frame 4100 having a head tube 4110 that encloses a damping system comprised of a locknut 4310, a first cup washer 4320, a first bushing 4330, a steering tube 4340, a second bushing 4350, a second cup washer 4360, a pivot bushing 4370, and a kingpin 4380. The frame 4100 further includes a kicker 4102 connected to a plate 4104 that may be used to connect the frame 4100 to the deck 4500. For example, the plate 4104 may include a plurality of holes that may allow a plurality of screws, or other fasteners, to connect the frame 4100 to the deck 4500. In example embodiments the frame 4100 may be formed from a casting process. Thus, the frame 4100 with the kicker 4102 and plate 4104 may be a substantially integral member. On the other hand, components of the frame 4100 may be separately manufactured and then connected together by a conventional means such as, but not limited to, welding. For example, the kicker 4102 may be a metallic structural tube member (for example, tube made from aluminum or steel) having ends angled to connect to each of the head tube 4110 and plate 4104 by welding.

Figure 74:
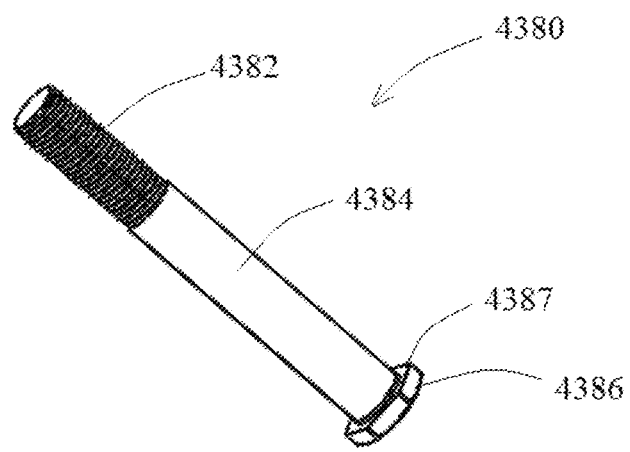
FIG. 74 illustrates an example of a kingpin in accordance with example embodiments.

Many elements of vehicle 4000 are similar to elements of truck 100, truck 1000, and bicycle 2000. For example, the kingpin 4380 may have a cylindrical shaft 4384 with a threaded end 4382 and a head 4386 (see FIG. 74). Like kingpin 190, the head 4386 may be generally hexagonal in shape, but may have another shape such as, but not limited to, a rectangular, or octagonal shape. The head 4386 may include a bearing surface 4387 which may bear against an end of the pivot bushing 4370 when the vehicle 4000 is assembled.

Figure 69:
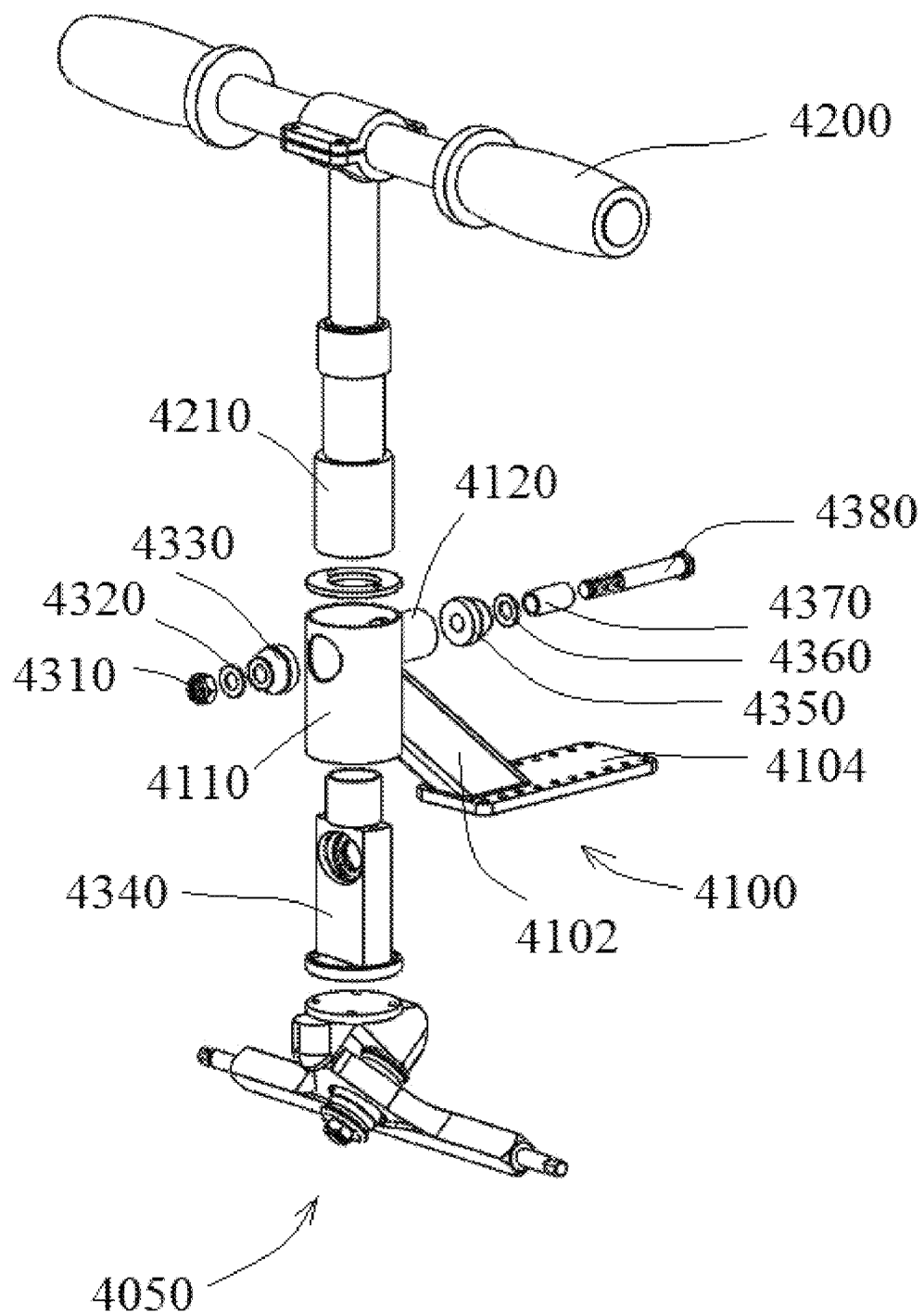
FIG. 69 is a first exploded view of the compound steering system of the vehicle in accordance with example embodiments.
Figure 70:
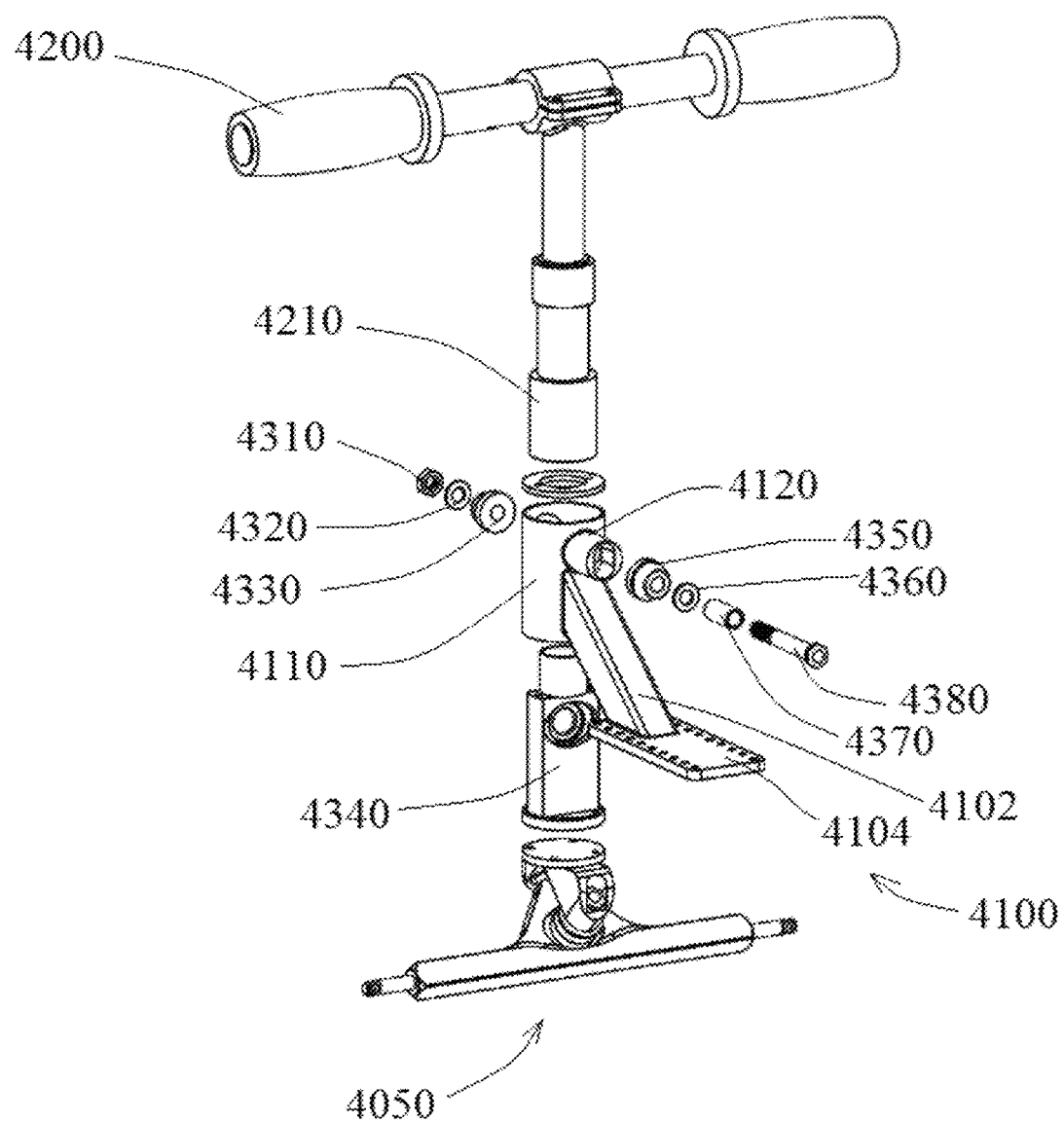
FIG. 70 is a second perspective view of the compound steering system of the vehicle in accordance with example embodiments.
Figure 75:
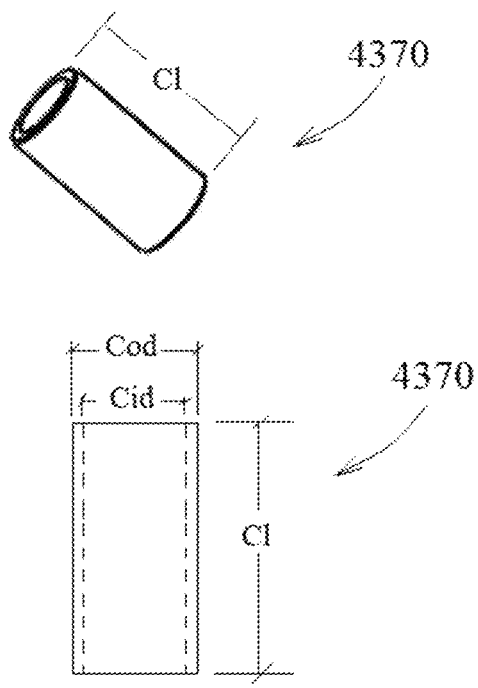
FIG. 75 illustrates an example of a pivot bushing in accordance with example embodiments.

Pivot bushing 4370, as shown in at least FIG. 69, may be somewhat similar to pivot bushing 200 in that it may resemble a hollow cylinder having a length Cl, an inner diameter Cid, and an outer diameter Cod (see FIG. 75). In example embodiments, inner diameter Cid of the pivot bushing 4370 may be about the same size, or slightly larger than, the outer diameter of the shaft 4384 to allow the kingpin 4380 to slide therethrough but small enough to prevent the head 4386 from passing through.

Figure 76:
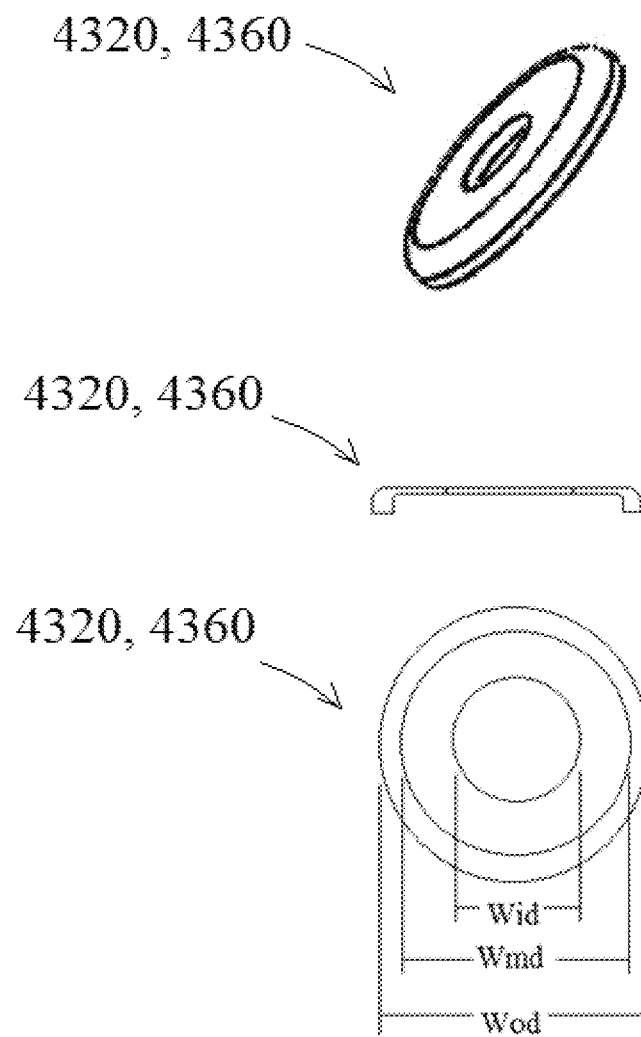
FIG. 76 illustrates cup washers in accordance with example embodiments.

In example embodiments, the first and second cup washers 4320 and 4360, as shown in at least FIGS. 69 and 76 may resemble cup washers 20 and 80. For example, like cup washers 20 and 80, cup washers 4320 and 4360 generally resemble disks having an inner diameter Wid and an outer diameter Wod. The cup washers 4320 and 4360 generally have apertures defined by the inner diameters Wid. The inner diameters Wid of the cup washers 4320 and 4360 are about the same as the outer diameter of the kingpin 4380 to allow the kingpin 4380 to pass through. For example, if the outer diameter of the kingpin 4380 is ⅜", the inner diameters Wid of the cup washers 4320 and 4360 may be about ⅜" or slightly larger. This allows the kingpin 4380 to pass through the cup washers 4320 and 4360. In example embodiments, the edges of the cup washers 4320 and 4360 may form flanges having an inner diameter of Wmd. The inner diameters of the flanged section Wmd may be generally about the same size, or slightly larger than, the outer diameter Bod of the bushings 4330 and 4350. This allows the cup washers 4320 and 4360 to at least partially capture ends of the bushings 4330 and 4350.

Figure 77:
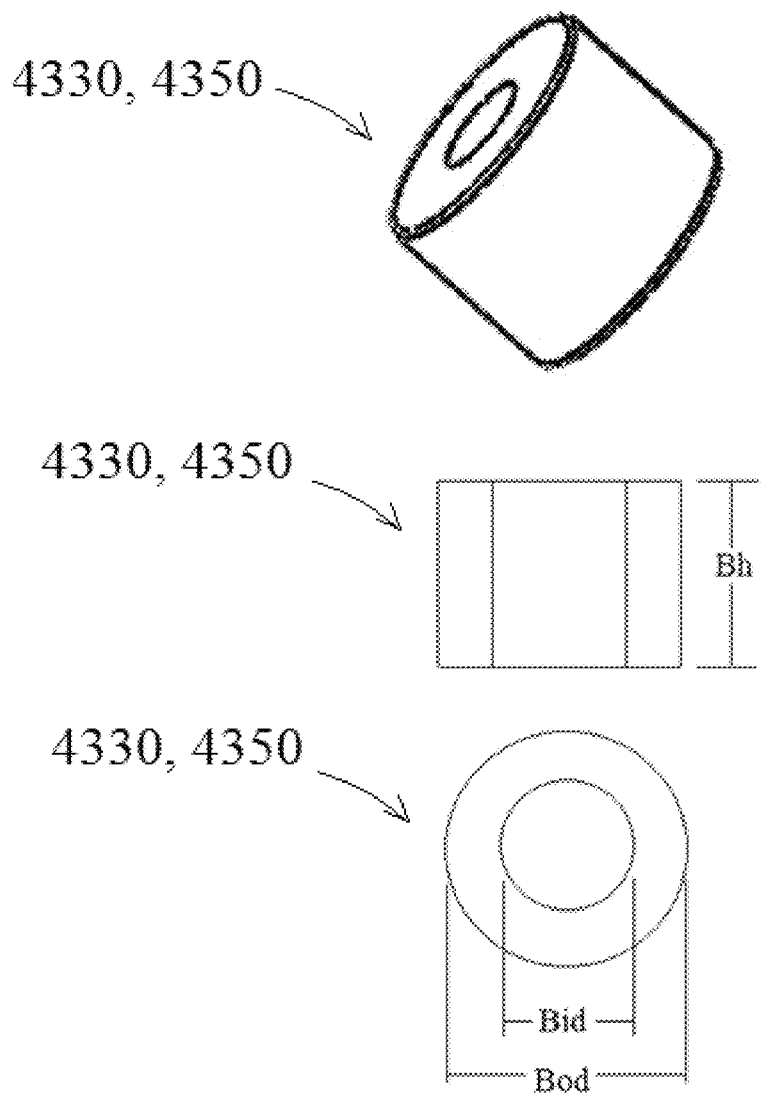
FIG. 77 illustrates bushings in accordance with example embodiments.

Like the previously described bushings, the bushings 4330 and 4350, as shown in at least FIGS. 69 and 77, may be cylindrical bushings having a height Bh, an inner diameter Bid, and an outer diameter Bod. The inner diameter may be large enough to accommodate the kingpin 4380. For example, if the kingpin 4380 has a diameter of about ⅜", the inner diameters Bid of the bushings 4330 and 4350 may be about ⅜" or slightly larger. The bushings 4330 and 4350 may be made of a resilient material, for example, urethane, to absorb various forces applied thereto while retaining the ability to return to an original configuration. Although the instant example illustrates the bushings 4330 and 4350 as being cylindrical, other types of bushings may be used. For example, rather than being cylindrical bushings, bushings 4330 and 4350 may have a different shape such as, but not limited to, hourglass, conical, stim, chubby, and randal.

The inventor notes the steering tube 4340 and the truck 4050 are illustrated as separate components. In this nonlimiting example embodiment, the steering tube 4340 and truck 4050 may be connected to one another via a conventional means such as, but not limited to, screws, pins, brackets, or adhesives. While the example vehicle 4000 illustrates the steering tube 4340 and truck 4050 as separate components, this is not intended to limit the invention. For example, in another embodiment, the steering tube 4340 and truck 4050 are integrated as one structure.

In example embodiments, the head tube 4110 may resemble the head tube 2110 and thus, a detailed description thereof is omitted for the sake of brevity. That said, head tube 4110 mays resemble head tube 2110 in that it may be cylindrical and may have an inner diameter HTid and an outer diameter HTod. In this nonlimiting example embodiment the back side of the head tube 4110 may include includes a protrusion 4120 much like the head tube 2110 includes protrusion 2120. For example, the protrusion 4120 of head tube 4110 may resemble a short cylinder having surfaces 4122 and 4124 configured to engage the head 4386 of the kingpin 4380. The surfaces 4122 and 4124, in general, may be flat surfaces that engage parallel surfaces of the head 4386 of the kingpin 4380 and prevent the kingpin 4380 from rotating much like the surfaces 66 and 67 of truck 100 prevent the kingpin 190 from rotating. In example embodiments, a hole 4126 penetrates the head tube 4110 at a location that coincides with the protrusion 4120. The hole may have a diameter about equal to, or slightly larger than, an outer diameter Cod of the pivot bushing 4370. For example, if the outer diameter Cod of the pivot bushing 4370 is ½", the diameter of the hole may be about ½" or slightly larger to allow the pivot bushing 4370 to slide therethrough.

Figure 78:
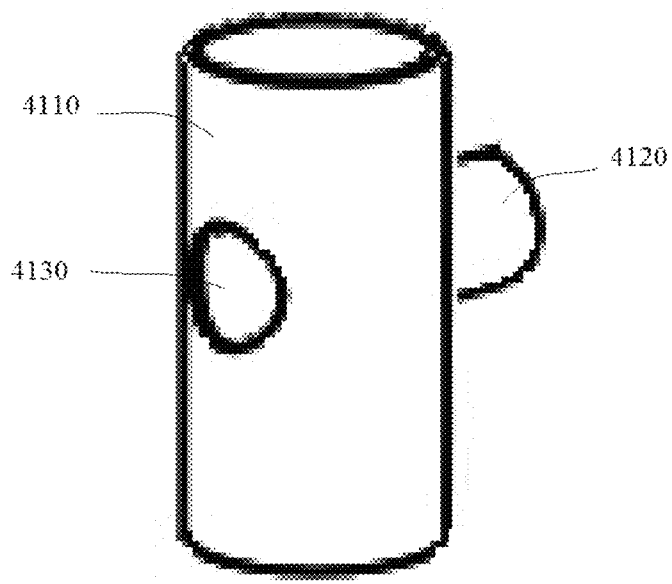
FIG. 78 illustrates a first perspective view of a head tube in accordance with example embodiments.
Figure 79:
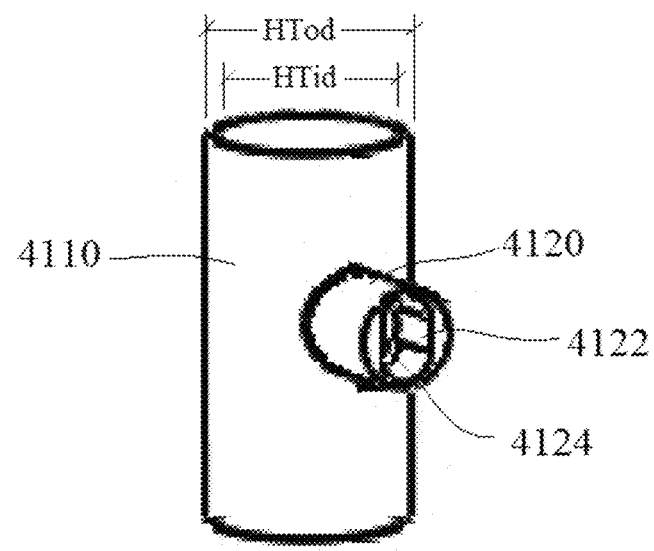
FIG. 79 illustrates a second perspective view of the head tube in accordance with example embodiments.
Figure 80:
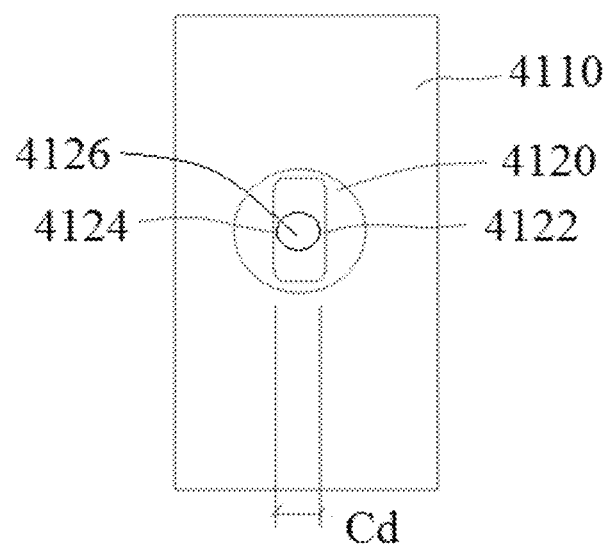
FIG. 80 illustrates an elevation view of the head tube in accordance with example embodiments.
Figure 81:
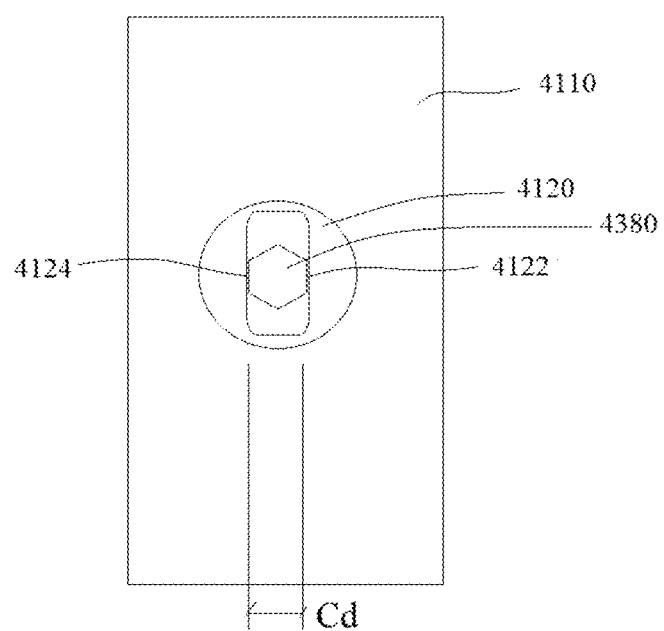
FIG. 81 illustrates an elevation view of the head tube with a kingpin inserted therein in accordance with example embodiments.
Figure 82:
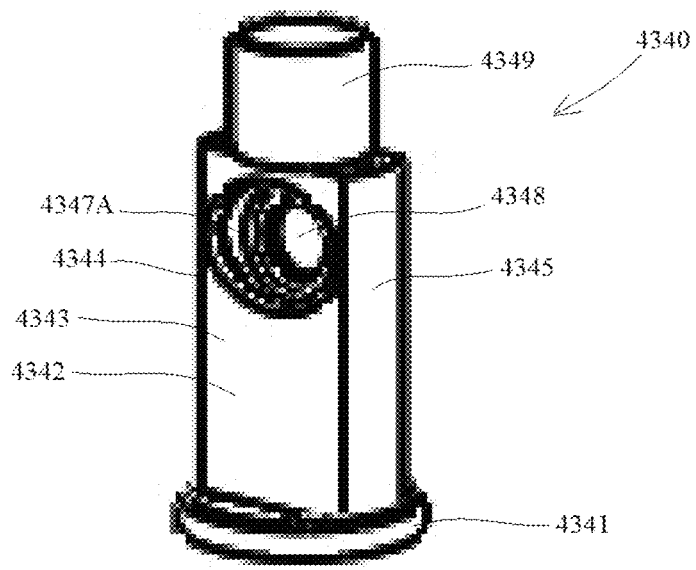
FIG. 82 illustrates a first perspective view of a steering tube in accordance with example embodiments.
Figure 83:
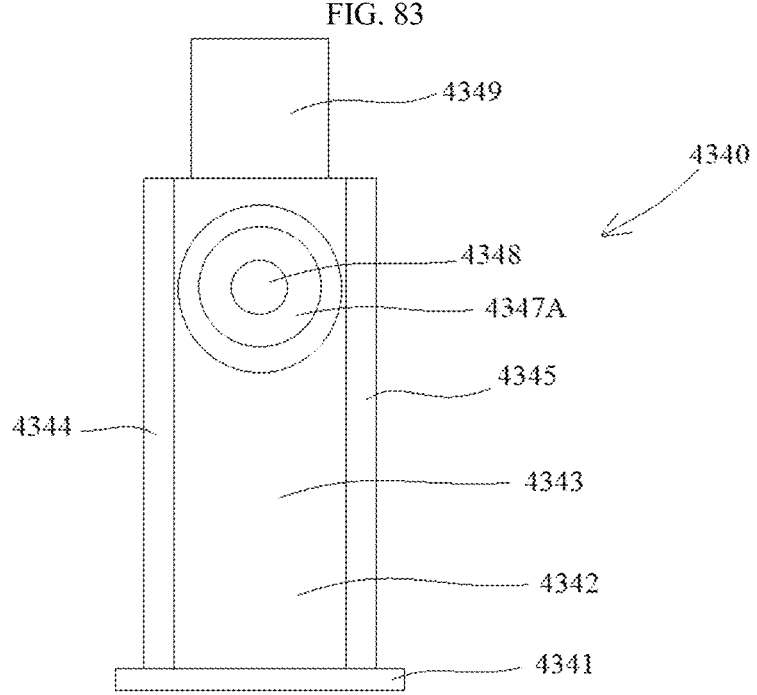
FIG. 83 illustrates a first elevation view of the steering tube in accordance with example embodiments.
Figure 84:
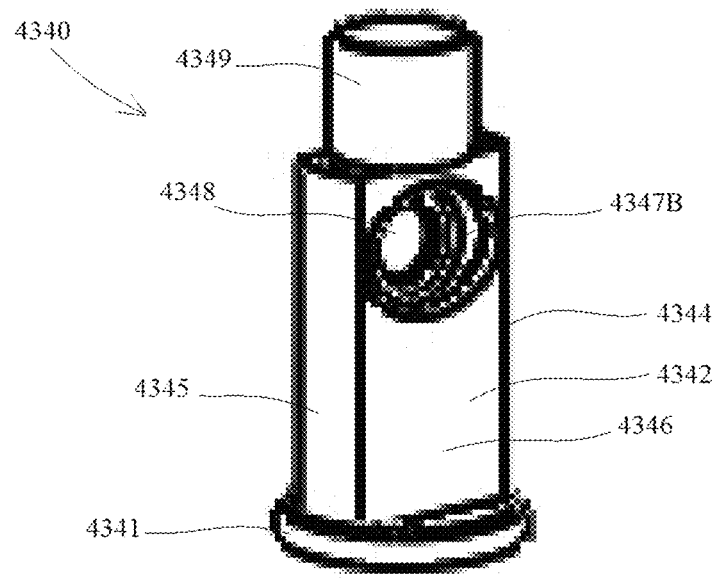
FIG. 84 illustrates a second perspective view of the steering tube in accordance with example embodiments.
Figure 85:
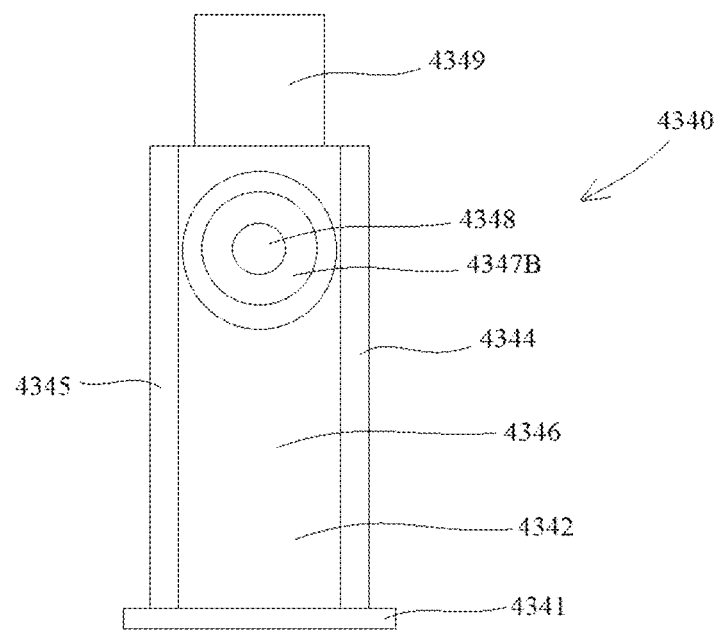
FIG. 85 illustrates a second elevation view of the steering tube in accordance with example embodiments.
Figure 86:
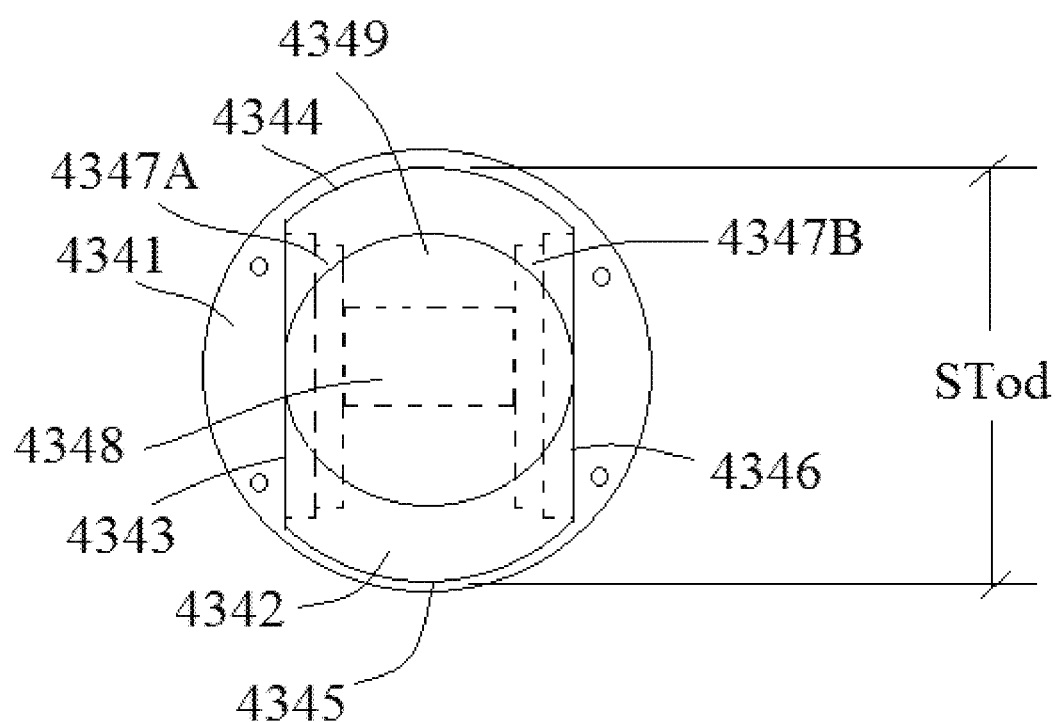
FIG. 86 illustrates a top view of the steering tube in accordance with example embodiments.
Figure 87:
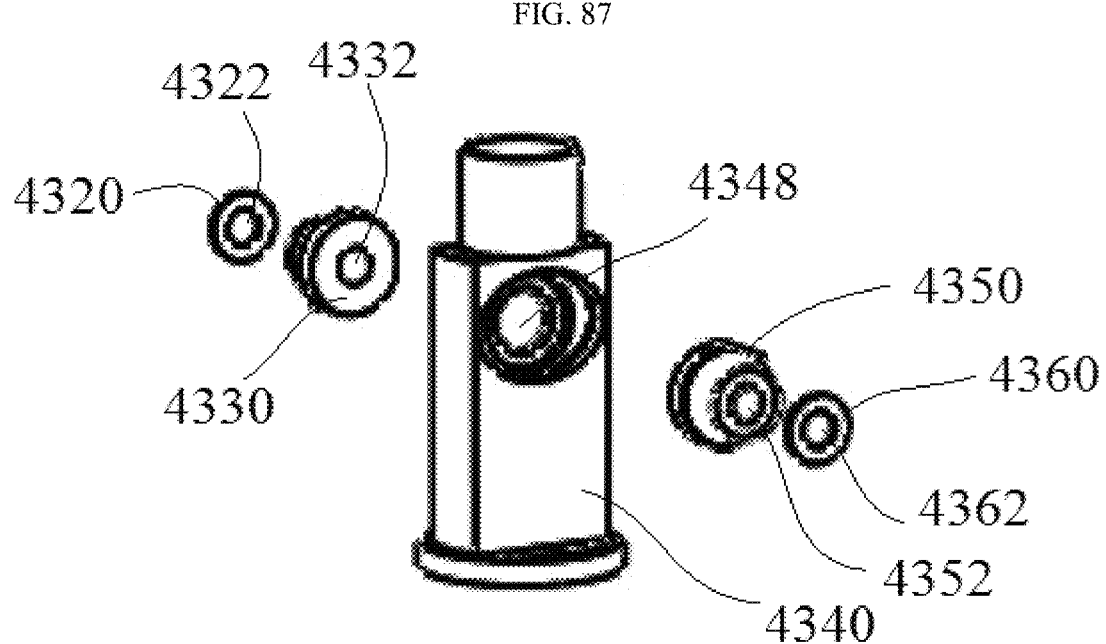
FIG. 87 illustrates a step in assembly a vehicle where bushings are seated in a steering tube and end caps are placed over the bushings to form an assembly in accordance with example embodiments.
Figure 88:
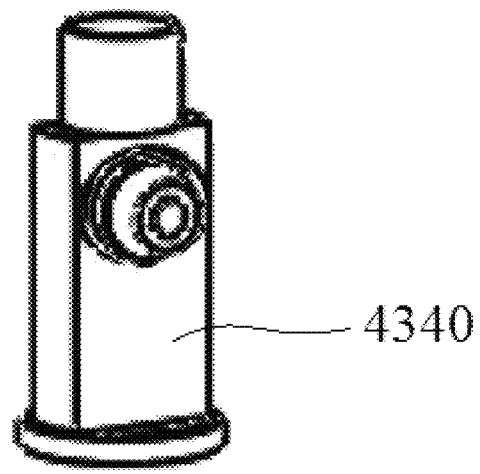
FIG. 88 illustrates the assembly in accordance with example embodiments.

Referring to FIGS. 69 and 78, it is observed the head tube 4110, like head tube 2110, may include another hole 4130 which may serve as an access hole. In one embodiment, the hole 4130 is generally sized to allow each of the first cup washer 4320 and first bushing 4330 to be inserted therein. In another embodiment the hole 4130 is sized to allow the first cup washer 4320 to be inserted therethrough but not the first bushing 4330. In yet another embodiment, the hole 4130 may be sized so that neither the first bushing 4330 nor the first cup washer 4320 can pass therethrough but large enough to allow the locknut 4310 to pass through. The hole 4130 may, therefore serve various purposes. For example, in one embodiment, the hole 4130 may allow a user to insert the first bushing 4330, first cup washer 4320, and locknut 4310 into the head tube 4110 so they may engage the kingpin 4380. In another embodiment, the hole 4130 may allow a user to insert the first cup washer 4320 and locknut 4310 into the head tube 2110 while preventing the first bushing 4330 from passing through the hole 4130. In this embodiment the first bushing 4330 may already be residing in the head tube 4110 and the hole 4130 may allow a user to place the first cup washer 4320 on an end of the first bushing 4330. In another embodiment, the hole 4130 may be sized to prevent the first cup washer 4320 and first bushing 4330 from passing through while providing enough room for the locknut 4310 to pass through. In all three embodiments, the hole 4130 allows a user to align the locknut 4310 with the threaded end 4382 of the kingpin 4380 and attach the locknut 4310 to the threaded end of the kingpin 4380 through the hole 4130.

FIGS. 69, 70, 82, and 84 illustrate a first perspective and a second perspective view of the steering tube 4340. In example embodiments the steering tube 4340 and 2340 may be substantially identical, as such, the teachings of FIGS. 49-53 are also pertinent to steering tube 4340. As shown in the figures, steering tube 4340 may be comprised of a base 4341, a body 4342 on the base 2341, and a post 4349 on top of the body 4342. The base, 4341, in one embodiment, may resemble a short disc having holes therein to allow the base 4341 to be connected to a base 4052 of truck 4050 by a conventional means such as, but not limited to, screws or bolts. Although the base 4341 is illustrated as a short circular disk, the shape may vary from embodiment to embodiment. For example, in one embodiment the base 4341 resembles a circular disk, in another embodiment, the base 4341 resembles a flat square plate, in yet another embodiment it may be octagonal in shape. As such, the shape of the base 4341 is not critical and, in some embodiments, may be omitted.

The body 4342 may, as shown in FIGS. 69, 70, and 82-85 may extend from the base 4341 and may have a front face 4343, back face 4346, a first curved side wall 4344, and a second curved side 4345 wall similar to front face 2343, back face 2346, first curved side wall 2344 and second curved side wall 2345. In the nonlimiting example embodiment of FIGS. 69-70 and 82-85, the front face 4343 and back face 4346 are generally flat, however, the faces may actually be nonflat, for example, curved. In this nonlimiting example embodiment, the body 4342 may resemble a cylinder having an outer diameter STod about the same as, or slightly smaller than, the inner diameter of the HTid of the head tube 4100. In fact, the radius of curvature of the side walls 4344 and 4345 may be about the same as the radius of curvature of the inner surface of the head tube 4100. This allows the body 4342 to insert into the head tube 4100 and rotate within the head tube 4100.

In example embodiments, the body 4342 may include a first recessed area 4347A on the front face of the body 4342 and a second recessed area 4347B on a back face 4346 of the body 4342. The first and second recessed areas 4347A and 4347B may be configured to receive ends of the first and second bushings 4330 and 4360. Thus, the first and second recessed areas 4347A and 4347B may function as bushing seats. In a nonlimiting example embodiment, a hole 4348 may pass through the centers of the recessed areas 4347A and 4347B and may be sized to accommodate the kingpin 4380. For example, if the kingpin 4380 has a diameter of about ⅜", the diameter of the hole 4348 may be about ⅜" or larger to allow a portion of the kingpin 4380 to pass through.

In example embodiments, the steering tube 4340 may include the post 4349. The post 4349 may be inserted into a receiving area 4210 of the handle bars 4200 to connect the steering tube 4340 to the handle bars 4200. In this way the steering tube 4340 is rotated within the head tube 4110 as the handle bars 4200 are rotated. It is understood there are many ways in which the handle bars 4200 may be connected to the steering tube 4340 and thus the manner in which they are connected is not relatively important so long as the connection between the handle bars 4200 and steering tube 4340 is such that the steering tube 4340 turns as the handle bars 4200 are turned.

Figure 89:
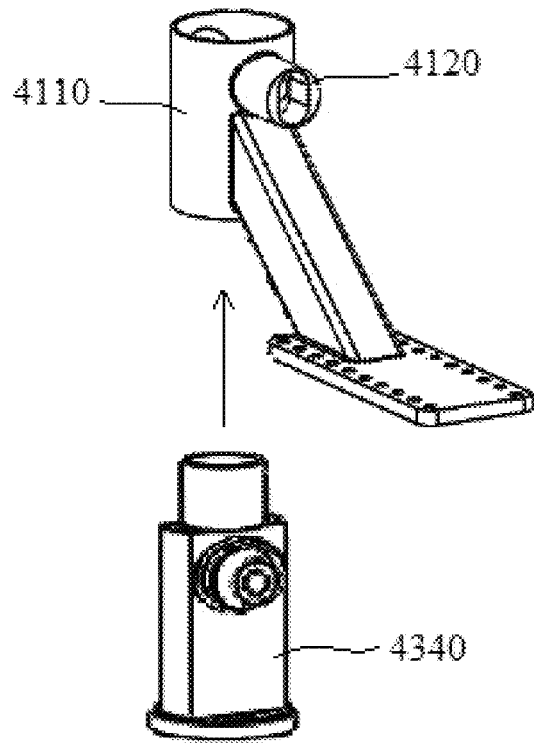
FIG. 89 illustrates the assembly being inserted into a head tube in accordance with example embodiments.
Figure 90:
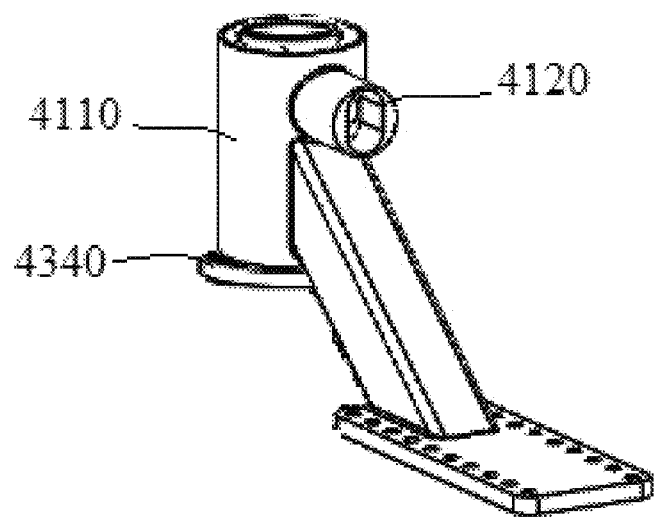
FIG. 90 illustrates the assembly in the head tube in accordance with example embodiments.
Figure 91:
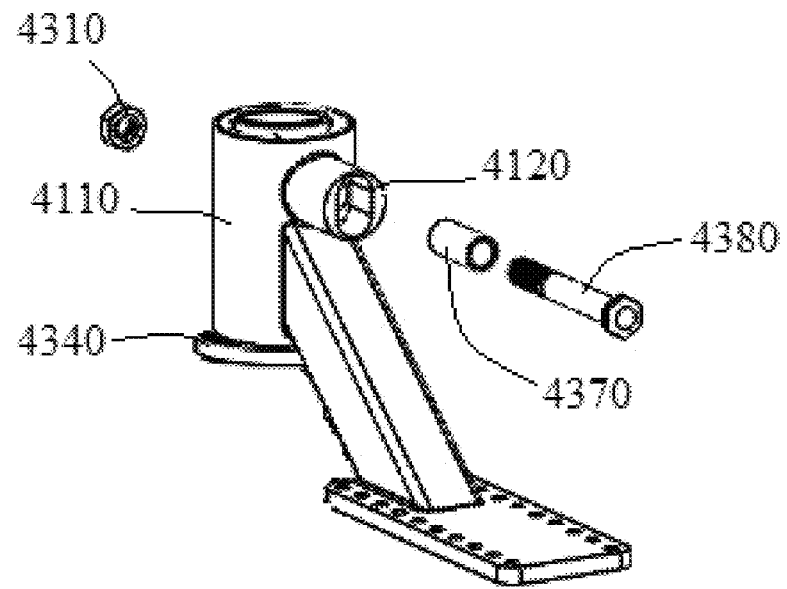
FIG. 91 illustrates a kingpin and pivot bushing being inserted into the head tube in accordance with example embodiments.

FIGS. 87 through 91 illustrate steps which may be executed to, in part, assemble the vehicle 4000 of example embodiments. As show in FIGS. 87 through 91 the steps may include an operation of placing the first bushing 4330 into the first bushing seat 4347A, placing the second bushing 4350 into the second bushing seat 4347B, placing the first cup washer 4320 on an end of the first bushing 4330 and placing the second cup washer 4360 on an end of the second bushing 4350 to form the assembly shown in FIG. 88. It is noted that in the assembly illustrated in FIG. 88 each of the apertures of the first cup washer 4320, first bushing 4330, second bushing 4350, and second cup washer 4360 are all aligned with the aperture 4348 of the steering tube 4340. Thereafter, the assembly may be inserted into the head tube 4110 as shown in FIG. 89 to arrive at the assembly shown in FIG. 90. In this configuration each of the apertures of the first cup washer 4320, first bushing 4330, second bushing 4350, and second cup washer 4360, and the steering tube 4340 are aligned with the hole 4126 of head tube 4110. Thereafter, the pivot bushing 4370 may be inserted into the protrusion 4120 and through the hole 4126 of the head tube 4110 until it makes contact with the second cup washer 4360. After this step the kingpin 4380 may be inserted through the pivot bushing 400, the second cup washer 4360, the second bushing 4350, the aperture 4348, the first bushing 4330 and the first cup washer 4310 until the threaded end 4382 of the kingpin 4380 is exposed near the hole 4130. Thereafter the locknut 4310 may be screwed onto the threaded end 4382 of the kingpin 4380 and turned until sufficient tension is imparted to the kingpin 4380.

Figure 92:
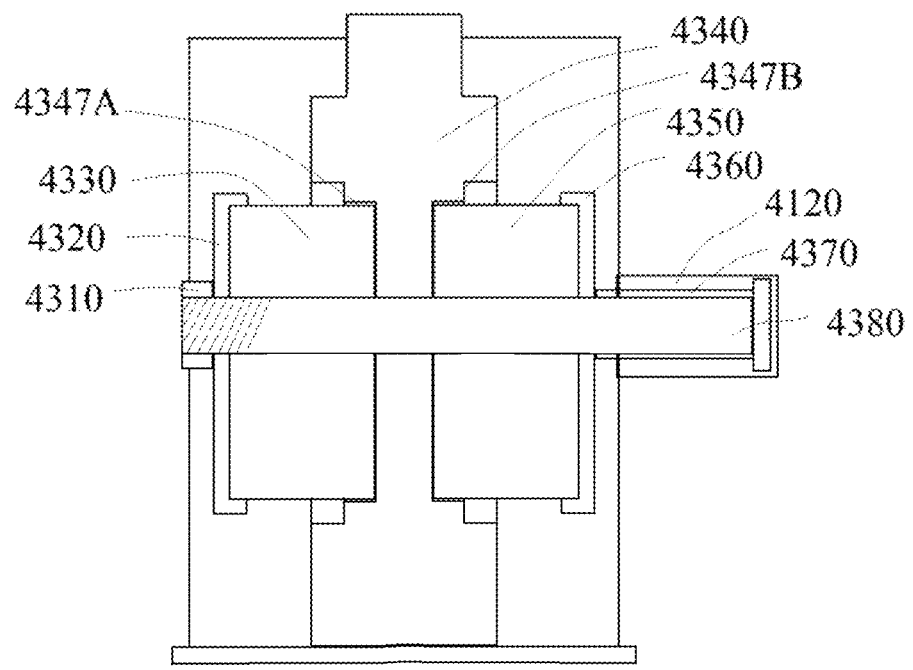
FIG. 92 illustrates a cross-section of the assembly, the kingpin, the pivot bushing, when installed in the head tube in accordance with example embodiments.

FIG. 92 illustrates a cross-section of the head tube 4110 with the sliding kingpin system inserted therein. As one skilled in the art would readily appreciate, as the locknut 4310 moves along the threaded end 4382 of the kingpin 4380 and towards the head 4386 of the kingpin 4380 the locknut 4310 presses against the first cup washer 4320 which in turn presses against the first bushing 4330 which in turn presses against the bushing seat 4347A of the steering tube 4340. At the same time, the head 4386 of the kingpin 4380 presses against the pivot bushing 4370 which in turn presses against the second cup washer 4360 which in turn presses against the second bushing 4350 which in turn presses against the second bushing seat 4347B. These operations result in each bushing 4330 and 4350 experiencing a compressive state, the degree of compression be controlled by how far along the threaded end 4382 the locknut 4310 moves. In example embodiments, assembly of the vehicle 4000 may include other steps such as attaching the truck 4050 and the handle bars 4200 to the steering tube 4340.

In example embodiments, the first bushing 4330 and the second bushing 4350 bearing against the steering tube 4340 acts to damp vibrations generated by the bicycle's wheel on the ground and reduces the vibration ultimately transferred to the handle bars 4200. Thus, a rider of a bicycle including the damping effect of the bushings 4330 and 4350 may experience less shock to the hands as would be experienced in a conventional bicycle.

In example embodiments the bushings 4330 and 4350 are resilient in nature. As with bicycle 2000, a downside of the damping system is that a rider will generally have to apply greater torque on the handle bars 4200 in order to rotate the truck 4050 than would be necessary had the bushings 4330 and 4350 not been installed. However, an advantage of the bushings 4330 and 4350 is that after a torque has been applied to the handle bars 4200 to rotate the truck 4050 and the torque is released, the bushings 4330 and 4350 tends to cause the truck 4050 to return to its original position due to their resiliency. This return is largely beneficial to riders since this action of the bushings 4330 and 4350 not only damps vibrations experienced by a rider but also tends to keep the vehicle 4000 on a straight line.

It is understood that the example system illustrated in FIGS. 62 to 92 are for the purpose of illustration only and alternative embodiments are considered to fall within the scope of the invention. For example, in FIGS. 62 to 92, the protrusion 4120 is illustrated as protruding through a back of the head tube 4110. However, in another embodiment, the protrusion 4120 is placed at a front of the head tube 4110 and a hole corresponding to hole 4130 may be placed on the back of the head tube 4110. As yet another embodiment, the protrusion 4120 may be placed on a side of the head tube 4110 with a hole corresponding to hole 4130 being placed on the other side of the head tube 4110.

Figure 71:
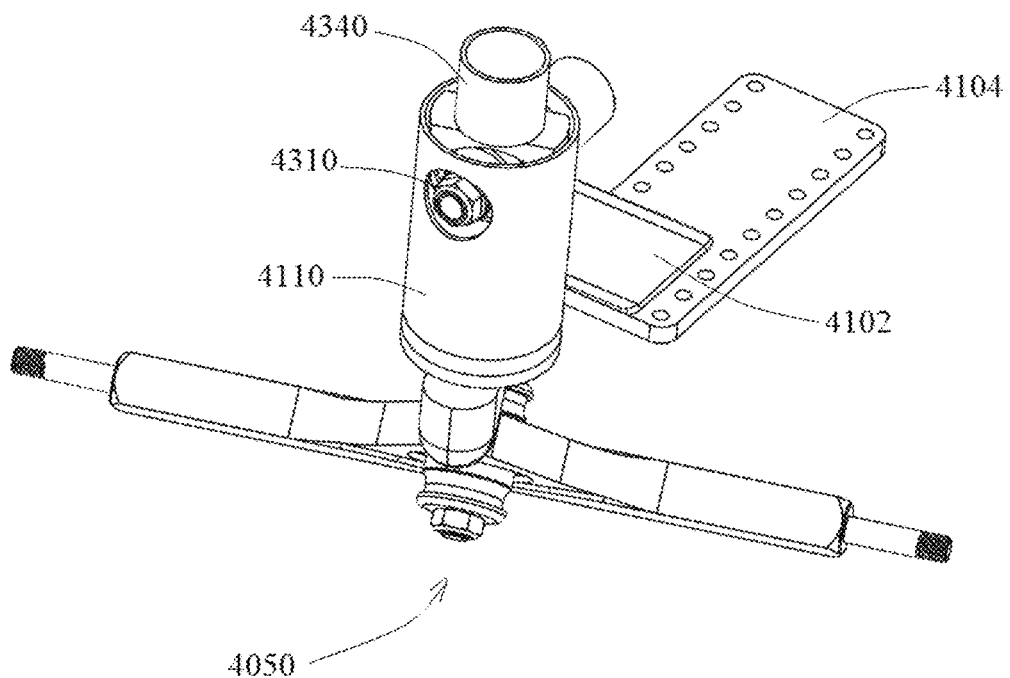
FIG. 71 is a perspective view of the compound steering system of the vehicle wherein a steering tube is in a first configuration in accordance with example embodiments.
Figure 72:
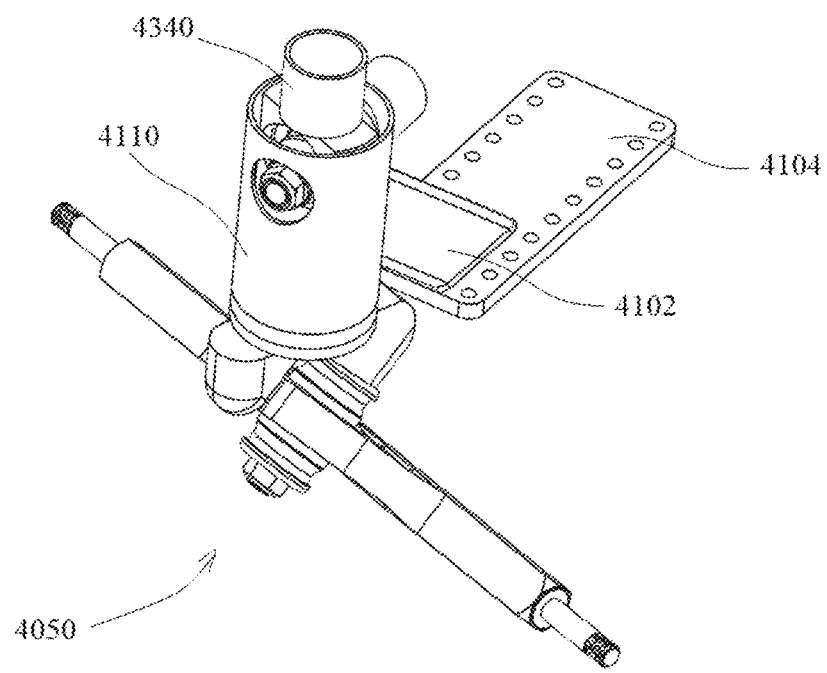
FIG. 72 the perspective view of the compound steering system of the vehicle wherein a steering tube is rotated to a second configuration in accordance with example embodiments.
Figure 73:
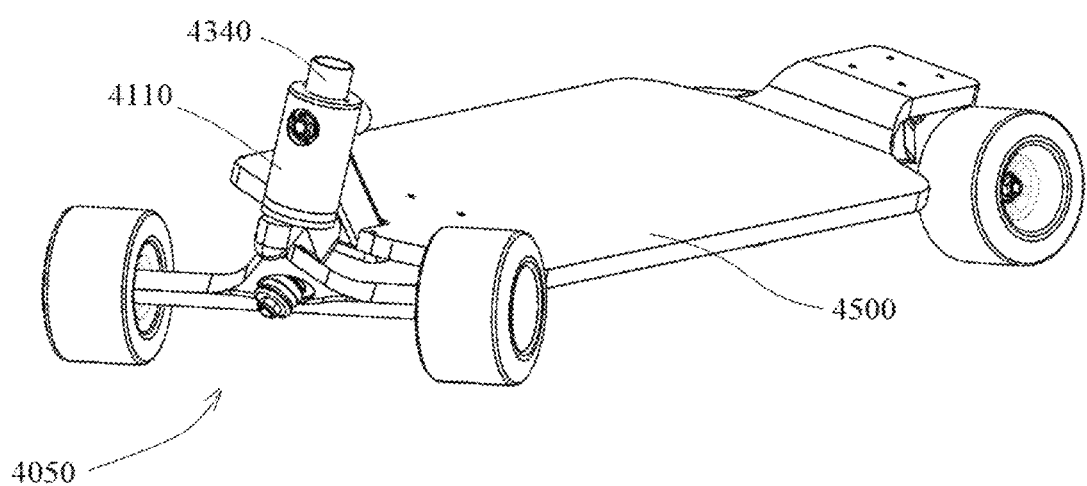
FIG. 73 is the vehicle with a deck oriented at an angle in accordance with example embodiments.

FIGS. 71 and 72 illustrate an interplay between the steering tube 4340 and the truck 4050. As shown in FIG. 71 when the steering tube 4340 is in a first position the truck 4050 may be in a first position. However, when the steering tube 4340 is rotated to a second position, as son in FIG. 72, the truck 4050 rotates to a second position as shown in FIG. 72. Thus, rotating the handle bars 4200 causes the steering tube 4340 to rotate which causes the truck 4050 to likewise rotate due to the steering tube 4340 being connected to the steering tube 4340. Thus, a direction of vehicle 4000 may, in part, be controlled by a rotation of the handle bars 4200. However, because the truck 4050 is configured for lean steering, the direction of travel may also be influenced by a rider leaning to one side of the deck 4500. Thus, vehicle 4000 represents a vehicle having a compound steering system where a direction of travel is controlled by both handle bars and lean of a deck 4500.

Thus far, example embodiments have provided an example of truck 1000 usable in various types of vehicles such as skate boards and scooters. Example embodiments have also described a bicycle 2000 having a damping system built therein. While each of the truck 1000 and the bicycle damping system may be used independently of each other, example embodiments also cover a vehicle which incorporates each of a truck and a damping system similar to that provided for bicycle 2000. FIG. 62, for example illustrates a vehicle 4000 that includes a truck as well as damping system similar to that of the damping system utilized in bicycle 200. Vehicle 4000, therefore can be controlled by leaning or steering (utilizing handle bars), or by a combination of leaning and steering. That is, the steering system of vehicle 4000 represents a vehicle having a compound steering system having a truck which can control a direction of the vehicle 4000 by leaning and/or a direction of the vehicle through use of a damping system incorporated therein.

Figure 93:
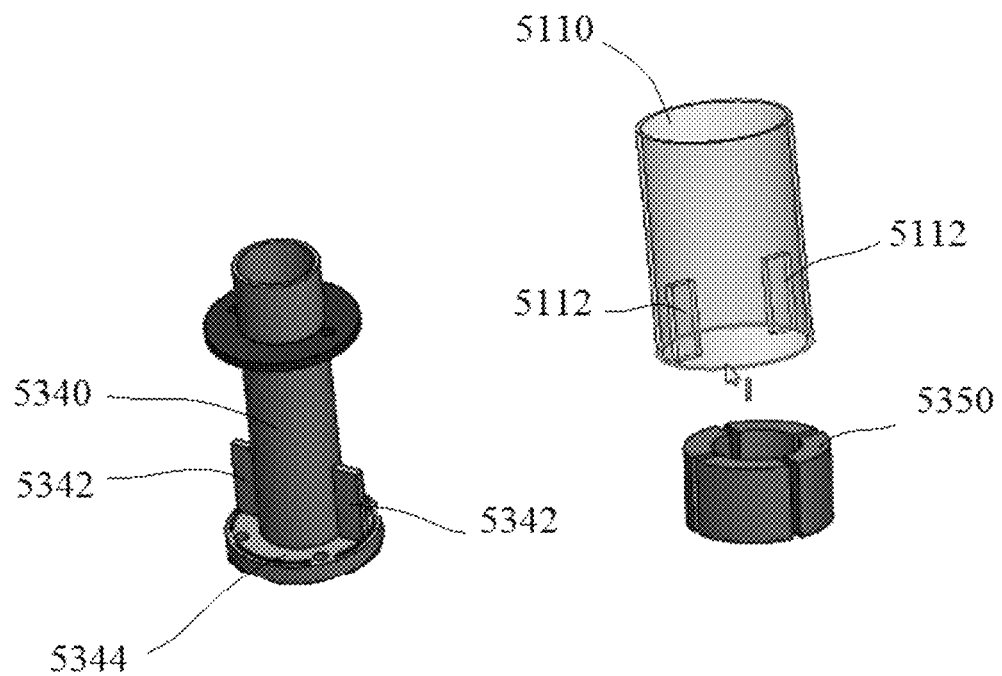
FIG. 93 is a view of elements usable in a return to center assembly.
Figure 94:
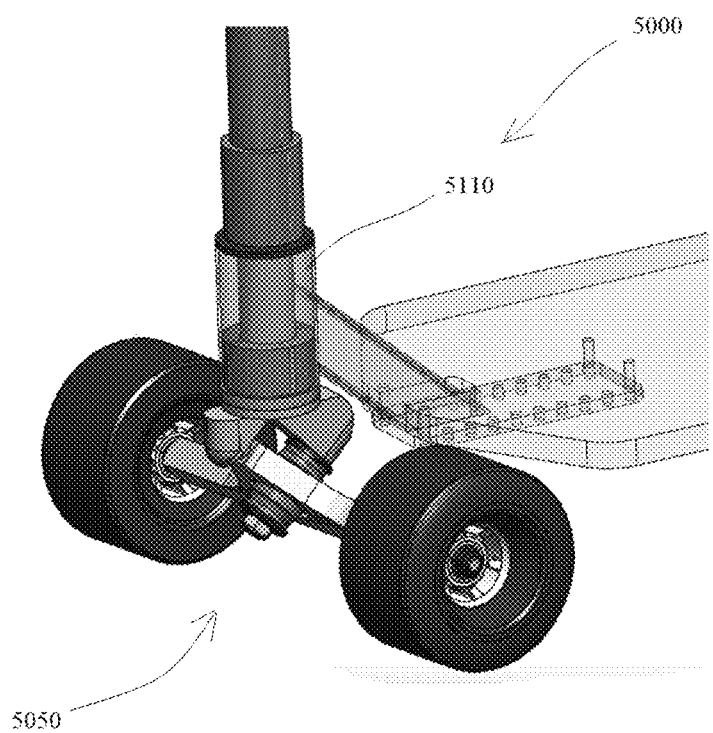
FIG. 94 illustrates a portion of a vehicle utilizing a return to center assembly.

In example embodiments, the damping systems of the bicycle 2000, watercraft 3000, and vehicle 4000 may act as return to center assemblies since they tend to cause each of the bicycle 2000, watercraft 3000, and vehicle 4000 to return to a straight path when a torque or force applied to a handle is released. The damping systems are particularly desirable since the bushings provided in each damping system can be tensioned to a desired level. The invention, however, is not intended to be limited to return to center assemblies that utilize the sliding kingpin system. For example, FIGS. 93-94 illustrate another type of return to center assembly which includes a head tube 5110 having internal flanges 5112, a steering tube 5340 having another pair of flanges 5342 and a base 5344, and biasing members 5350. These elements may be used in vehicle 5000 that may resemble vehicle 4000. FIG. 94 shows a portion of a vehicle 5000 which utilizes these members along with a truck 5050. Though not shown, it is understood that the steering tube 5340 is operatively connected to a pair of handle bars so that when the handle bars are turned the steering tube 5340 turns which thereby turns the truck 5050 (which may resemble and behave as any of the aforementioned trucks). In this case, as the handle is turned the flanges 5342 of the steering tube 5340 rotate into the biasing members 5350 which are held in place by the flanges 5112 of the head tube 5110. When a torque on the handle bars is released the biasing members 5350 rotate the steering tube 5340 back to its original position which causes the truck 5050 to also return to its original position. Thus, the biasing members 5350 act as a return to center assembly which returns a truck to a center position when a force applied to the biasing member is removed. Other structures which may serve as return to center assemblies include springs, such as, but not limited to, torsion springs.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What we claim is:

1. A vehicle comprising:
at least one handle;
at least one wheel operatively connected to the at least one handle so that as torque is applied to the at least one handle the at least one wheel is rotated from a first position to a second position;
a head tube enclosing a return device configured to rotate the at least one wheel back to the first position when the torque is released from the at least one handle; and
a steering tube in the head tube, the steering tube having at least one recessed area, wherein the return device includes a brushing in the at least one recessed area of the steering tube so that when the torque is applied to the at least one handle the bushing is compressed by the steering tube.

2. The vehicle of claim 1, wherein the return device includes at least one biasing member in the head tube.

3. The vehicle of claim 1, wherein the return device includes at least one biasing member in the head tube and the at least one head tube includes at least one internal flange configured engage the at least one biasing member.

4. The vehicle of claim 1,
wherein the steering tube is configured to rotate within the head tube, wherein the return device includes at least one biasing member in the head tube, the at least one head tube includes at least one internal flange configured engage the at least one biasing member, and the at least one steering tube includes at least one flange configured to engage the at least one biasing member.

5. The vehicle of claim 1,
wherein the at least one recessed area of the steering tube is a first recessed area on a first side of the steering tube and a second recessed area on a second side of the steering tube;
wherein the first recessed area includes a first bushing; and
wherein the second recessed area includes a second bushing, wherein when torque is applied to the at least one handle the first and second bushing are compressed.

6. The vehicle of claim 1, further comprising:
a kingpin:
wherein the at least one recessed area of the steering tube is a first recessed area on a first side of the steering tube and a second recessed area on a second side of the steering tube;
wherein the first recessed area includes a first bushing;
wherein the second recessed area includes a second bushing; and
wherein the kingpin extends through the first bushing, the steering tube, and the second bushing, wherein when torque is applied to the at least one handle at least one of the first and second bushings are compressed.

7. The vehicle of claim 1, further comprising:
a spacer; and
a kingpin;
wherein the at least one recessed area of the steering tube is a first recessed area on a first side of the steering tube and a second recessed area on a second side of the steering tube;
wherein the first recessed area includes a first bushing;
wherein the second recessed area includes a second bushing;
wherein the kingpin extends through the spacer, the first bushing, the steering tube, and the second bushing, wherein when torque is applied to the at least one handle at least one of the first and second bushings are compressed.

8. The vehicle of claim 1, further comprising:
a spacer; and
a kingpin;
wherein the at least one recessed area of the steering tube is a first recessed area on a first side of the steering tube and a second recessed area on a second side of the steering tube;
wherein the first recessed area includes a first bushing;
wherein the second recessed area includes a second bushing;
wherein the kingpin extends through the spacer, the first bushing, the steering tube, and the second bushing, wherein the spacer is arranged between a head of the kingpin and the first bushing and wherein when torque is applied to the at least one handle at least one of the first and second bushings are compressed.

9. The vehicle of claim 1, further comprising:
a pivot bushing; and
a kingpin;
wherein the at least one recessed area of the steering tube is a first recessed area on a first side of the steering tube and a second recessed area on a second side of the steering tube;
wherein the first recessed area includes a first bushing;
wherein the second recessed area includes a second bushing;
wherein the kingpin extends through the pivot bushing, the first bushing, the steering tube, and the second bushing, wherein the pivot bushing is arranged between a head of the kingpin and the first bushing and wherein when torque is applied to the at least one handle at least one of the first and second bushings are compressed.

10. The vehicle of claim 1, wherein the head tube includes an access hole on one side of the head tube and a protrusion on a second side of the head tube.

11. The vehicle of claim 1, wherein the return device includes a kingpin having a head restrained from rotating by a protrusion of the head tube.

12. The vehicle of claim 1, wherein the head tube includes an access hole on one side of the head tube and a protrusion on a second side of the head tube and the return device includes a kingpin having a head restrained from rotating by the protrusion of the head tube.

13. The vehicle of claim 1,
wherein the return device includes a kingpin passing through the head tube and the steering tube.

14. The vehicle of claim 1,
wherein the return device includes a kingpin passing through the head tube and the steering tube and the kingpin has a head rotationally constrained by the head tube.

15. The vehicle of claim 1, further comprising:
a fork operatively connected to the steering tube so that as the at least one handle is rotated the steering tube and the fork are rotated to rotate the at least one wheel.

16. The vehicle of claim 1, further comprising:
a truck operatively connected to the steering tube so that as the at least one handle is rotated the steering tube and the truck are rotated to rotate the at least one wheel.

17. The vehicle of claim 1, further comprising:
a truck operatively connected to the steering tube so that as the at least one handle is rotated the steering tube and the truck are rotated to rotate the at least one wheel, wherein the truck is configured for lean steering.

18. A vehicle comprising:
a deck having a flat surface upon which a rider can stand;
a first pair of wheels arranged at a front of the deck and below the deck;
a handle operatively connected to the first pair of wheels such that if a torque is applied to the handle the first pair of wheels rotates from a first position to a second position;
a return device configured to rotate the wheels from the second position to the first position when the torque is removed from the handle; and
a steering tube arranged in a head tube, wherein the return device includes a resilient member and a kingpin passing through the resilient member and the steering tube.

* * * * *

UNITED STATES PATENT AND TRADEMARK OFFICE
CERTIFICATE OF CORRECTION

PATENT NO. : 11,420,676 B2
APPLICATION NO. : 16/807605
DATED : August 23, 2022
INVENTOR(S) : Christopher Chaput It is certified that error appears in the above-identified patent and that said Letters Patent is hereby corrected as shown below:

In the Claims

Column 23, Lines 47-61 Claim 1 should read as follows:
1. A vehicle comprising: at least one handle; at least one wheel operatively connected to the at least one handle so that as torque is applied to the at least one handle the at least one wheel is rotated from a first position to a second position; a head tube enclosing a return device configured to rotate the at least one wheel back to the first position when the torque is released from the at least one handle; and a steering tube in the head tube, the steering tube having at least one recessed area, wherein the return device includes a bushing in the at least one recessed area of the steering tube so that when the torque is applied to the at least one handle the bushing is compressed by the steering tube.

Column 23, Lines 64-67 Claim 3 should read as follows:
3. The vehicle of claim 1, wherein the return device includes at least one biasing member in the head tube and the at least one head tube includes at least one internal flange configured to engage the at least one biasing member.

Column 24, Lines 1-8 Claim 4 should read as follows:
4. The vehicle of claim 1, wherein the steering tube is configured to rotate within the head tube, wherein the return device includes at least one biasing member in the head tube, the at least one head tube includes at least one internal flange configured to engage the at least one biasing member, and the at least one steering tube includes at least one flange configured to engage the at least one biasing member.

Column 24, Lines 9-20 Claim 5 should read as follows:
5. The vehicle of claim 1, wherein the at least one recessed area of the steering tube is a first recessed area on a first side of the steering tube and a second recessed area on a second side of the steering tube; wherein the first recessed area includes a first bushing; and wherein the second recessed area includes a second bushing, wherein when torque is applied to the at least one handle the first and second bushings are compressed.

Signed and Sealed this
Fifteenth Day of November, 2022

*Katherine Kelly Vidal*

Katherine Kelly Vidal
*Director of the United States Patent and Trademark Office*